US007805746B2

(12) United States Patent
Brandyberry et al.

(10) Patent No.: US 7,805,746 B2
(45) Date of Patent: Sep. 28, 2010

(54) OPTIMIZED APPLICATION ON-THE-WIRE FORMAT FOR CONSTRUCTION, DELIVERY AND DISPLAY OF ENHANCED TELEVISION CONTENT

(75) Inventors: David Brandyberry, San Rafael, CA (US); John Carney, Corte Madera, CA (US); David de Andrade, Fairfax, CA (US); Matt Marenghi, San Francisco, CA (US); Glenn Adams, Acton, MA (US); Connie Mace, Novato, CA (US); Elliot Poger, San Francisco, CA (US)

(73) Assignee: TVWorks, LLC, Philadelphia, PA (US)

( * ) Notice: Subject to any disclaimer, the term of this patent is extended or adjusted under 35 U.S.C. 154(b) by 1234 days.

(21) Appl. No.: 11/253,892

(22) Filed: Oct. 18, 2005

(65) Prior Publication Data

US 2006/0130120 A1 Jun. 15, 2006

Related U.S. Application Data

(63) Continuation-in-part of application No. 10/390,064, filed on Mar. 14, 2003, and a continuation-in-part of application No. 10/933,845, filed on Sep. 2, 2004, and a continuation-in-part of application No. 10/630,815, filed on Jul. 29, 2003.

(60) Provisional application No. 60/643,085, filed on Jan. 10, 2005, provisional application No. 60/628,423, filed on Nov. 15, 2005.

(51) Int. Cl.
*H04N 7/173* (2006.01)

(52) U.S. Cl. .......................... 725/110; 725/51; 725/136

(58) Field of Classification Search ................. 725/110, 725/51, 136
See application file for complete search history.

(56) References Cited

U.S. PATENT DOCUMENTS

| | | | | |
|---|---|---|---|---|
| 2003/0084449 | A1 * | 5/2003 | Chane et al. | 725/46 |
| 2003/0229899 | A1 * | 12/2003 | Thompson et al. | 725/87 |
| 2004/0226051 | A1 * | 11/2004 | Carney et al. | 725/135 |

* cited by examiner

*Primary Examiner*—Andy Ho
(74) *Attorney, Agent, or Firm*—Banner & Witcoff, Ltd.

(57) ABSTRACT

Enhanced television content is processed and displayed by the execution of computer-readable instructions formatted in a binary interchange format (BIF) of an enhanced television BIF (EBIF) application via user agent at a client by interpreting the computer-readable instructions directly and without additional compilation. A key identifier may be used by the EBIF application to identify a content programming engine to locate and retrieve programmable content to be displayed at the client.

29 Claims, 5 Drawing Sheets iTV-ETV Application Deployment System
10

OPTIMIZED APPLICATION ON-THE-WIRE FORMAT FOR CONSTRUCTION, DELIVERY AND DISPLAY OF ENHANCED TELEVISION CONTENT

RELATED APPLICATIONS

The present application is related to and hereby claims the priority benefit of U.S. Provisional Patent Application 60/643,085, filed Jan. 10, 2005, entitled "OPTIMIZED APPLICATION ON-THE-WIRE FORMAT FOR CONSTRUCTION, DELIVERY AND DISPLAY OF ITV CONTENT" and U.S. Provisional Patent Application 60/628,423, filed Nov. 15, 2005 and is also a Continuation-in-Part of U.S. patent application Ser. No. 10/390,064, filed Mar. 14, 2003 (hereinafter the "064 Application"), application Ser. No. 10/933,845, entitled SYSTEM AND METHOD FOR PLACEMENT PREFERRED PROGRAMMING OF ITV CONTENT", filed Sep. 2, 2004 (hereinafter the "845 Application"), and application Ser. No. 10/630,815, entitled "SYSTEM AND METHOD FOR CONSTRUCTION, DELIVERY AND DISPLAY OF ITV CONTENT", filed Jul. 29, 2003 (hereinafter the "815 Application"). The '064, '845, '815 applications and U.S. Provisional Patent Application 60/643,085 are each incorporated herein by reference in their entireties.

FIELD

The present invention relates to systems and methods for delivery of enhanced television content to subscribers.

BACKGROUND

Interactive television (iTV) is currently available in varying forms and there is perhaps no single, universally accepted definition for this term. Most, however, would agree that iTV systems combine, in some form or other, the passive viewing experience of traditional TV viewing with the interactive nature of external data and content sources such as the World Wide Web. Thus, in different implementations, iTV might allow viewers (perhaps more appropriately termed subscribers) to review local news headlines or weather forecasts while watching their favorite television shows, to chat with other viewers about the latest plot twists. Many cable and satellite TV providers have deployed iTV systems that allow subscribers to order products seen in commercials or video on demand presentations with the click of a remote control button. And certainly all iTV systems have a version of an interactive program guide that allows subscribers to learn about and select desired programming. The terminology used to describe the various elements within the iTV services and applications landscape is varied and a glossary of terms used herein is set forth in Appendix A.

A specific service offered within the iTV landscape is enhanced TV (ETV) broadcasting that provides interactive content linked to video programming. A user can request information on products within ads, access additional program information such as sports statistics, or otherwise interact with a television broadcast such as a game or reality based show. This functionality is achieved through the execution and transmission of an ETV application and corresponding data sent in the broadcast channel or other mechanism along with the video broadcast.

These and other iTV services are deployed as a set of applications over the service provider's network. Such applications are received at the subscriber's premises via a set-top box or similar device, where they are interpreted (compiled), executed and the corresponding data is displayed on a television.

Many applications may be presented to end users via a common user interface and order/transaction entry and tracking system. However, each application has specific integration, management and distribution issues that arise depending on the environment that the network operators choose to deploy and significant problems are experienced by application providers and distributors in deploying and managing their ETV applications as a result. Stated differently, application providers and distributors face problems in developing and managing their ETV applications because there exists a proliferation of technologies and standards for the delivery of ETV applications and different network operators have chosen to deploy different combinations of these technologies. For example, ETV application providers must cope with networks that have been cobbled together with different technologies such as:

1. Head-end technology from different providers such as Motorola, Scientific Atlanta, Harmonic, etc.
2. Set-top boxes from different manufacturers such as Motorola, Scientific Atlanta, Pace, Pioneer, AOL, etc.
3. Various combinations of network topologies such as cable, satellite, terrestrial, and telco, etc.
4. Middleware from providers such as Liberate, OpenTV, MSTV, Canal+, Worldgate, etc.
5. VOD server providers from vendors such as SeaChange, Concurrent, nCube, Diva, etc.
6. Billing systems from companies such as Convergys, CSG, DST, etc.
7. Conditional access systems from vendors such as NDS, Harmonic, etc.
8. Differeing application content standards such as HTML, XHTML, XML, ECMAScript, OCAP, MHP, ATVEF, DASE, etc.
9. Various programming languages, such as Java, C, C++, etc.

Content providers and application developers must navigate through this maze of often incompatible and unique combinations of the equipment, technologies and standards, and often must develop a unique and different application for each such combination that they wish to target. For their part, network operators must deploy, configure, manage and operate ETV applications on each different network configuration individually, increasing cost, complexity, and staffing needs, while reducing the number of service that can be deployed, and the quality of those services.

System operators must manage the applications within the ETV service. Middleware solutions alone allow only for a collection of applications to be deployed. There is no provision for creating a system of applications that address the following issues:

1. Application validation, which govern rights for application deployment and behavior on the system;
2. High-level views of content placement opportunities across an entire system of applications, an example of which may be the ability for the system operator to "see" advertisement locations across an entire system of applications where that set of applications may have come from a multitude of sources; and
3. Mechanisms for quickly resolving and distributing content to an application from a multitude of content sources.

Another significant problem for the deployment of ETV applications in the United States is that the majority of in-service set-top boxes, such as the Motorola DCT1200 and DCT2000 families and the Scientific Atlanta Explorer 2000, Explorer 2100, Explorer 3000 and Explorer 3100 families, have relatively low power (e.g., slow clock speed) processors and a limited amount of onboard memory (both flash memory and DRAM) with which to store and process ETV applications. For example, many distributed applications may not be executable on various set-top boxes due to the memory and processing requirements to compile or otherwise interpret the application and data for proper display. These set-top limitations make it very difficult to support the features, functions and viewer response times for ETV applications that are required for a compelling and rich user experience.

SUMMARY

In one embodiment, the present invention provides an interactive television system (iTV) in which a user agent on a client device may execute computer-readable instructions formatted in a binary interchange format (BIF) of an enhanced television BIF (EBIF) application. The computer-readable instructions are interpreted directly and without additional compilation. The user agent may directly interpret the computer-readable instructions by processing the EBIF application directly in a set-top box memory. In one embodiment, the user agent may be configured based on the set-top box platform. Processing the EBIF application may further include the user agent identifying the set-top box platform and processing a corresponding platform specific portion of the EBIF application. Additionally, processing the EBIF application may include processing a common binary portion of the EBIF application that is executable independent of the set-top box platform and corresponding user agent.

In one embodiment, processing the EBIF application may include identifying a content programming engine based on a key identifier of a content reference portion of the EBIF application, wherein the content programming engine may be associated with programmable content comprised of EBIF data located at a content publisher. The client device may then receive the programmable content in an EBIF data stream from the content publisher. The key identifier may include at least one of an organizationally unique identifier, a category identifier, or a resource identifier, and in one embodiment, the organizationally unique identifier identifies the content programming engine.

In one embodiment, the EBIF application includes container widgets configured to accept one of a plurality of widget types from the EBIF data stream.

In another embodiment, prior to rendering the EBIF application, the user agent receives a unified trigger event to signal execution of the EBIF application. The format of the unified trigger event may be independent of whether a corresponding trigger source is external or internal to the EBIF application. The EBIF application, prior to execution may also be validated against one or more application profiles according to validation rules. If the EBIF application is validated, the EBIF application is distributed to the user agent via an EBIF application deployment system, otherwise the EBIF application is rejected. Validating the EBIF application may also includes parsing only those portions of the EBIF application that have one or more private use extensions to determine if the EBIF application complies with the validation rules.

In one embodiment of the present invention, an enhanced television binary interchange format (EBIF) application encoded in a binary interchange format (BIF) is received at a user agent of a client device to display content on a display device. The EBIF application includes a content reference comprised of a key identifier that is used by the EBIF application during execution to identify a content programming engine for resolving programmable content.

BRIEF DESCRIPTION OF THE DRAWINGS

The present invention is illustrated by way of example, and not by way of limitation, in the figures of the accompanying drawings in which.

DETAILED DESCRIPTION

An example of a system is described herein in which ETV content is created and deployed using a server component adapted to allow content developers to create applications according to an authoring specification that describes a framework for same; a transport component configured to optimize and deliver the applications to one or more clients, wherein the instructions formatted according to the authoring specification are interpreted directly and without additional compilation at a client component; and the client component adapted to render the applications through a display device so as to permit user interaction therewith. The authoring specification provides for the presentation of content through one or more templates defined therein, allowing application definition and behavior to remain common across multiple client device types, middleware platforms, and/or ETV operating environments. The framework for applications accommodates advertising, promotions, content placement packages and/or programming campaign definitions, so as to permit a selection of a specific advertisement, promotion or content at a time of preparation of the ETV content by the server, and/or a time of execution of the applications by the client.

In particular, described herein is an example of a compliant system (as described by the '845 application) in which an example "client component" and "binary format" (binary interchange format—BIF) output of the optimizer are further described. The binary format specified herein may be generated by a system as described in the above-cited patent applications or may be generated by another system or generated directly. It may also be embedded directly in a broadcast stream without the aid of a system to inject the data into a separately managed data carousel. The following description provides sufficient direction to allow for the generation of application binary interchange formats (BIFs) for decoding and rendering of application content by any "application client" or now referred to as "user agent" that complies with the specification given below.

Figure 1:
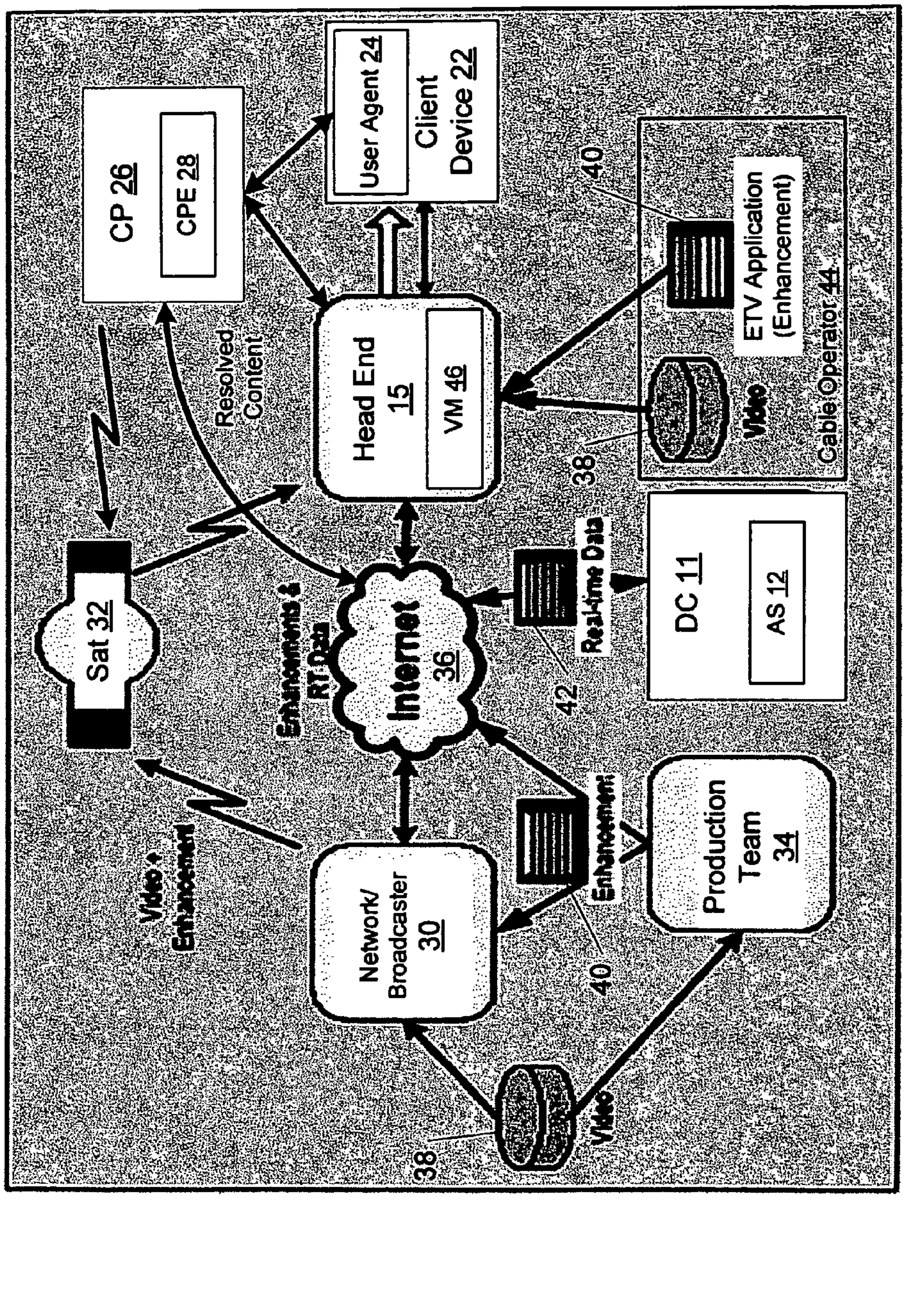
FIG. 1 illustrates an overview of the iTV application automation system.

FIG. 1 illustrates an overview of the iTV application automation system 10 discussed in detail in the '064 application. This system may be regarded as an end-to-end environment for developing, delivering and deploying iTV applications, such as ETV applications formatted in a binary interchange format (BIF), and is an example of an environment in which the methods and systems of the present invention may be deployed.

A detailed description of the operation and features of the iTV application automation system 10 is provided in part by the '064 application. To summarize the components of the '064 application, an application server (AS) 12 is responsible for programming, packaging and optimizing content for different iTV applications and platforms. Such content may be composed of templates, data and business rules packages. The iTV application data may be generated from dynamic data feeds that are delivered to the AS 12 from various content providers (e.g., via the Internet) or from local sources.

Once authored, the application packages, which may include layouts, data, ad campaigns, programming rules and directives files specific to different middleware systems, are delivered to an application proxy (AP) server 14 that may be located at a data center 11 or in a network head-end 15 (or network operator regional distribution center). At the AP 14, the applications are integrated with various network components so that they can be broadcast to subscribers. In particular, the updated EBIF application packages are delivered to a network application server (NAS) 18, also locatable at the head-end 15 or data center 11, and then broadcast through the distribution network 20 (e.g., via in-band and/or out-of-band carousels) to the client device 22. The client device 22 may be a set-top box or other device capable of executing an EBIF application to display content, including programmable content, on an integrated or separate display device.

At the client device 22, an application client, hereinafter user agent 24, is responsible for the application rendering and behavior on top of the middleware of the client device 22. In one embodiment of the present invention, when a user makes a selection to use a particular application, the client device 22 will invoke the user agent 24 and tune to the proper in-band carousel (and/or fetch from an out-of-band carousel) to retrieve the necessary application files. In another embodiment, the user agent 24 loads files directly from a local client database. In general, a file may be generally referred to as a "resource" in the EBIF spec (language included hereunder). A file (in a file system) is a specific instance of such a resource (other instantiations are possible, such as a memory region, a sequence of network packets/messages, etc). Once these files are loaded into the memory of the client device 22, the user can begin interacting with the application.

Each time a "package" of application files is created at AS 12, the package is delivered to an optimizer, which is responsible for converting the files into a highly optimized format readable by the user agent 24. The optimized package of files is then delivered to a packager, where it is prepared for delivery to the AP server 14. Alternatively, in some embodiments an MSO-deployed (multi-system operator) application management system may be used for centralized distribution and management of application assets and metadata. In such cases, the functions of the optimizer may be moved to the AP server 26, which collaborates with a packager proxy, the network application server 18 and other $3^{rd}$ party components in the network head-end to validate, filter and resolve the application assets into a highly optimized format readable by the user agent 24.

An optimization of the wire formats, also referred to as a binary interchange format (BIF), for application templates; dynamic data packages and updates; and promotional, programming campaigns and business rules are described herein as set forth in Appendix B.

The present BIF optimizations utilize an in-place display layout technique (byte array), within the wire format so that the user agent 24 can resolve widget attributes, dynamic data and business rule driven programming elements directly into the application display templates for reduced processing cycles and DRAM memory usage on the client device 22.

In addition, these BIF optimizations help to minimize memory requirements by using data in place as much as possible, minimize CPU cycles by reducing the number of in-memory moves of the data elements, minimize network bandwidth, and configure bandwidth utilization according to usage, among other benefits. As a result of these optimizations, the computer-readable instructions formatted in the BIF of an enhanced television (ETV) application may be directly interpreted without additional compilation by the user agent 24.

Additionally, FIG. 1 illustrates additional components of an embodiment of the invention, which are not illustrated in the iTV application automation system 10 as discussed in the '064 application. Specifically, the addition of these components illustrates an embodiment of the invention that shows transmission/distribution mediums Internet 36 and satellite 32, and sources, network broadcaster 30, production team 34, and cable operator 44 for BIF based applications and content. The BIF based applications are illustrated by the ETV application 40 and the content is provided via a content publisher 26 and a content programming engine 28.

In one embodiment, the head-end 15 may also include a validation module 46 to validate incoming or resident ETV BIF (EBIF) applications and default or dynamic content against an MSO or cable operator's validation profiles or policies. In other embodiments, the validation module may be located at other points in the network, such as the data center 11 or on client device 22.

The EBIF application may include a portion that may be quickly parsed for extensible elements (extensions) that may indicate the EBIF application source and its functions may be trusted. These extensions may be used to provide a "summary" of application information including the application's requirements and actions. The extensions are placed in the binary stream where less parsing is needed to locate this information. In another embodiment, the extensions may provide a link or locating reference to the location within the data to find the application information.

For example, the binary instance of an application may contain several embedded references to resources that are video on demand (VOD) asset references or the applications may contain advertising IDs. Those VOD asset reference and/or advertising IDs may be placed (or offsets to the data placed) in the EBIF application metadata so as to create a summary of references. In one embodiment, the application metadata may be required by a system operator to be placed in a fixed location within the EBIF application. Creating a summary of references in a fixed location allows for rapid filtering of the data when compared to parsing the entire document to find each reference. For example, a multi-system operator (MSO) may want to view VOD references embedded in the broadcast stream EBIF application to validate the availability of the VOD assets. In another example, the MSO may want to similarly view the advertising IDs to validate the advertising ID (and its supported campaign) against the MSO's advertising policy.

Returning to FIG. 1, enhancements, such as ETV application 40, cannot be bound to a program until after the video has been digitized for final broadcast. Furthermore, the video feeds from the major networks are often converted back to analog by a local network affiliate and then re-digitized for use by the local cable company, such as cable operator 44, losing many enhancements along the way. Networks or broadcasters, such as network/broadcaster 30, have the advantage of staying in the digital domain and have the ability to insert all enhancements at the digital encoding stage. Applications and corresponding triggers may be inserted into the video stream by the network/broadcaster 30 using synchronization triggers and play lists that are appropriate for the type of equipment used in the broadcast environment. At the same time, broadcasters may have to rely on sending those enhancements across a broadband connection to cable companies (e.g., cable operator 44) for insertion of the enhancements at the MSO head-end 15 or data center 11, for affiliates who do not preserve the full digital signal from beginning to end. Some applications can be sent ahead of time for automatic insertion on a given schedule. Others may be transmitted in real time and synchronized to live events—either by production teams, such as production team 34, directly, or via the network/broadcaster 30 or the cable operator 44 operating head-end 15.

In one embodiment of the invention, the production team 34 generates the interactive enhancements in conjunction with the studios that produce the video 38. Applications, such as ETV application 40, are often built around BIF templates for the triggers and data that are inserted by a production team. For pre-recorded shows, the application signaling and triggers are mastered during the video postproduction process before the show is broadcast. Throughout the production process, the production team uses a media timeline based on SMPTE time codes, which are used for synchronization of video tape. For live shows, the application itself may be prepared in advance, but the actual data to feed the application is inserted dynamically. For example, real-time data 42 corresponding to a question along with a set of possible answers based on the live program such as the Oscar's may read, "Who would you vote for Best Director? A: John Doe, B: Bill Smith."

In one embodiment of the invention, the templates used by authors of ETV applications, such as the production team 34 or cable operator 44, are provided in a taxonomy of metadata published by the content publisher 26. The taxonomy describes available programmable BIF content formats and classes/categories of content that may be utilized by authors for placement of programmable content into ETV BIF (EBIF) applications that are ultimately displayed to subscribers through the client device 22 (e.g., a set-top box). The CP 26 may also include multiple content programming engines (CPEs), such as CPE 28, which are identified by the BIF application executing on the client device 22 via user agent 24 to dynamically resolve the content for display. In other embodiments of the present invention, CP 26 and CPE 28 may be located in the client device 22, in the MSO head end 15, data center 11, or other network location accessible via internet protocol. The details pertaining to the CP 26 and the CPE 28 are discussed below.

Figure 2:
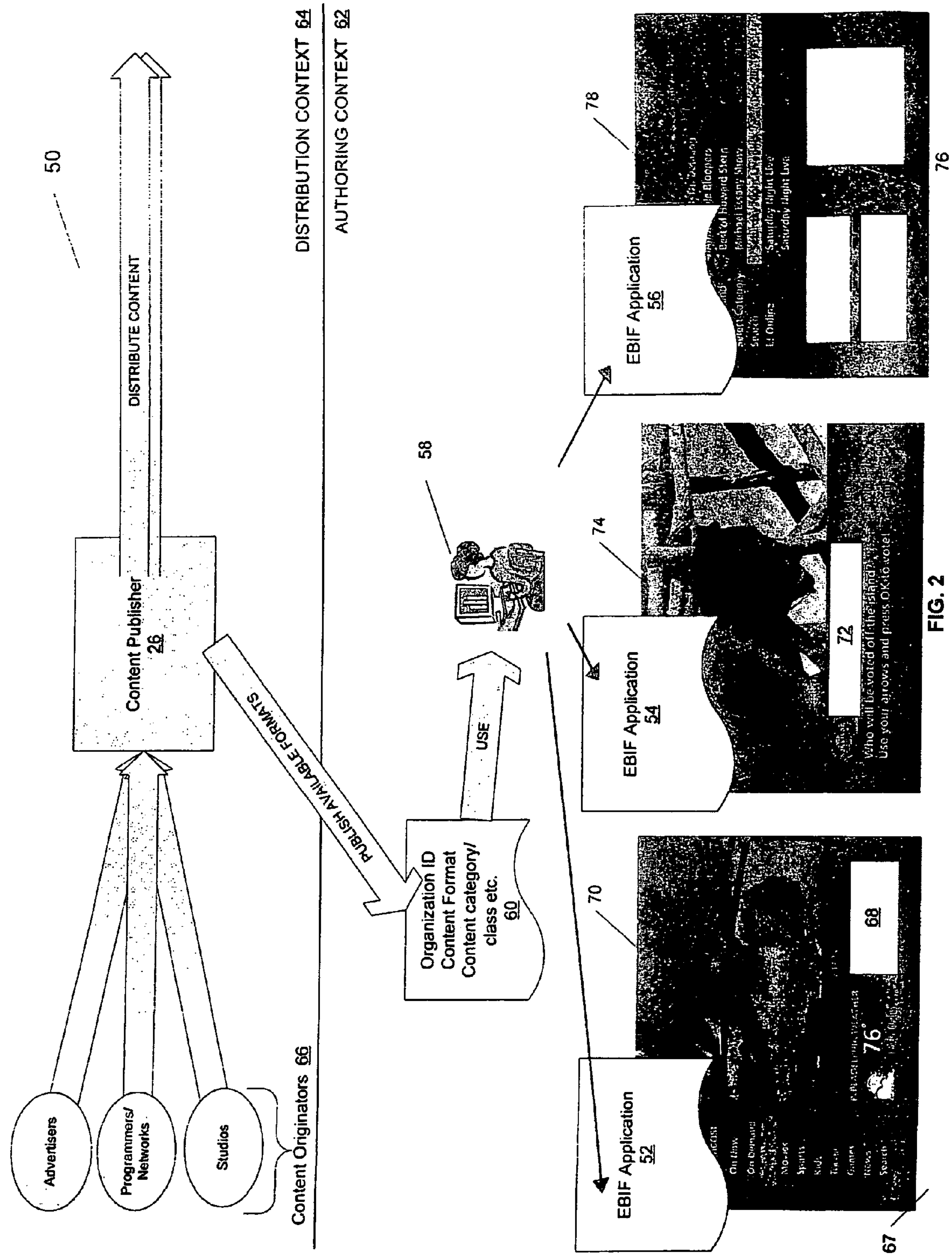
FIG. 2 illustrates an EBIF server execution context including an authoring context and a distribution context, according to one embodiment of the present invention.

FIG. 2 illustrates an EBIF server execution context 50 including an authoring context 62 and a distribution context 64, according to one embodiment of the present invention. The block diagram illustrates the relationship between the two contexts, specifically between EBIF applications 52, 54, and 56 and application authors 58 of the authoring context, and content originators 66 and the content publisher 26 of the distribution context 64. The EBIF server environment 50 may be located anywhere within the iTV application automation system 10 that would permit access by the application authors 58 and user agent 24. For example, the content publisher 26 of the EBIF server environment 50 may be in its own location, as illustrated in FIG. 1, or may be located in the data center (DC) 11.

The content publisher 26 publishes the taxonomy of metadata describing available programmable content formats and classes/categories of content that may be universally utilized by independent application authors 58 for placement of programmable content into applications such as EBIF applications 52, 54, and 56. The BIF format allows application authors 58 to create EBIF applications that include a content reference portion of extensible variable references that may be dynamically resolved into instance data or programmable content by using key identifiers composed of content publisher's organizational identification, content format, and category metadata tags.

For example, EBIF application 52 may utilize available space in an L-bar display 67 during video 70. The EBIF application 52 may include programmatic elements defining properties, attributes and functions to be associated with the available space represented here by content element 68. Some exemplary properties, attributes and functions include, but are not limited to, control elements (e.g., radio button), video on demand (VOD) links, and display format elements. These and other programmatic elements provide the framework for the display and interaction with the received programmable content. Similarly, EBIF application 54 includes a content element 72 in video 74 and EBIF application 56 includes multiple content elements 76 in menu display 78.

The CP 26 also functions as clearing house for programmable content, including receiving, organizing and delivering the programmable content. The CP 26 distributes programmable content and content programming rules to various clients (e.g., client device 22). The programming rules may be based on a user profile and include rules for placing and/or automating product offerings, promotions, advertising campaigns, VOD, broadcast-on-demand, transactional opportunities, and/or other types of content across disparate television services. The rules for placing and/or automating product offerings across disparate ETV applications may accommodate multiple selection criteria, for example: location, current channel, current channel family, current channel category, time of day, offering category, current program, current program genre, current ETV application, current content type, and subscriber profile. Further, the business rules may accommodate subscriber-specific rules according to a subscriber profile associated with a particular one of the client devices upon which the client component is resident. The business rules may be selected at any of the following instances: dynamically at the time of execution of the ETV applications, or at the time of application creation.

In another embodiment, the application author 58 may supply default content for one or all of the content elements during application creation or dynamically during application execution. In yet another embodiment, some individual formats may include complex related fields for multipart items. For example, multiple variables may be associated together so that instance resolution of the group of variables is done as a group (e.g. image, text and click-through variables as a single promotion group).

The extensible variable references are EBIF variable references encoded into or received by EBIF applications 52, 54, or 56, and are dynamically resolved into instance data by CPE 28 and displayed to a subscriber via client device 22. This powerful mechanism permits the deployment of run-time ad servers and other promotional or programming engines in an independent manner on compliant user agents 24. It also permits the deployment of any independent agents on a client, such as client device 22, and the ability to monitor EBIF streams within the application server execution context 50 upstream of a client execution context, (e.g., client execution context 80 of FIG. 3), so that these independent agents or content programming engines (e.g., CPE 28) can deliver "just-in-time" data to the client applications 24 based on the utilization of dynamic variable identifiers.

In one embodiment of the invention, the taxonomy allows for authors 58 to create EBIF applications that include platform independent portions and platform specific portions, each allowing for access to respective programmable data to be displayed on a variety of client devices (e.g., client device 22). The ability to segment applications and application data into common and platform-specific sections supports reuse of common constructs, while still allowing platform-specific specialization. For example, a decoder of the client device 22 only needs to load the common constructs and the platform-specific constructs that apply to the client device platform in order to decode and render the EBIF application. Therefore, an MSO or cable operator may only have to define an application once for use by multiple platforms and allowing a set of platforms to be extended over time without modifying the original application resources. Consequently, authors 58 in creating an EBIF application are not forced to restrict their usage to the lowest common denominator feature set and may take advantage of any available platform-specific features.

Figure 3:
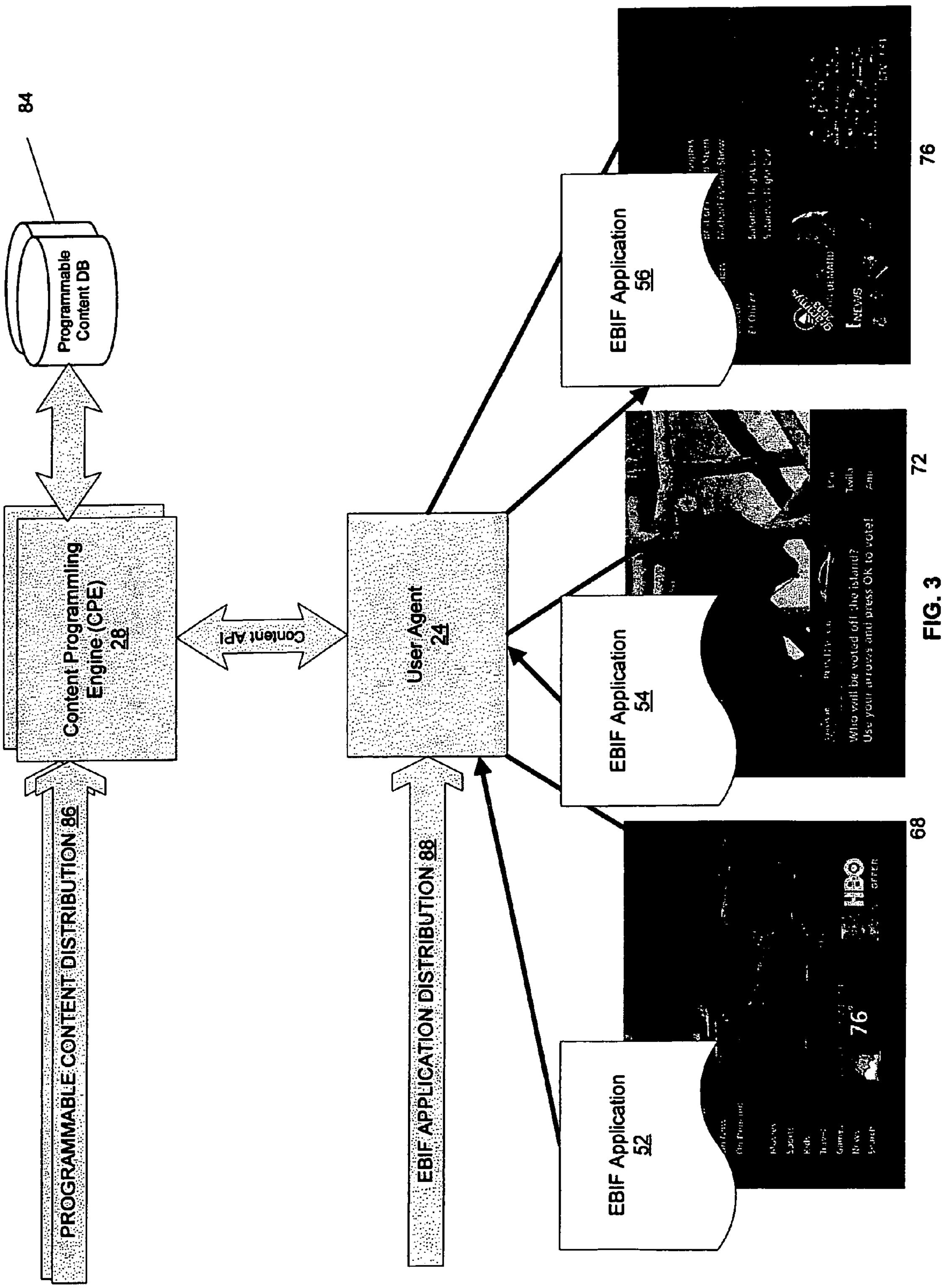
FIG. 3 illustrates a client execution context, according to one embodiment of the present invention, configured to dynamically resolve application data.

FIG. 3 illustrates a client execution context 80 for dynamically resolving application data according to one embodiment of the present invention. The user agent 82 may receive an EBIF application via EBIF application distribution 88 to execute at the client device 22. In varying embodiments, sources of the EBIF application distribution 88 may include, but are not limited to, the head-end 15, the data center 11, or the network/broadcaster 30.

A portion of the EBIF application may have data references to programmable content. Those data references will identify the content as programmable content by using a special type of extended data reference format that include the extensible variable references described above that identify the appropriate content programming engine (CPE) 28 based on the organization ID. The user agent 82 may then send a content request to the identified CPE 28 to match or resolve the programmable content from the programmable content distribution 86. Parameters supplied in the content request include the requested content format 60, such as requested content category/class, display format, organization, etc. The CPE 28 matches the programmable content based on the requested content format metadata. Upon receiving the programmable content from the CPE 28, the user agent 82 updates the application's graphical display associated with the client device 22. For example, after resolving the programmable content by the methods described herein, EBIF applications 52, 54, and 56 each show their respective programmable content in their previously empty respective content elements 68, 72, and 76.

The CPE 28 may be located at the client device 22, in the MSO head end 15, data center 11, or other network location accessible via internet protocol.

In one embodiment of the invention, the programmable content distribution 86 is transmitted from the content publisher 26 through a network, such as Internet 36, head-end 15, or satellite 32. In other embodiments, there may be multiple content publishers (e.g., CP 26) in which each have one or more content programming engines (e.g., CPE 28) engines that are responsible for their respective sets of content based on the extensible variable references as described above. In another embodiment of the invention, the programmable content may come at least one programmable content database 84 local to CPE 28.

The CPE 28 may also apply network operator policy and targeting rules based on a user profile, as discussed above. In another embodiment, the CPE may also create logs that may be accessible by the application server context 50 to track execution events of the client execution context 80.

Figure 4:
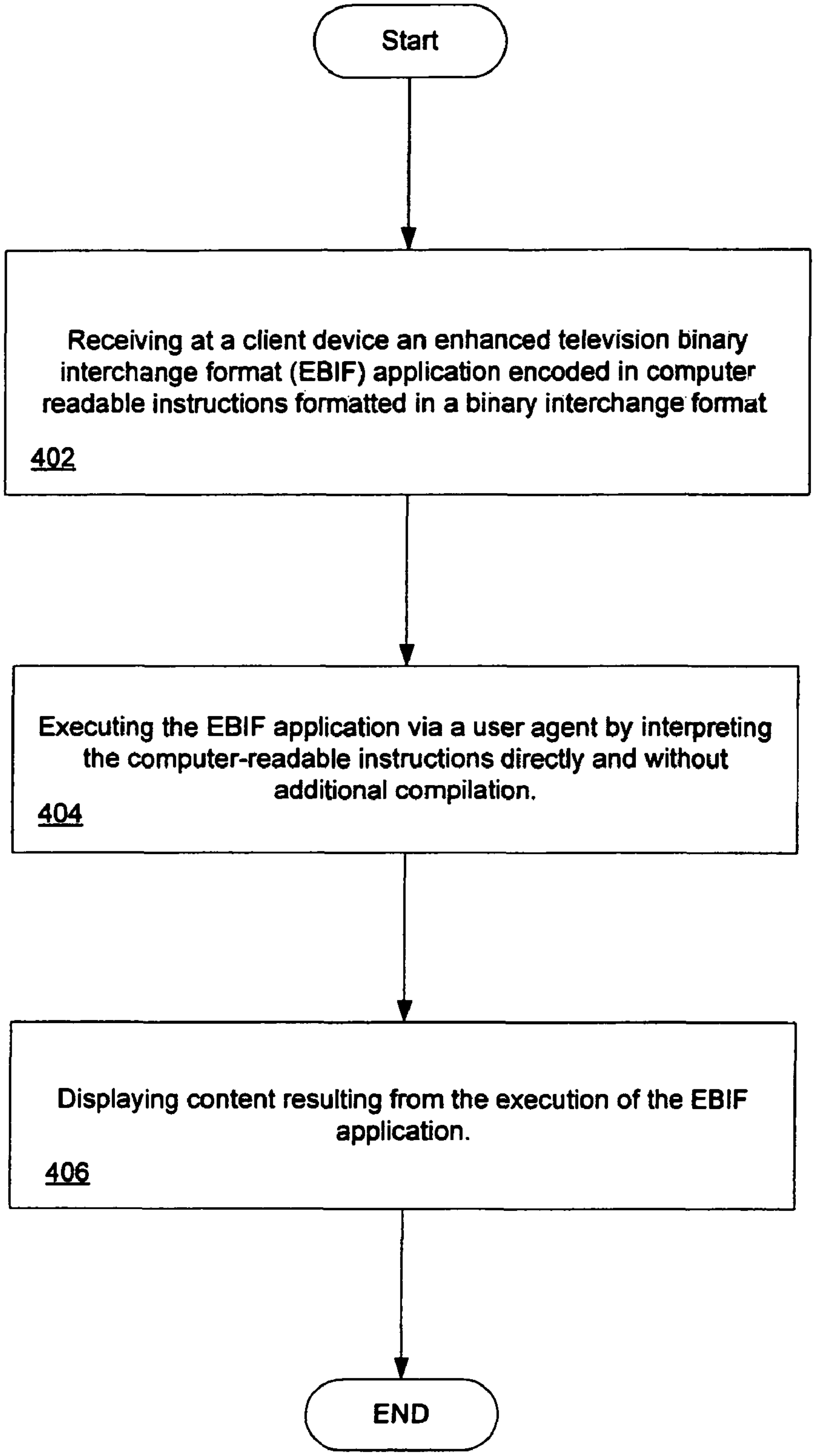
FIG. 4 is a flow chart that illustrates processing an EBIF application according to one embodiment of the present invention.

FIG. 4 is a flow chart that illustrates processing an EBIF application according to one embodiment of the present invention. At operation 402 a client device 22 receives an enhanced television binary interchange format (EBIF) application encoded in computer readable instructions formatted in a binary interchange format. The EBIF application is executed via a user agent 24 by interpreting the computer-readable instructions directly and without additional compilation, at operation 404. At operation 406, a display is updated in accordance with the execution of the EBIF application. In one embodiment, the display is communicatively coupled to the client device 22 hosting the user agent 24. In another embodiment, the client device 22 is a set-top box and the display device is a television.

Figure 5:
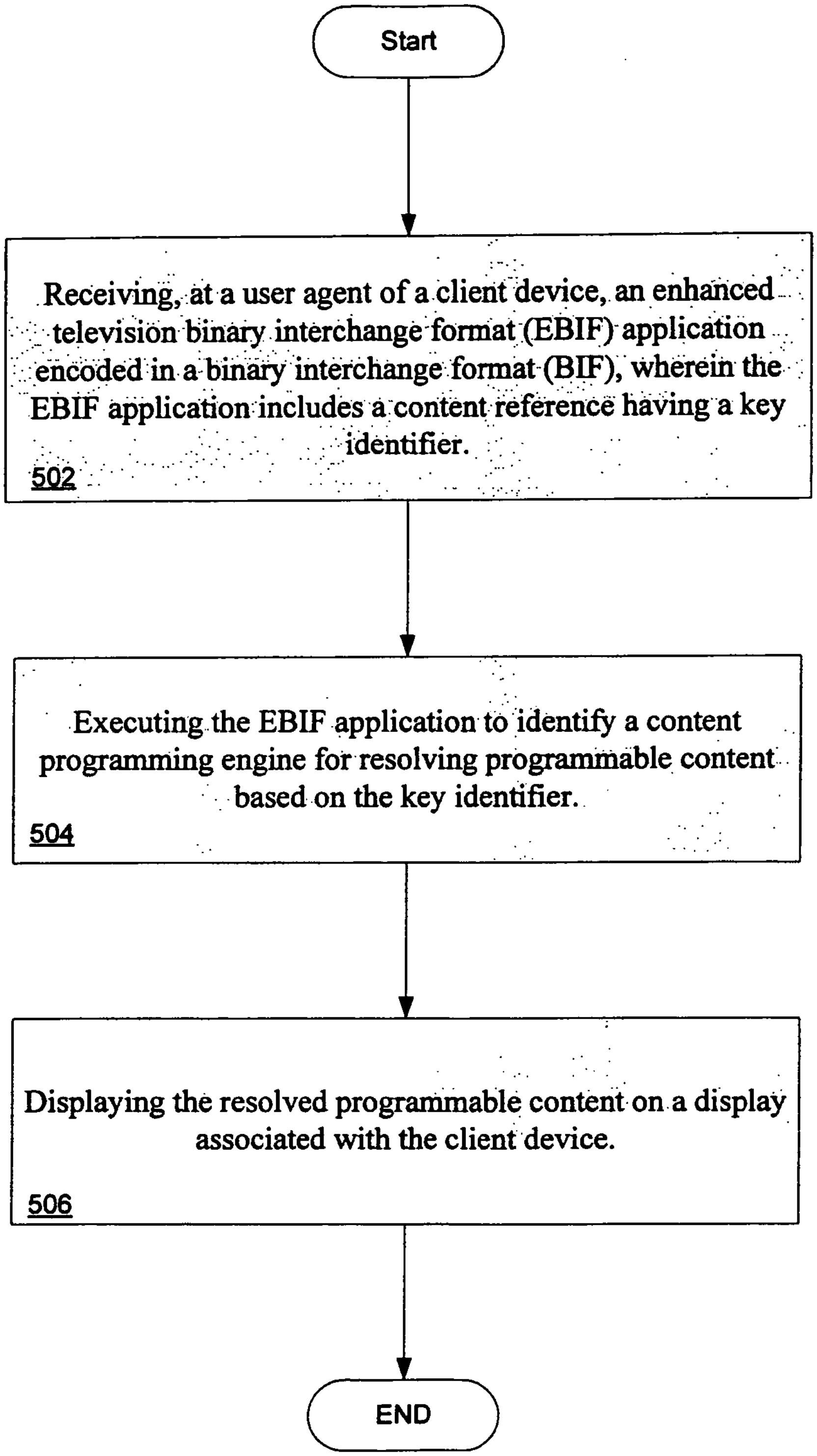
FIG. 5 is a flow chart that illustrates identifying a content programming engine that will resolve programmable content for display, according one embodiment of the present invention.

FIG. 5 is a flow chart that illustrates identifying a content programming engine 28 that will resolve programmable content for display, according one embodiment of the present invention. At operation 502, a user agent 24 of a client device 22 receives an EBIF application encoded in a binary interchange format (BIF), wherein the EBIF application includes a content reference having a key identifier. The EBIF application is executed, at operation 504, by the user agent 24 to identify a content programming engine 28 for resolving programmable content based on the key identifier. At operation 506, the client device 22 displays the resolved programmable content on a display associated with the client device 22. In one embodiment, the programmable content is located at a content publisher 26. In another embodiment, the programmable content is located at a programmable content database 84.

Thus systems and methods by which content and application developers are provided a common binary interchange format (BIF) application framework that allows for the creation and execution of EBIF applications to be executed by a user agent on a client device directly and without additional compilation have been described. Additionally, systems and methods by which a key identifier is used by the EBIF application to identify a content programming engine to locate and retrieve programmable content to be displayed at the client have been described. However, although the present invention has been discussed with respect to various illustrated embodiments, it should be measured only in terms of the claims, which follow the Appendices set forth below.

APPENDIX A—GLOSSARY OF TERMS

Application: a collection of information that expresses a specific set of externally observable behavior, where the collection of information can be characterized as a set of application entities.

Application entity: a unit of information that expresses some portion of an application, e.g., an image, a set of widget specifications, a data set, a set of style specifications, a collection of logic programming constructs such as instructions or functions, etc.

application environment: the context (system) in which an application is processed; e.g., a native user agent on a terminal device, an unbounded OCAP application (and its underlying environment) that implements a user agent.

application instance: a dynamic, stateful construct that is manifested by an application environment, is (initially) constructed from some subset of the application resources associated with the application, and has a definite (and unambiguous) state in an application lifecycle state machine; multiple application instances may be constructed from a single set of application resources; when operating in a non-suspended state, an application instance is associated with at least one execution thread (flow of control);

application lifecycle: a finite state machine model of an application instance; an application lifecycle has at least two states: active (running) and inactive (not running); it may also have other sub-states such as signaled, loading, resuming (starting), suspending, suspended, terminating, terminated, etc.; transitions among states may or may not result in notifications to an application or other constructs in an application environment; changes in state may be caused by events produced by the application itself (e.g., a request to suspend or terminate), by the application environment (e.g., a power down or reboot cycle), by the application signaling (e.g., a side-effect of service selection or tuning may be that the application is no longer signaled, or an explicit signal may be sent to resume, suspend, or terminate an application instance);

application page: a logical subset of an application's entities that includes, at a minimum, a top-level, container widget (i.e., a Page widget) or container presentation construct; an application page may refer to or be associated with either (both) (1) an application partition or (and) (2) that portion of an application instance that embodies both the dynamic state of and an instantiation of the page;

application partition: the set of application resources that are interpreted in the process of rendering and interacting with an application page; such set of resources may be considered a pre-computed working set of the subset of application functionality represented by the page; in case no explicit partition is defined or if some application resource is not associated with any partition, then an implied partition is inferred;

application resource: a bit-stream serialization of an application entity; an application resource may be of bounded (determinate) or unbounded (indeterminate) length; e.g., a PNG image resource, a serialized XML resource, a binary interchange form of an application, etc.; an application resource is included in one or more application partitions, including the implied partition in case a resource is not explicitly associated with a partition;

authoring interchange format: the set of application resource types and their syntactic schemas and associated semantics that support efficient interchange and processing of an application for the purpose of creating (authoring) an application and distributing the application amongst different authoring and post-production subsystems; an authoring interchange form is contrasted with a binary interchange form; an authoring interchange form may be compiled into a binary interchange format, however, the converse does not necessarily hold, or if it does hold, then, some loss of generality would be expected;

binary interchange format: the set of application resource types and their syntactic schemas and associated semantics that support efficient interchange and decoding of an application for the purpose of distributing an application to a user agent; a binary interchange format is contrasted with an author interchange format;

bounded resource: an application resource of determinate length;

construct: an abstract entity or its reification (i.e., concrete form) that has the characteristic of being formalizable for the purpose of specification, i.e., a value for which a data type may be constructed or deduced;

environment resource: a physical or logical component of an application environment; e.g., the graphics frame-buffer or a region of the graphics frame-buffer, an input device, a shared semaphore, etc.;

generic platform: a designation of a logical platform that is independent from any concrete platform; every concrete platform is expected to support all parameters of the generic platform's platform parameter set;

implied partition: a partition inferred by a user agent in case an application defines no explicit partition or some application resource is not associated with any partition;

interchange: the distribution of information between a transmitting and a receiving entity;

logic programming construct: an information structure (either in its logical or bit-serialized form) that specifies a collection or sequence of imperative actions to be performed by an application environment on behalf of an application instance;

partition: see application partition;

platform parameter set: a collection of parameters intended to characterize a range of capabilities or features of a logical or concrete platform;

presentation construct: an information structure (either in its logical or bit-serialized form) that specifies some combination of declarative layout, style, and content intended to be presented by an application environment on behalf of an application instance;

resource: an application resource or an environment resource;

resource identifier: an key used to uniquely identify a resource in the context of a single application;

resource locator: a specification that describes how to obtain (locate) a resource; a resource locator specifies or implies two parameters: (1) a resource access protocol (or scheme) and (2) a protocol (or scheme) specific sub-locator; e.g., a DSM-CC Data Carousel locator implies use of the DSM-CC U-N Download Protocol and would include sub-parameters that define carousel id, group id, and module id;

root container: a graphical user interface construct that represents either the grarphics plane of a display system or a top-level region (window) of the graphics plane, which establishes a coordinate space for its constituent constructs and which implies clipping of content drawn therein;

structure: a specific bit-serial representation of some application entity (construct) or sub-entity (sub-construct); an application resource is typically defined in terms of an (ordered or unordered) sequence of structures and sub-structures;

sub-structure: a structure embedded within another structure;

unbounded resource: an application resource of indeterminate length, e.g., a stream of asynchronous events, a streaming video stream, etc.;

widget: a user interface construct that is typically, but not necessarily associated with some direct presentation semantic; e.g., a button widget and an input text field widget have presentation semantics, whereas a hidden field widget and a timer widget do not; a widget may be specified by a set of static properties necessary to construct an instance of the widget in a user agent (or authoring station); a widget may also be associated with a set of dynamic properties that may change value as a consequence of user events, system events, or programmatic actions applied to the widget (e.g., mutating the value of a widget under control of a logic programming construct); a widget may be associated with either or both a presentation construct and a logic programming construct;

widget specification: a collection of information consisting of (1) a widget type, (2) a set of widget properties, and (3) an optional context, which are collectively sufficient for a user agent (or authoring station) to construct an instance of the widget; the same widget specification may be used to create multiple instances of a widget (either synchronically or diachronically);

user agent: an embodiment of an application environment that is capable of instantiating applications, and of interpreting and rendering the presentation constructs and of executing the logic programming constructs specified by an application;

user interface: the collection of presentation constructs and their associated logic programming constructs which collectively embody a means for an end user to interact with an application or an application environment or some part thereof;

user interface construct: a construct that has a direct or indirect role in the manfestation of a user interface.

APPENDIX—B

Each concrete syntactic construct defined in this specification is described using a formal notation based upon C Language structures, but extended with both conditional and loop constructs. Each structure and each data element (field) of a structure is given an informative, descriptive name. In addition, the number of bits and its serialization data type are specified for each data element.

The following conditional and loop constructs are employed:

| | |
|---|---|
| if ( condition ) {<br>data_element<br>} | If the condition is true, then the first group of data elements occurs next in the data stream. |
| else {<br>data_element<br>} | If the condition of the preceding conditional construct is not true, then the second group of data elements occurs next in the data stream. |
| for ( i = 0; i < n; i++ ) {<br>data_element<br>} | The group of data elements occurs n times. Conditional constructs within the group of data elements may depend on the value of the loop control variable i, which is set to zero for the first occurrence, incremented by 1 for the second occurrence, and so forth. |

The following notations are employed when referencing certain data elements:

| | |
|---|---|
| data_element[ ] | data_element[ ] is an array of data. The number of data elements is indicated by the context. |
| data_element[n] | data_element[n] is the n + 1th element of an array of data. |
| data_element [m . . . n] | is the inclusive range of bits between bit m and bit n in the data_element. |

If a data_element is marked in this document as being reserved for future standardization, then the data element SHALL be set to all ‘1’ bits when the resource in which the data element resides is marked as being associated with this version of the specification. In future revisions of this specification, such data elements MAY be reallocated for standardized usage, in which case they may be set to other values. In such a case, the minor version number or major version number of the EBI resource format defined by the future revision of this specification SHALL be changed to a numerically greater value. A user agent implemented for a particular major and minor version of the EBI resource format SHALL not assume that content marked as using the same major version but greater values of the minor version will specify all ‘1’ bits in such data elements.

Applications

An application consists of a collection of resources that combine parametric and programmatic data in order to define a set of behaviors that is typically (but not necessarily) presented to an end-user in the form of a user interface, the operation of which may result in changing the state of the user interface and/or the platform on which or on behalf of which the user interface is being presented.

In addition to application resources, which serve as static or semi-static state used in instantiation processing, an application may be instantiated, in which case it is also associated with dynamic state that is unique to a specific application instance. A given set of application resources may be shared between multiple applications composing an application set; furthermore, the same set of application resources may be used to create multiple, concurrent instantiations of a single application.

An application is instantiated and subsequently processed by decoding its resources and performing certain predefined behavior such as rendering widgets specified by presentation constructs and executing programmatic constructs in response to events. An application may consist solely of parametric data, and leave all event processing behavior to default, built-in handlers rather than providing application defined handlers.

Metadata

An application may be associated with the following metadata:

Application Type
Initial Page Resource Reference
Languages Supported
Minimum Profile Required
Originating Organization’s Application Identifier
Originating Organization Identifier
Platforms Supported In addition, an application MAY be associated with the following optional metadata:

Creation Date and Time
Expiration Date and Time
Digital Signature
Priority
Title Name
Title Image (Icon)

One or more title names and images MAY be used, in which case each name and image SHALL be associated with a distinct language identifier.

Resources

The concept of resource refers to either an application information entity or an application environment entity. This section focuses upon the former.

An application information entity that is serialized into a bit-stream (more commonly as an octet-stream) is referred to as an application resource. If an application resource is bounded in length, then it may be represented as a file in a file system, a module in a data carousel, a continuous block in a memory system, and so forth. If it is unbounded in length, then it may be represented as a stream of octets or of message units serialized onto some continuous media or network stream.

Metadata

An application resource SHALL be associated with the following metadata:

Content Type
Label
Length (in octets, or special value INDEFINITE)

In addition, an application resource MAY be associated with the following optional metadata:

Creation Date and Time
Digital Signature
Expiration Date and Time
Last Modification Date and Time
No Cache Directive Content Types Each application resource SHALL specify its content type and SHALL adhere to the normative definition of the bit serialization of that content type.

A user agent MAY ignore a resource labelled with an unrecognized content type; furthermore, a user agent SHOULD ignore a resource that does not conform to the normative definition of the bit serialization of its indicated content type.

The following categories of content types are defined for use with an application, and are further described in the following sub-sections:

Enhanced Television Binary Interchange (EBI) Common Resource Format

Image Formats

Font Formats

Common Resource Format

The primary data that composes an application adheres to the Enhanced Television Binary Interchange (EBI) Common Resource Format as defined by Section 0 of this specification. This common resource format is used for a number of different purposes, where each of these purposes is labelled as a distinct EBI resource type:

Page Resource

Data Resource

Platform Resource

External Tables Resource

Note: See the prType field of the ebipreamble( ) structure, defined by Table 2 Preamble, for information on how this resource usage information is expressed.

Page Resource

A page resource defines the primary presentation and programmatic data of an application partition.

A page resource SHALL contain at least one widget table whose first entry references a Page widget.

Data Resource

A data resource is used to populate templatized constructs in an application page by means of the reference table, through which entries in a data resource are referenced. A data resource SHALL contain at least one generic data table, and MAY contain any of the following additional tables: metadata table, platform directory table, reference table, and resource locator table.

Note: See Section 0, Generic Data Table, for further information on a generic data table.

No standard semantics are prescribed for a table of any other type in a data resource.

Platform Resource

A platform resource is used to deliver one or more platform-specific sections in an external resource rather than embedded within the common section of a resource.

A platform resource SHALL contain a platform directory table in its common section that enumerates every platform-specific section contained within the resource.

External Tables Resource

An external tables resource is used to deliver table(s) in an external resource rather than embedded within the resource in whose table directory they are listed.

Every entry of the table directory of an external tables resource SHALL specify an internal table.

Labeling

Each application resource SHALL be labeled using an identifier that is locally unique within the context of an application or within the context of an application set in the case that multiple applications are defined over a shared set of application resources.

Referencing

Within an application or an application set, an application resource MAY be referenced by using the same locally unique identifier that serves to label the resource, where the scope of uniqueness is the application or application set.

References to external resources or resources in other applications not in the current application set SHALL employ a locator that resolves to the referenced resource, where the locator adheres to the syntax defined by Table 88 Locator Structure.

Packaging

No resource packaging mechanism is defined by this specification. An application delivery system (not defined by this specification) MAY make use of a packaging mechanism.

Persistence

With the exception of a user profile resource, all resource types are considered non-persistent across application instances.

A user agent SHOULD cache a user profile resource in a manner that allows association of the resource with the current end-user.

Notwithstanding the above, a user agent MAY cache resources unless explicitly signaled with a no cache directive metadata item.

An application SHALL NOT assume that any resource is or can be persisted by a user agent.

User Agent

The component that performs application instantiation, decoding, and processing is referred to as a user agent. This user agent implements an application environment that embodies a combination of a presentation engine and an execution engine, where the presentation engine is responsible for decoding, formatting, and rendering user interface constructs, such as widgets, and the execution engine is responsible for processing programmatic constructs. Although the user agent contains an execution engine, the programmatic constructs of an application serve a secondary, rather than primary function.

Profiles

This specification makes use of the concept of a profile, which is defined as a specific set of functionality. The following profile designations are defined by this specification:

BASELINE

FULL

ADVANCED

A user agent SHALL implement the BASELINE profile, whose functional constituents are defined by this specification. In addition to the BASELINE profile, a user agent MAY implement the FULL profile or both the FULL and ADVANCED profiles. When specified, the FULL profile SHALL be a proper, functional superset of the BASELINE profile; similarly, the ADVANCED profile SHALL be a proper, functional superset of the FULL profile.

Note: It is expected that additional, related specifications will define the functional constituents of the FULL and ADVANCED profiles.

Each application SHALL indicate the minimum profile required for it to accomplish its intended behavior. An application SHOULD be designed to accommodate user agents that implement only the BASELINE profile, and, if necessary, reduce the application's functionality to a level that can be accommodated by this profile.

Note: By making use of constructs defined below, an application may be designed to support multiple profiles, and to take advantage of functionality only available on user agents that support higher level profiles.

Platforms

Each user agent operates in the context of a platform which is a combination of hardware and software components that embody a user agent implementation. A given user agent on some platform implements one or more profiles defined above, including the BASELINE profile as defined in full by this specification.

A given application MAY be specifically authored to take advantage of specific implementation details of some platform, such as available memory size, supported image decoders, supported graphics resolutions, and so on. A platform is designated using the following parameters:

Hardware Manufacturer
Hardware Model
Hardware Version
Software Manufacturer
Software Model
Software Version The manufacturers of the hardware and software subsystems of a platform SHALL be designated by using either an organizationally unique identifier (OUI) or one of the special values of zero or all ones, as described further below. The user agent SHALL provide a mechanism by means of which an application can programmatically determine the hardware and software manufacturer, model, and version information associated with the platform.

Every application SHALL specify a list of one or more platforms on which the application is eligible to operate. This list of platforms SHOULD include a designation of the generic platform, which is indicated by using zero values for all of the above parameters. If an application is designed to operate on all manufacturers, models, or versions, then the special value of all ones MAY be used as a wildcard for any of the above parameters.

For each platform defined for use with this specification, a platform parameter set SHALL be defined. A platform parameter set defines values for the following platform parameters:

Graphics Resolution
Form Submission Methods
Number of Palette Entries
Resident Fonts
Supported Color Modes
Supported Image Formats
Supported Locator Types
Supported URI Schemes
Supported Video Scaling The parameter set for the generic platorm as well as a number of other common platforms is defined in Annex C, Platform Parameter Sets.

Loading

An application is loaded by loading its initial page resource. An application's initial page MAY be loaded as follows, where the indicated algorithm is intended to be informative. A user agent MAY implement any alternative algorithm provided that all mandatory presentation and execution behavior is obtained.

(1) acquire application signaling that contains the initial page resource reference application metadata item, then set temporary variable current resource reference to that reference;
(2) acquire and load preamble and common section of resource referenced by current resource reference;
(3) find platform directory table in common section table directory;
(4) find entry in platform directory table that matches user agent platform and profile;
(5) allocate memory image of sufficient length to contiguously store both common and platform-specific sections as expressed by minimum length column of platform directory table entry;
(6) copy common section of initial page resource into memory image at offset 0;
(7) if platform-specific section is contained in the current resource, then copy it into the memory image immediately following the common section; otherwise, set current resource reference to resource containing platform-specific section, then repeat steps (2) through (4) and current step (7) on the platform resource;

An example of loading an application page using a single page resource that contains both common section and the applicable pl.atform-specific section is shown in Page Load—Single Resource.

Page Load-Single Resource

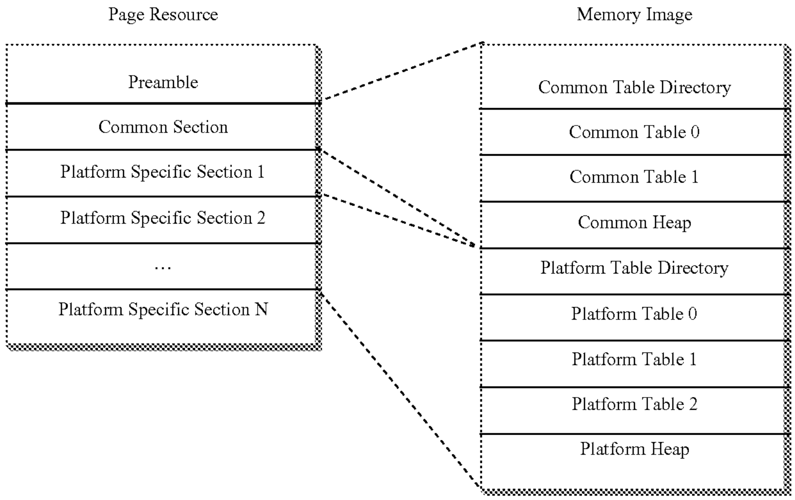

In the above example, the initial page resource contains a platform-specific section that is compatible with the user agent's platform and profile. This section is the second platform-specific section contained in the resource.

An example of loading an application page using multiple resources that separately contain the common section and the applicable platform-specific section is shown in Page Load—Multiple Resources.

Page Load-Multiple Resources

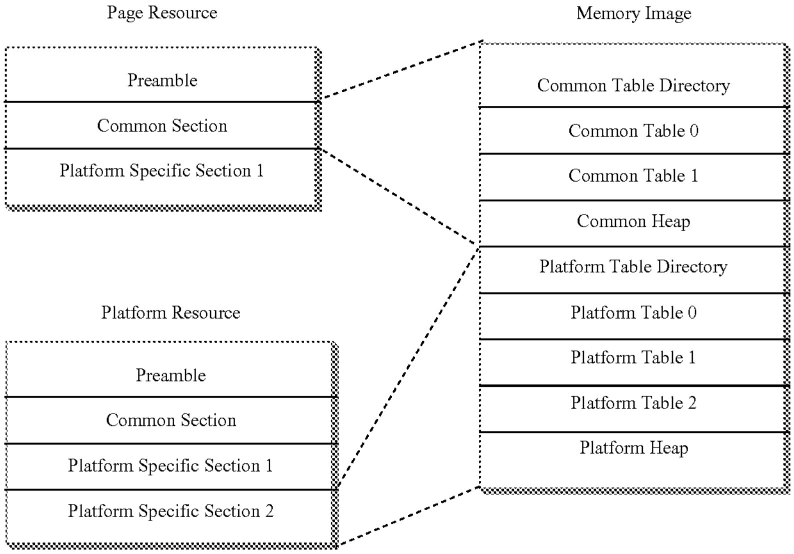

In the above example, the initial page resource does not contain a platform-specific section that is compatible with the user agent's platform and profile; however, it does refer to another platform resource that does contain a usable section. This section is the second platform-specific section contained in the platform resource.

Common Data Types

---

Informative: This section defines a set of common data types used by varioius constructs defined by this specification.

---

Boolean

The boolean data type consists of the two values TRUE and FALSE. When serialized into a section's heap, this type SHALL be encoded as a single octet, where the value 255 denotes TRUE and the value 0 denotes FALSE.

Number

The number data type consists of the union of two sub-types, integer and real, defined in the following sub-sections.

Integer

The integer data type consists of the union of six sub-types, signed byte, signed short, signed long, unsigned byte, unsigned short, and unsigned long, defined in the following sub-sections.

Signed Byte

The signed byte data type consists of the signed integer values −128 through 127. When serialized into a section's heap, this type SHALL be encoded as a 2's-complement signed integer using a single octet.

The name int8 is used as an alias for the signed byte type name.

Signed Short

The signed short data type consists of the signed integer values −32,768 through 32,767. When serialized into a section's heap, this type SHALL be encoded as a 2's-complement signed integer using two octets, with the most significant bits appearing in the first octet and the least significant bits appearing in the second octet.

The name int16 is used as an alias for the signed short type name.

Signed Long

The signed long data type consists of the signed integer values −2,147,483,648 through 2,147,483,647. When serialized into a section's heap, this type SHALL be encoded as a 2's-complement signed integer using four octets, with the most significant bits appearing in the first octet and the least significant bits appearing in the fourth octet.

The name int32 is used as an alias for the signed long type name.

Unsigned Byte

The unsigned byte data type consists of the unsigned integer values 0 through 255. When serialized into a section's heap, this type SHALL be encoded as a 2's-complement unsigned integer using a single octet.

The name uint8 is used as an alias for the unsigned byte type name.

Unsigned Short

The unsigned short data type consists of the unsigned integer values 0 through 65,535. When serialized into a section's heap, this type SHALL be encoded as a 2's-complement unsigned integer using two octets, with the most significant bits appearing in the first octet and the least significant bits appearing in the second octet.

The name uint16 is used as an alias for the unsigned short type name.

Unsigned Long

The unsigned long data type consists of the unsigned integer values 0 through 4,294,967,295. When serialized into a section's heap, this type SHALL be encoded as a 2's-complement unsigned integer using four octets, with the most significant bits appearing in the first octet and the least significant bits appearing in the fourth octet.

The name uint32 is used as an alias for the unsigned long type name.

Real

The real data type consists of the union of two sub-types, single and double, defined in the following sub-sections.

Single

The single data type consists of the positive and negative finite real values in the precision range [1.40239846E−45, 3.40282347E+38] and the special values NOT A NUMBER, NEGATIVE INFINITY, and POSITIVE INFINITY. When serialized into a section's heap, this type SHALL be encoded in a sequence of 4 octets in accordance with IEEE 754 (Standard for Binary Floating-Point Arithmetic, 1985, IEEE), Single Precision Bit Layout, with the sign appearing as the most significant bit of the the first octet and the least significant bits of the mantissa appearing in the fourth octet.

The name real32 is used as an alias for the single type name.

Double

The double data type consists of the positive and negative finite real values in the precision range [4.94065645841246544E−324, 1.79769313486231570E+308] and the special values NOT A NUMBER, NEGATIVE INFINITY, and POSITIVE INFINITY. When serialized into a section's heap, this type SHALL be encoded in a sequence of 8 octets in accordance with IEEE 754 (Standard for Binary Floating-Point Arithmetic, 1985, IEEE), Double Precision Bit Layout, with the sign appearing as the most significant bit of the the first octet and the least significant bits of the mantissa appearing in the eighth octet.

The name real64 is used as an alias for the double type name.

Character

The character data type is an enumeration type defined over the range of integers 0 through 1,114,111 (inclusive), where each value in this range denotes either an assigned Unicode (Unicode Standard, Version 4.0) character or the special value NOT ASSIGNED. When serialized into a section's heap, this type SHALL be encoded using the UTF-32 encoding of the character as defined by Unicode, §3.9, Unicode Encoding Forms. The special value NOT ASSIGNED has no defined serialization, and attempts to serialize it SHALL be considered an error.

Note: A user agent is not required to use UTF-32 as its internal representation of character values. In particular, it may use other encoding formats as desired, such as UTF-8 or UTF-16, as defined by Unicode, §3.9, Unicode Encoding Forms. Whichever encoding is used in the internal representation of character values, it must be capable of correctly representing the entire range of values without loss of information.

String

The string data type is an array of zero or more characters as defined by the character data type above. When serialized into a section's heap, this type SHALL be encoded as follows:

TABLE 1

Encoded String

| Syntax | Number of bits | Format |
|---|---|---|
| typeEncodedString( ) { | | |
| esByteCount | 16 | uimsbf |
| for (i = 0; i < esByteCount; i++) { | | |
| esByte[ ] | 8 | uimsbf |
| } | | |
| } | | |

esByteCount: An unsigned integer that denotes the number of bytes in the encoded string.

esByte[ ]: An array of bytes that consists of the UTF-8 form of the encoded string as defined by Unicode, §3.9, Unicode Encoding Forms. This array of bytes SHALL NOT contain a NUL termination byte (0x00).

The serialized form of the empty string (" ") consists of the 16-bit esByteCount field containing the value 0x0000.

Note: A user agent is not required to use UTF-8 as its internal representation of character values. In particular, it may use other encoding formats as desired, such as UTF-16 or UTF-32, as defined by Unicode, §3.9, Unicode Encoding Forms. Whichever encoding is used in the internal representation of string values, it must be capable of correctly representing the entire range of values without loss of information.

Common Resource Format

An EBI resource consists of a preamble followed by a common section and zero or more platform-specific sections in the order:

Preamble

Common Section

Platform-Specific 1 Section . . . Platform-Specific N Section

The common section and each platform-specific section consist of the following constructs in the specified order:

Table Directory

Table 0 . . . Table N−1

Heap

The syntax and semantics of the preamble, table directory, and standardized tables are defined in the sub-sections of this section. Each section MAY additionally contain a non-empty heap, into which various constructs are placed that are referenced by tables or by heap constructs.

An example of the organization of an EBI resource containing two tables in the common section and a number of additional platform specifric sections is shown in Common Resource Format Example.

Common Resource Format Example

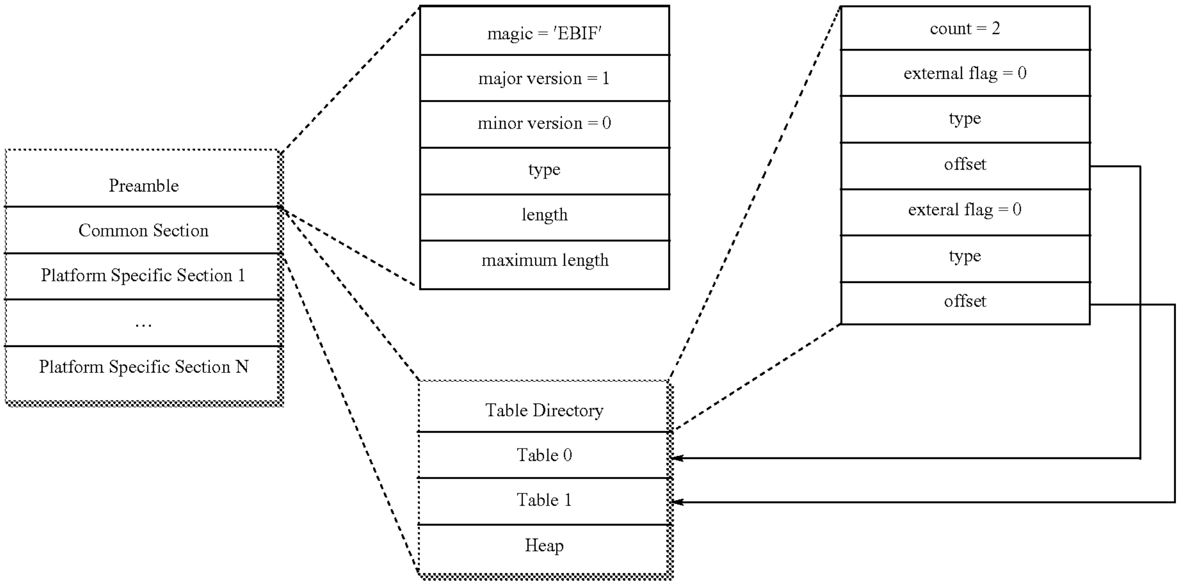

In the above example, the table directory contained in the common section has two entries, each referring to an internal table embedded within the common section.

An additional example of a table directory that references an external table is shown in Resource Locator Table Example.

Preamble

The preamble of an EBI resource SHALL adhere to the syntax specified by Table 2 Preamble.

TABLE 2

| Preamble | | |
|---|---|---|
| Syntax | Number of bits | Format |
| ebiPreamble( ) { | | |
| prMagic | 32 | uimsbf |
| prMajor | 8 | uimsbf |
| prMinor | 8 | uimsbf |
| prCriticalPrivateUse | 1 | bslbf |
| prCriticalReservedExtension | 1 | bslbf |
| prReserved | 6 | bslbf |
| prType | 8 | uimsbf |
| prLength | 32 | uimsbf |
| prPrivateUseScope | 24 | uimsbf |
| prPrivateUseScopeParam | 8 | uimsbf |
| } | | |

prMagic: This field SHALL be set to the constant 0x45424946 ('EBIF').

prMajor: This field specifies a major version number for the EBI resource format as a whole. This value is expected to be incremented each time a backward-incompatible revision is made to a fundamental syntactic structure of the EBI format. This revision of this specification corresponds with major version 1.

prMinor: This field specifies a minor version number for the EBI resource format as a whole. This value is expected to be incremented each time a backward-compatible revision is made to a fundamental syntactic structure of the EBI format. This revision of this specification corresponds with minor version 0.

prCriticalPrivateUse: A boolean that, if set, indicates that the use of private use features is critical for the use of this resource. If the private use specified by the prPrivateUseScope and prPrivateUseParam fields are not supported by a user agent, then this resource SHALL NOT be further processed and the user agent MAY consider this to be an error.

prCriticalReservedExtension: A boolean that, if set, indicates that the use of extensions to reserved fields is critical for the use of this resource. If a user agent does not explicitly support all features of the specific major and minor version of this EBI resource as pertains to reserved data elements and this boolean flag is set, then the resource SHALL NOT be further processed and the user agent MAY consider this to be an error.

prReserved: This field is reserved for future standardization, and SHALL be set to all "1" bits.

prType: An enumeration value indicating the type of the EBI resource, where the values of this enumeration are defined by Table 3 Resource Types.

TABLE 3

| Resource Types | |
|---|---|
| Value | Description |
| 0 | Reserved |
| 1 | page resource |
| 2 | data resource |
| 3 | platform resource |
| 4 | external tables resource |
| 6-191 | Reserved |
| 192-255 | private use |

prLength: This field specifies the length of the EBI resource in numbers of octets, including the preamble structure.

prPrivateUseScope: An unsigned integer that, if non-zero, SHALL specify an IEEE Organizationally Unique Identifier (OUI) that designates the organization in scope for the purpose of interpreting any private use value or private use feature permitted by this specification.

prPrivateUseParam: If the prPrivateUseScope field is non-zero, then this field specifies a parameter, determined solely by the private use organization in scope, that permits further qualification of the interpretation of private use values or features; otherwise, this field SHALL be set to zero (0).

Table Directory

A table directory immediately follows the preamble and SHALL adhere to the syntax specified by Table 4 Directory. The table directory SHALL be octet aligned.

TABLE 4

Table Directory

| Syntax | Number of bits | Format |
|---|---|---|
| ebiTableDirectory( ) { | | |
| tdCount | 8 | uimsbf |
| for (i = 0; i < tdCount; i++) { | | |
| tdExternal | 1 | bslbf |
| tdType | 7 | uimsbf |
| if (tdExternal == '0') | | |
| tdOffset | 24 | uimsbf |
| else | | |
| tdResourceID | 24 | uimsbf |
| } | | |
| } | | |

tdCount: An unsigned integer from 0 to 255 indicating the number of tables described by the ebiTableDirectory structure.

tdExternal: A boolean flag indicating whether this entry references an external resource containing the table or specifies an offset in the resource containing this table directory. This field SHALL be zero (0) for all entries of a table directory contained in an external tables resource.

tdType: An enumeration value indicating the type of the table described by this directory entry, where the values of this enumeration are defined by Table 5 Table Types.

tdOffset: An unsigned integer indicating the offset (in octets) from the start of this ebiTableDirectory structure to the start of the table described by this directory entry. For entries of the table directory in the common section, the value of this field SHALL be less than 65536.

tdResourceID: An application unique resource identifier corresponding to some entry of the resource locator table, where the referenced resource is an external tables resource (resource type 3) that contains the table described by this directory entry.

TABLE 5

Table Types

| Value | Description |
|---|---|
| 0 | metadata table |
| 1 | widget table |
| 2 | palette table |
| 3 | reference table |
| 4 | action table |
| 5 | trigger table |
| 6 | generic data table |
| 7 | platform directory table |

TABLE 5-continued

Table Types

| Value | Description |
|---|---|
| 8 | resource locator table |
| 9-95 | reserved |
| 96-128 | private use |

Table Format

Each table consists of the following sections in the specified order:

Table Header

Row 1 . . . Row N

Each table begins with a table header that describes the organization and length of the table. The table header SHALL adhere to the syntax specified by Table 6 Table Header. The table header SHALL be octet aligned.

TABLE 6

Table Header

| Syntax | Number of bits | Format |
|---|---|---|
| ebiTableHeader( ) { | | |
| thRows | 16 | uimsbf |
| thRowWidth | 16 | uimsbf |
| thReserved | 16 | bslbf |
| thColumns | 8 | uimsbf |
| thOffsetBase | 24 | uimsbf |
| for (i = 0; i < tdColumns; i++) { | | |
| thColumnType | 8 | uimsbf |
| tdColumnWidth | 8 | uimsbf |
| tdColumnOffset | 16 | uimsbf |
| } | | |
| } | | |

thRows: An unsigned integer indicating the number of rows in the table.

thRowWidth: An unsigned integer indicating the width (size) of each row in octets, which is constant over the table.

thReserved: This field is reserved for future standardization, and SHALL be set to all "1" bits.

thColumns: An unsigned integer indicating the number of columns in each row.

thOffsetBase: An unsigned integer that denotes an adjustment to apply to each value of a column of type 4 through 7.

thColumnType: An enumeration value indicating the data type of the column described by this column entry, where the values of this enumeration are defined by Table 7 Column Types.

TABLE 7

Column Types

| Value | Description |
|---|---|
| 0 | fixed length, unterminated ASCII string |
| 1 | 8-bit signed integer |
| 2 | 16-bit signed integer |
| 3 | 32-bit signed integer |
| 4 | 16-bit offset to unterminated UTF-8 string |
| 5 | 16-bit offset to structure |
| 6 | 24-bit offset to unterminated UTF-8 string |
| 7 | 24-bit offset to structure |
| 8 | 24-bit identifier |
| 9 | 8-bit unsigned integer |
| 10 | 16-bit unsigned integer |
| 11 | 32-bit unsigned integer |

TABLE 7-continued

| Column Types | |
|---|---|
| Value | Description |
| 12 | single precision real number |
| 13 | double precision real number |
| 14 | variable type, expressed as 32-bit union |
| 15-191 | Reserved |
| 192-255 | private use |

Note: See Section 0,

Number, for further information on representation of numeric column types. See Section 0, String, for further information on representation of string column types. In the above table, column types 4 through 7, which express an offset (in octets) to a string or structure, are added to the value of the table offset base (thOffsetBase). The resulting value expresses the offset (in octets) from the start of the Table Directory that contains the table to the string r structure.

thColumnWidth: An unsigned integer indicating the width (size) of the column in octets or zero (0) in which case the column has variable width.

thColumnOffset: An unsigned integer indicating the offset (in octets) from the start of the row to the start of the column.

Tables

This section defines the following tables used by EBI resources:

Action Table

Generic Data Table

Metadata Table

Palette Table

Platform Directory Table

Reference Table

Resource Locator Table

Trigger Table

Widget Table

Action Table

An action table defines one or more sequences (chains) of actions to execute in order to perform some procedural function. Each action sequence consists of a starting action and zero or more subsequent actions according to whether or not next actions are indicated.

A single section of an EBI resource SHALL NOT contain more than one action table. If an EBI resource contains an action table, then it SHALL follow the schema defined by Table 8 Action Table Schema. If both the common section and the selected platform-specific section of an EBI resource contain an action table, then the platform-specific action table SHALL augment the common section action table as follows: the combination of common and platform-specific action tables SHALL be interpreted as two, contiguous sub-tables of a single, logical table, where indices in the range [0,M−1] are used to address entries in the common sub-table, and indices in the range [M,N−1] are used to address entries in the platform-specific sub-table, where there are M entries in the common section action sub-table and N-M entries in the platform-specific action sub-table.

Any reference to an action table that consists of a negative number −K is considered to address entry K of the action table contained in a promotion resource, if present.

TABLE 8

| Action Table Schema | | | | |
|---|---|---|---|---|
| Column | Name | Type | Width | Offset |
| 0 | atAction | 5 | 2 | 0 |
| 1 | atNext | 2 | 2 | 2 |

atAction: An unsigned integer that, when added to the table's offset base, indicates the offset (in octets) from the start of the ebiTableDirectory structure in which this table is listed to the start of an action. Each action referenced by an action table row SHALL be some action defined by Annex A, Actions.

atNext: A signed integer that denotes the row index of the action table that references the next action to perform. If the value of this field is −1, then no action follows (i.e., this is the last action of an action sequence).

Generic Data Table

A generic data table defines a data set used to populate templatized constructs by means of data table referencees in a reference table. A generic data table MAY have any schema that adheres to the common table format.

Note: See Section 0, Data Table Reference, for further information on data table references.

Metadata Table

The metadata table defines a set of metadata properties and their associated values that apply to an application as a whole.

A single section of an EBI resource SHALL NOT contain more than one metadata table. If an EBI resource contains a metadata table, then it SHALL follow the schema defined by Table 9 Metadata Table Schema. If both the common section and the selected platform-specific section of an EBI resource contain a metadata table, then the platform-specific metadata table SHALL augment the common section metadata table as follows: if an entry in the platform-specific metadata table specifies the same property as an entry in the common metadata table, then only the platform-specific entry SHALL be used.

TABLE 9

| Metadata Table Schema | | | | |
|---|---|---|---|---|
| Column | Name | Type | Width | Offset |
| 0 | mtProperty | 0 | 3 | 0 |
| 1 | mtType | 1 | 1 | 3 |
| 2 | mtValue | 14 | 4 | 4 |

mtProperty: An identifier represented as 3 ASCII characters that designates a specific metadata property as enumerated in Table 10 Metadata Properties. All identifiers that start with a lower case letter ([a-z]) or underscore ('_') are reserved for future standardization.

TABLE 10

| Metadata Properties | | |
|---|---|---|
| roperty | ype | Description |
| fn0' | | font 0<br>resource locator index |
| fn1' | | font 1<br>resource locator index |
| fn2' | | font 2<br>resource locator index |

mtType: An enumeration value indicating the data type of the metadata property value, where the values of this enumeration are defined by Table 7 Column Types, except that the following type values are excluded: 13 (double precision real number) and 14 (variable type).

mtValue: A union value that expresses the metadata property's value. If the type specified by the mtType column occupies fewer than 4 octets, then that value is padded with zero octets on the left; e.g., if mtType is 1 (signed byte), then the single byte value is placed in the least significant byte of the mtValue field, and the 3 most significant bytes of the mtValue field are set to zero.

Palette Table

The palette table defines a set of palette entries.

A single section of an EBI resource SHALL NOT contain more than one palette table. If an EBI resource contains a palette table, then it SHALL follow the schema defined by Table 11 Palette Table Schema. If both the common section and the selected platform-specific section of an EBI resource contain a palette table, then the platform-specific palette table SHALL be used instead of the common palette table.

TABLE 11

Palette Table Schema

| Column | Name | Type | Width | Offset |
|---|---|---|---|---|
| 0 | ptAlpha | 9 | 1 | 0 |
| 1 | ptRed | 9 | 1 | 1 |
| 2 | ptGreen | 9 | 1 | 2 |
| 3 | ptBlue | 9 | 1 | 3 |

ptAlpha: An unsigned integer from 0 to 255 that designates degree of opacity, where 0 denoted completely transparent and 255 denotes completely opaque.

ptRed: An unsigned integer from 0 to 255 that designates red component of palette entry.

ptGreen: An unsigned integer from 0 to 255 that designates green component of palette entry.

ptBlue: An unsigned integer from 0 to 255 that designates blue component of palette entry.

Platform Directory Table

The platform directory table defines a mapping between a tuple that expresses platform hardware and software manufacturer, model, version, and profile and an offset to a platform-specific directory in either the current resource or an external resource referenced by the resource locator table. A platform-specific directory follows the syntax defined by Table 4 Table Directory, and expresses information about additional tables that are specific to one or more platforms.

If the platform directory table contains an entry for the generic platform, then that entry SHALL be the first entry in the table; otherwise, the order of entries is explicitly not defined. An entry refers to the generic platform if the hardware and software manufacturer, model and version columns are all zero (0).

The platform directory table SHALL NOT contain more than one entry whose columns 0 through 6 are identical in value.

The common section of an EBI resource SHALL NOT contain more than one platform directory table; furthermore, a platform-specific section of an EBI resource SHALL NOT contain a platform directory table. If an EBI resource contains a platform directory table, then it SHALL follow the schema defined by Table 12 Platform Directory Table Shema.

TABLE 12

Platform Directory Table Schema

| Column | Name | Type | Width | Offset |
|---|---|---|---|---|
| 0 | pdtHWManufacturer | 8 | 3 | 0 |
| 1 | pdtHWModel | 2 | 2 | 3 |
| 2 | pdtHWVersion | 2 | 2 | 5 |
| 3 | pdtSWManufacturer | 8 | 3 | 7 |
| 4 | pdtSWModel | 2 | 2 | 10 |
| 5 | pdtSWVersion | 2 | 2 | 12 |
| 6 | pdtProfile | 1 | 1 | 14 |
| 7 | pdtResourceID | 8 | 3 | 15 |
| 8 | pdtOffset | 7 | 3 | 18 |
| 9 | pdtMinLength | 11 | 4 | 21 |

pdtHWManufacturer: An IEEE Organizationally Unique Identifier (OUI) or one of the special values 0x000000 or 0xFFFFFF that designates the manufacturer of the hardware platform described by the current table entry. The special value 0x000000 is used in designations of a generic platform. The special value 0xFFFFFF serves as a wildcard to designate all manufacturers. A number of OUI values are enumerated in Table 13 Organizationally Unique Identifiers.

TABLE 13

Organizationally Unique Identifiers

| Value | Description |
|---|---|
| 0x001000 | Cable Television Laboratorios |
| 0x0004BD | Motorola Broadcast Communication Systems |
| 0x000F21 | Scientific Atlanta |

pdtHWModel: A manufacturer assigned enumeration value indicating the hardware model (or model group) of the platform described by the current table entry. The special value 0xFFFF serves as a wildcard to designate all models.

pdtHWVersion: A manufacturer assigned value indicating the version of the hardware model (or model group) of the platform described by the current table entry. The special value 0xFFFF serves as a wildcard to designate all versions.

pdtSWManufacturer: An IEEE Organizationally Unique Identifier (OUI) or one of the special values 0x000000 or 0xFFFFFF that designates the manufacturer of the hardware platform described by the current table entry. The special value 0x000000 is used in designations of a generic platform. The special value 0xFFFFFF serves as a wildcard to designate all manufacturers. A number of OUI values are enumerated in Table 13 Organizationally Unique Identifiers.

pdtSWModel: A manufacturer assigned enumeration value indicating the software model (or model group) of the platform described by the current table entry. The special value 0xFFFF serves as a wildcard to designate all models.

pdtSWVersion: A manufacturer assigned value indicating the version of the software model (or model group) of the platform described by the current table entry. The special value 0xFFFF serves as a wildcard to designate all versions.

pdtProfile: An enumeration value indicating the minimum profile that SHALL be implemented by the user agent in order to make use of the platform-specific directory referenced by the current table entry, where the values of this enumeration are defined by Table 14 Profile Enumeration.

TABLE 14

| Profile Enumeration | |
|---|---|
| Value | Description |
| 0 | baseline profile |
| 1 | full profile |
| 2 | advanced profile |
| 3-255 | Reserved |

pdtResourceID: If non-zero, an application unique resource identifier corresponding to some entry of the resource locator table, where the referenced resource is a a page resource (resource type 1) or a platform resource (resource type 8) that contains the the platform-specific directory described by the current table entry; otherwise, if zero, then the current resource contains the platform-specific directory. If this field is non-zero, then the referenced platform resource referenced SHALL contain a platform directory table that contains an entry that is compatible (unifiable) with the current table entry's hardware and software manufacturer, model, version, and profile tuple.

pdtOffset: An unsigned integer that either (1) is zero, and is otherwise ignored, in case the pdtResourceID column of the current table entry is non-zero, or (2) indicates the offset (in octets) from the start of the ebiTableDirectory structure in which this table is listed to the start of the platform-specific directory described by the current table entry.

pdtMinLength: An unsigned integer that indicates the minimum memory image size (length) necessary to contiguously store both common and the platform-specific section for the current page or data set. If this column is zero (0), then minimum memory image size information is not available and must be explicitly computed at load-time based upon dynamic memory needs.

Reference Table

The reference table defines a variable store for an application, consisting of an indexed array of typed references to read-only literal constants and to read-write storage elements. Each entry of a reference table may be considered to be a typed variable, whose name is the entry's index, and whose value is expressed either directly via an immediate literal constant or indirectly by reference to a storage location.

A single section of an EBI resource SHALL NOT contain more than one reference table. If an EBI resource contains a reference table, then it SHALL follow the schema defined by Table 15 Reference Table Schema. If both the common section and the selected platform-specific section of an EBI resource contain a reference table, then the platform-specific reference table SHALL augment the common section reference table as follows: the combination of common and platform-specific reference tables SHALL be interpreted as two, contiguous sub-tables of a single, logical table, where indices in the range [0,M−1]are used to address entries in the common sub-table, and indices in the range [M,N−1] are used to address entries in the platform-specific sub-table, where there are M entries in the common section reference sub-table and N-M entries in the platform-specific reference sub-table.

TABLE 15

| Reference Table Schema | | | | |
|---|---|---|---|---|
| Column | Name | Type | Width | Offset |
| 0 | rtType | 9 | 1 | 0 |
| 1 | rtFlags | 9 | 1 | 1 |
| 2 | rtByte0 | 9 | 1 | 2 |
| 3 | rtByte1 | 9 | 1 | 3 |
| 4 | rtByte2 | 9 | 1 | 4 |
| 5 | rtByte3 | 9 | 1 | 5 |
| 6 | rtByte4 | 9 | 1 | 6 |

rtType: An enumeration value indicating the reference type or reference extension type specified by the current table entry, where the values of this enumeration are defined by Table 16 Reference Types.

TABLE 16

| Reference Types | |
|---|---|
| Value | Description |
| 0 | reserved |
| 1 | resource reference |
| 2 | data table referente |
| 3 | filtered table referente |
| 4 | decoded trigger table reference |
| 5 | widget reference |
| 6 | widget property reference |
| 7 | environment property reference |
| 8 | string reference |
| 9 | string buffer reference |
| 10 | int32 reference |
| 11 | real32 reference |
| 12 | real64 reference |
| 13 | immediate int32 reference |
| 14 | immediate real32 reference |
| 15 | property identifier reference extension |
| 16 | property offset reference extension |
| 17-127 | reserved for future standardization |
| 128-255 | private use |

rtFlags: A bit field used to express flags that qualify or characterize the current table entry, where the interpretation of this bit field is defined by Section 0, Reference Entry Flags.

rtByte0-rtByte4: Operands that specify the reference or reference extension value, where the interpretation of operand bytes is determined according to the reference type (rtType) field, as further defined in the following subsections.

Reference Entry Flags

A reference table entry is qualified or characterized by a set of flags as defined by Table 17 Reference Flags.

TABLE 17

| Reference Flags | | |
|---|---|---|
| Syntax | Number of bits | Format |
| ebiReferenceFlags( ) { | | |
| rfExtension | 1 | bslbf |
| rfCritical | 1 | bslbf |
| rfOriginalStringReference | 1 | bslbf |
| rfReadOnly | 1 | bslbf |
| rfReserved | 4 | bslbf |
| } | | |

rfextension: A boolean flag that indicates that the current row of the reference table contains a reference extension that applies to the reference expressed by the closest preceding reference table entry that is not marked as a reference extension.

rfCritical: A boolean flag that indicates that the current row of the reference table contains a critical extension. If this flag is set and the user agent does not support the extension specified by the current row, then dereferencing the reference affected by the current row's reference extension SHALL be considered an error. If this flag is not set, then a user agent MAY ignore the extension if it does not support the extension.

rfOriginalStringReference: A boolean flag that indicates that the current row of the reference table originally contained a string reference, but has been modified to contain another reference (of possibly a different type) that resolves to a string. This flag SHALL NOT be set in the transported form of an EBI resource. A user agent MAY refuse to load an EBI resource that contains a reference table entry with this flag set.

rfReadOnly: A boolean flag that indicates that the current row of the reference table SHALL NOT be mutated during run-time. Any attempt to mutate a reference when this flag is set SHALL be considered an error.

rfreserved: This field is reserved for future standardization, and SHALL be set to all "1" bits.

Resource Reference

A resource reference is used to reference an application resource or some other type of resource by means of a resource identifier key entry for which there is a corresponding entry in the augmented resource locator table.

For references of type resource reference (1), the reference's operand bytes SHALL adhere to the syntax specified by Table 18 Reference Format 7.

A resource reference MAY be used as a reference extension, in which case its rfExtension reference flag SHALL be set. A resource reference that use used as a reference extension is referred to as a resource reference extension.

If a reference to a resource is dereferenced and no entry of the augmented resource locator table contains an entry with the same resource identifier as used in the resource reference, then the referenced resource SHALL be considered to be missing.

TABLE 18

Reference Format 7

| Syntax | Number of bits | Format |
|---|---|---|
| ebiReferenceFormat7( ) { | | |
| rf7ResourceID | 24 | uimsbf |
| rf7Reserved | 16 | bslbf |
| } | | |

rf7ResourceID: An unsigned integer that specifies an application unique resource identifier, such that some entry of the augmented resource table SHOULD contain the same resource identifier.

rf7Reserved: This field is reserved for future standardization, and SHALL be set to all "1" bits.

Extensions

No standard semantics are prescribed for the use of a reference extension with a resource reference.

The presence of any other extension to a resource reference MAY be ignored unless the extension reference is designated as a critical extension, in which case the result of performing a dereference SHALL be considered an error if the critical extension is not supported by the user agent.

Data Table Reference

A data table reference is used to reference a cell of a generic data table.

For references of type data table reference (2), the reference's operand bytes SHALL adhere to the syntax specified by Table 19 Reference Format 1.

TABLE 19

Reference Format 1

| Syntax | Number of bits | Format |
|---|---|---|
| ebiReferenceFormat1( ) { | | |
| rf1Table | 16 | int16 |
| rf1Row | 16 | int16 |
| rf1Column | 8 | uint8 |
| } | | |

rf1Table: A signed integer that, if non-negative, denotes an entry of the augmented table directory of the resource that contains the referenced table, or, if negative, denotes an entry in the current reference table, in which case such entry SHALL be a reference of type immediate int32 reference (13) that denotes an entry of the augmented table directory of the resource that contains the referenced table.

The resource in which the referenced table resides is determined as follows: if this reference is followed by a resource locator reference extension, then the resource locator reference determines the resource; otherwise, the applicable resource is determined by the context of use of the reference. If the context of use of the reference does not imply a specific resource, then the first data resource associated with the current partition applies.

rf1Row: A signed integer that, if non-negative, denotes a row of the referenced table, or, if negative, denotes an entry in the current reference table, in which case such entry SHALL be a reference of type immediate int32 reference (13) that denotes a row of the referenced table.

rf1Column: A signed integer that denotes a column of the referenced row.

Extensions

A data table reference MAY be associated with a resource reference extension (1), in which case the resource reference extension SHALL specify the resource in which the referenced data table resides.

The presence of any other extension to a data table reference MAY be ignored unless the extension reference is designated as a critical extension, in which case the result of performing a dereference SHALL be considered an error if the critical extension is not supported by the user agent.

Filtered Table Reference

A filtered table reference is used to reference a cell of a generic data table that is produced as a side-effect of performing a FILTER action. It SHALL be considered an error if a reference of this type is dereferenced and there is no filtered table associated with the filtered table identifier specified by the reference.

For references of type filtered table reference (3), the reference's operand bytes SHALL adhere to the syntax specified by Table 19 Reference Format 1, except that the rf1Table field SHALL be interpreted as a filtered table identifier as specified as an operand of the FILTER action whose performance produces the filtered table.

Extensions

No standard semantics are prescribed for the use of an reference extension with a filtered table reference.

The presence of any other extension to a filtered table reference MAY be ignored unless the extension reference is designated as a critical extension, in which case the result of performing a dereference SHALL be considered an error if the critical extension is not supported by the user agent.

Decoded Trigger Table Reference

A decoded trigger table reference is used to reference a cell of a generic data table that is produced as a side-effect of decoding one or more triggers of a specific trigger type, identifier, and source as defined by an entry of the trigger table. It SHALL be considered an error if a reference of this type is dereferenced and there is no decoded trigger table table associated with the trigger table entry whose index (row) is specified by the reference.

For references of type decoded trigger table reference (4), the reference's operand bytes SHALL adhere to the syntax specified by Table 19 Reference Format 1, except that the rf1Table field SHALL be interpreted as an index into (row of) the trigger table which defines a trigger whose decoding produces the decoded trigger table.

Extensions

No standard semantics are prescribed for the use of an reference extension with a decoded trigger table reference.

The presence of any other extension to a decoded trigger table reference MAY be ignored unless the extension reference is designated as a critical extension, in which case the result of performing a dereference SHALL be considered an error if the critical extension is not supported by the user agent.

Widget Reference

A widget reference is used to reference a widget defined by the augmented widget table.

For references of type widget reference (5), the reference's operand bytes SHALL adhere to the syntax specified by Table 20 Reference Format 2.

TABLE 20

Reference Format 2

| Syntax | Number of bits | Format |
|---|---|---|
| ebiReferenceFormat2( ) { | | |
| rf2WidgetTable | 16 | int16 |
| rf2Widget | 16 | int16 |
| rf2Identifier | 8 | uint8 |
| } | | |

rf2WidgetTable: A signed integer that, if non-negative, denotes a widget table entry of the augmented application table directory, or, if negative, denotes an entry in the current reference table, in which case such entry SHALL be a reference of type immediate int32 reference (13) that denotes a widget table entry of the augmented application table directory.

rf2Widget: A signed integer that, if non-negative, denotes a row of the referenced widget table, or, if negative, denotes an entry in the current reference table, in which case such entry SHALL be a reference of type immediate int32 reference (13) that denotes a row of the referenced, widget table.

rf2Identifier: An enumeration value that, if non-zero, designates an abridged widget property identifier, or, if zero, indicates either that the entire widget is referenced or that a reference extension, which expresses either an unabridged widget property identifier or a widget property offset, follows this reference.

When used in a widget reference, this field SHALL be zero (0).

Extensions

No standard semantics are prescribed for the use of an reference extension with a widget reference.

The presence of any other extension to a widget reference MAY be ignored unless the extension reference is designated as a critical extension, in which case the result of performing a dereference SHALL be considered an error if the critical extension is not supported by the user agent.

Widget Property Reference

A widget property reference is used to reference a property of a widget defined by the augmented widget table.

For references of type widget property reference (6), the reference's operand bytes SHALL adhere to the syntax specified by Table 20 Reference Format 2.

If the referenced widget property has an abridged widget property identifier, then the rf2Identifier field SHALL be set to the abridged widget property identifier; otherwise, the rf2Identifier field SHALL be set to zero (0).

Extensions

A widget property reference MAY be associated with a property identifier reference extension (15), in which case the property reference extension SHALL specify the unabridged widget property identifier of the referenced widget property.

A widget property reference MAY be associated with a property offset reference extension (16), in which case the property reference extension SHALL specify an unsigned number that, when added to the reference table's offset base, indicates the offset (in octets) from the start of the ebiTableDirectory structure in which the reference table is listed to the start of a the serialized widget property, and where the type of the referenced property SHALL adhere to the type prescribed for that property.

If a widget property reference does not specify an abridged widget property identifier in the rf2Identifier field, then a property identifier reference extension, a property offset reference extension, or both SHALL be present. In the case that both are present and neither (or both) reference extension(s) is (are) marked as a critical extension, then the property offset reference extension SHALL be given precedence; however, if only one is marked as a critical extension, then then that extension SHALL be given precedence.

The presence of any other extension to a data table reference MAY be ignored unless the extension reference is designated as a critical extension, in which case the result of performing a dereference SHALL be considered an error if the critical extension is not supported by the user agent.

String Reference

A string reference is used to reference a constant string literal.

For references of type string reference (16), the reference's operand bytes SHALL adhere to the syntax specified by Table 21 Reference Format 3.

TABLE 21

| Reference Format 3 | | |
|---|---|---|
| Syntax | Number of bits | Format |
| ebiReferenceFormat3( ) { | | |
| rf3Offset | 16 | uint16 |
| rf3Reserved | 24 | bslbf |
| } | | |

rf3Offset: An unsigned integer that, when added to the reference table's offset base, indicates the offset (in octets) from the start of the ebiTableDirectory structure in which the reference table is listed to the start of a literal string constant, and where the string constant SHALL adhere to the syntax specified by Table 1 Encoded String.

rf3Reserved: This field is reserved for future standardization, and SHALL be set to all '1' bits.

Immediate Signed Long Reference

An immediate signed long reference is used to define a mutable immediate signed long value.

For references of type immediate int32 reference (13), the reference's operand bytes SHALL adhere to the syntax specified by Table 22 Reference Format 4.

TABLE 22

| Reference Format 4 | | |
|---|---|---|
| Syntax | Number of bits | Format |
| ebiReferenceFormat4( ) { | | |
| rf4Value | 32 | int32 |
| rf4Reserved | 8 | bslbf |
| } | | |

rt4Value: A signed long (32-bit) integer.

rt4Reserved: This field is reserved for future standardization, and SHALL be set to all "1" bits.

Special Platform Variable Reference

A special platform variable reference is used to define a mutable immediate signed long value.

For references of type special platform variable reference (19), the reference's operand bytes SHALL adhere to the syntax specified by Table 23 Reference Format 5.

TABLE 23

| Reference Format 5 | | |
|---|---|---|
| Syntax | Number of bits | Format |
| ebiReferenceFormat5( ) { | | |
| rf5Variable | 8 | uint8 |
| for (i = 0; i < 4; i++) { | | |
| rf5Byte[ ] | 8 | uimsbf |
| } | | |
| } | | |

rf5Variable: An enumeration value indicating the reference type specified by the current table entry, where the values of this enumeration are defined by Table 16 Reference Types.

TABLE 24

| Platform Variables | |
|---|---|
| Value | Description |
| 0 | date-time component as integer |
| 1 | date-time component as string |
| 2 | MAC address |
| 3 | source identifier |
| 4 | channel number |
| 5 | non-volatile ram variable as string |
| 6 | non-volatile ram variable as integer |
| 7 | terminal device identifier |
| 8 | application argument arg0 |
| 9 | application argument arg1 |
| 10 | Reserved |
| 11 | channel call letters |
| 12-255 | Reserved |

rf5Byte[ ]: An array of bytes that encode additional operands that further specify the special platform variable reference, where the interpretation of these bytes is determined according to the platform variable (rf5Variable) field, as further defined in the following subsections.

Date and Time Information

A date-time platform variable reference is used to obtain date and/or time information from the platform.

For a date-time platform variable (0 or 1), the special platform variable's operand bytes SHALL adhere to the syntax specified by Table 25 Platform Variable Reference Format 1.

TABLE 25

| Platform Variable Reference Format 1 | | |
|---|---|---|
| Syntax | Number of bits | Format |
| ebiPlatformVariableReference1( ) { | | |
| pvr1Format | 8 | uint8 |
| pvr1Reserved | 24 | bslbf |
| } | | |

pvr1Format: An enumeration value indicating the nature and format of the value returned by a reference to this platform variable, where the values of this enumeration are defined by Table 26 Platform Variable Format 1 Data Formats.

TABLE 26

| Platform Variable Format 1 Data Formats | | | |
|---|---|---|---|
| Value | Description | Type | Format or Numeric Range |
| 0 | reserved | NA | NA |
| 1 | full | string | MMM DD, YYYY HH:MM(am\|pm) |
| 2 | Date1 | string | MMM DD, YYYY |
| 3 | Date2 | string | MM/DD/YYYY |
| 4 | Time1 | string | HH:MM(am\|pm); HH from 00 to 12 |
| 5 | Time2 | string | HH:MM; HH from 00 to 23 |
| 6 | year | int32 | ≧1970 |
| 7 | month | int32 | [1, 12] |
| 8 | Month_s | string | Jan\|Feb\|Mar\| . . . |
| 9 | Month_l | string | January\|February\|March\| . . . |
| 10 | mday | int32 | [1, 31] |
| 11 | wday | string | Mon\|Tue\|Wed\|Thu\|Fri\|Sat\|Sun |
| 12 | hour | int32 | [0, 23] |
| 13 | min | int32 | [0, 59] |
| 14 | sec | int32 | [0, 60] |
| 15 | ampm | string | am\|pm |
| 16 | Date_s | string | MMM DD |

TABLE 26-continued

| Platform Variable Format 1 Data Formats | | | |
|---|---|---|---|
| Value | Description | Type | Format or Numeric Range |
| 17 | unix | uint32 | ≧0 |
| 18 | standard | string | MMM DD, YYYY HH:MM (am\|pm) |
| 19-255 | reserved | NA | NA |

pvr1Reserved: This field is reserved for future standardization, and SHALL be set to all "1" bits.

MAC Address

A MAC address platform variable reference is used to obtain MAC address information from the platform.

For a MAC address platform variable (2), the special platform variable's operand bytes SHALL adhere to the syntax specified by Table 27 Platform Variable Reference Format 2.

TABLE 27

| Platform Variable Reference Format 2 | | |
|---|---|---|
| Syntax | Number of bits | Format |
| ebiPlatformVariableReference2( ) { | | |
| pvr2Reserved | 32 | bslbf |
| } | | |

pvr2Reserved: This field is reserved for future standardization, and SHALL be set to all '1' bits.

Source Identifier

A source identifier platform variable reference is used to obtain source identifier information from the platform.

For a source identifier platform variable (3), the special platform variable's operand bytes SHALL adhere to the syntax specified by Table 27 Platform Variable Reference Format 2.

Channel Number

A channel number platform variable reference is used to obtain channel number information from the platform.

For a channel number platform variable (4), the special platform variable's operand bytes SHALL adhere to the syntax specified by Table 27 Platform Variable Reference Format 2.

Non-Volatile RAM

A non-volatile RAM platform variable reference is used to access platform non-volatile RAM data.

For a non-volatile RAM platform variable (5 or 6), the special platform variable's operand bytes SHALL adhere to the syntax specified by Table 28 Platform Variable Reference Format 3.

TABLE 28

| Platform Variable Reference Format 3 | | |
|---|---|---|
| Syntax | Number of bits | Format |
| ebiPlatformVariableReference3( ) { | | |
| pvr3Name | 16 | int16 |
| pvr3InitialValue | 16 | int16 |
| } | | |

pvr3Name: A signed positive integer that denotes a row of the reference table containing a string reference that specifies a non-volatile RAM platform variable name.

pvr3InitialValue: A signed positive integer that denotes a row of the reference table that specifies the initial value for this non-volatile RAM platform variable, or, if negative, then no initial value is defined.

Terminal Device Identifier

A terminal device identifier platform variable reference is used to obtain terminal device identifier information from the platform.

For a call letters platform variable (11), the special platform variable's operand bytes SHALL adhere to the syntax specified by Table 27 Platform Variable Reference Format 2.

Application Arguments

An application argument platform variable reference is used to obtain application argument information from the platform.

For an application argument platform variable (8 or 9), the special platform variable's operand bytes SHALL adhere to the syntax specified by Table 27 Platform Variable Reference Format 2.

Channel Call Letters

A channel call letters platform variable reference is used to obtain call letters information from the platform.

For a call letters platform variable (11), the special platform variable's operand bytes SHALL adhere to the syntax specified by Table 27 Platform Variable Reference Format 2.

String Buffer Reference

A string buffer reference is used to reference a mutable string buffer.

For references of type string buffer reference (20), the reference's operand bytes SHALL adhere to the syntax specified by Table 29 Reference Format 6.

TABLE 29

| Reference Format 6 | | |
|---|---|---|
| Syntax | Number of bits | Format |
| ebiReferenceFormat6( ) { | | |
| rf6Size | 16 | uint16 |
| rf6Offset | 16 | uint16 |
| rf6Reserved | 8 | bslbf |
| } | | |

rf6Size: An unsigned integer indicating the size of the string buffer in octets.

Note: The size of a string buffer does not correspond to the number of bytes or characters contained in the string stored in the string buffer. The number of bytes contained in the string stored in the string buffer can be determined from the esLength field of the encoded string. The number of characters can be determined only by converting the string's contents into an array of Unicode scalar values, i.e., UTF-32 code values, then counting the number of scalar values.

rf6Offset: An unsigned integer that, when added to the reference table's offset base, indicates the offset (in octets) from the start of the ebiTableDirectory structure in which the reference table is listed to the start of the string buffer, and where the string buffer SHALL adhere to the syntax specified by Table 1 Encoded String, followed by zero or more NUL padding bytes (0x00) up to the end of the string buffer.

rf6Reserved: This field is reserved for future standardization, and SHALL be set to all '1' bits.

Resource Locator Table

A resource locator table provides a mapping between a set of application unique resource identifiers and a set of resource locators. A resource locator provides information about how to find (locate) a resource.

A single section of an EBI resource SHALL NOT contain more than one resource locator table. If an EBI resource contains a resource locator table, then it SHALL follow the schema defined by Table 30 Resource Locator Table Schema. If both the common section and the selected platform-specific section of an EBI resource contain a resource locator table, then the platform-specific resource locator table SHALL augment the common section action table as follows: the combination of common and platform-specific resource locator tables SHALL be interpreted as a single, logical table, where entries in the platform-specific table either override or augment entries in the common section table according to whether an entry in the former has the same resource identifier as an entry in the latter.

Any given two entries of a single resource locator table SHALL NOT specify the same resource identifier.

TABLE 30

Resource Locator Table Schema

| Column | Name | Type | Width | Offset |
|---|---|---|---|---|
| 0 | rltResourceID | 8 | 3 | 0 |
| 1 | rltLocator | 5 | 2 | 3 |

rltResourceID: An unsigned integer that specifies an application unique resource identifier.

rltLocator: An unsigned integer that, when added to the table's offset base, forms an offset from the start of the table directory to a Locator structure, as defined by Table 88 Locator Structure.

An example of using a resource locator table to reference a widget table in an external tables resource is shown in Resource Locator Table Example.

Resource Locator Table Example

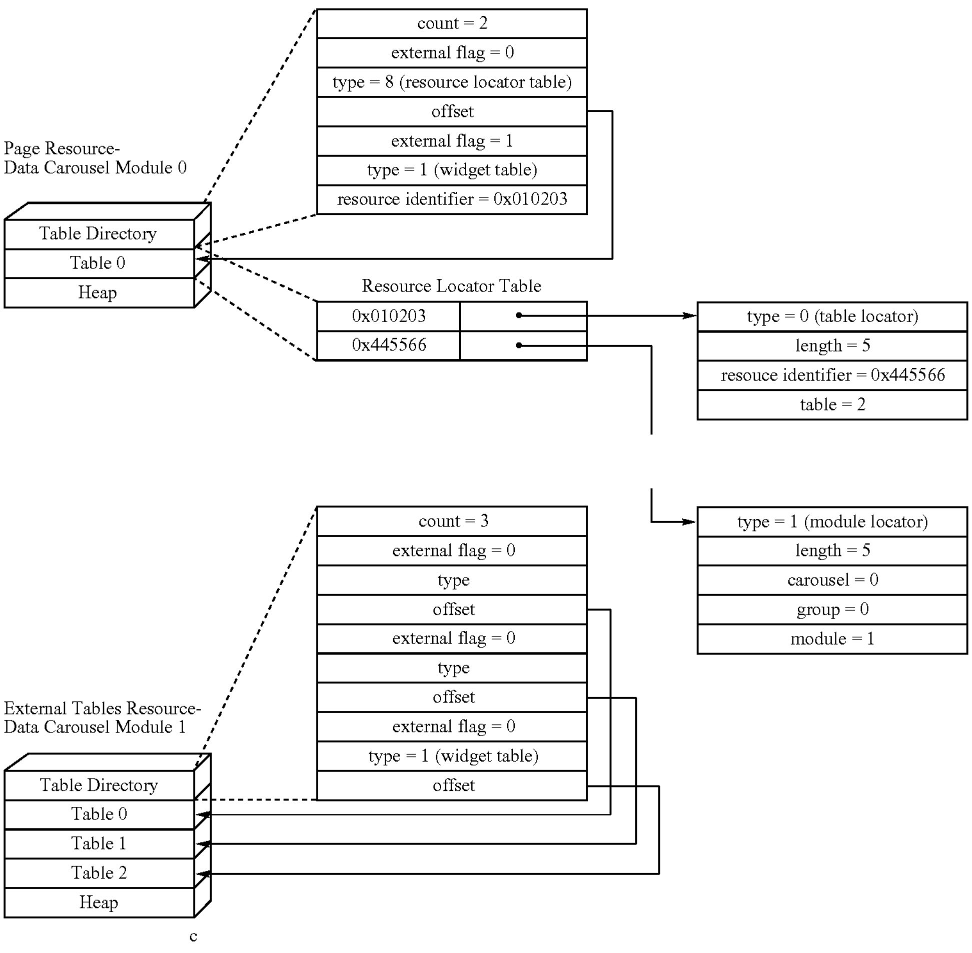

In the above example, an application consists of two resources delivered in a single-control-layer data carousel containing two modules, module 0 and 1. The table directory of the first (page) resource contains an entry that references an external table through resource identifier 0x010203. The resource locator table contains an entry (0) with this same identifier and an associated table locator (locator type 0), which specifies resource identifier 0x445566 for the resource that contains the referenced table and a table entry number (2). The resource locator table contains an entry (1) with this same identifier and an associated module locator, which specifies module 1 on the current carousel (and only group).

Widget Table

A widget table defines a set of related widgets that serve to define one of the following:

Page

Group

Radio Group

A page is considered to be a top-level user interface construct that is geometrically coterminous with the application's root container. A page has no parent widget but typically has one or more child widgets. A group is considered to be an intermediate-level user interface construct that serves as a container for widgets or other groups. A group has a parent widget that is either a page or another group. A radio group is a specialized group that contains only radio button widgets as its children.

An example of a simple widget hierarchy organized through widget tables is depicted in Widget Table Hierarchy Example. This example specifies a page containing a single group widget, where this group contains a text widget and a radio button group which, in turn, contains two radio button widgets.

Widget Table Hierarchy Example

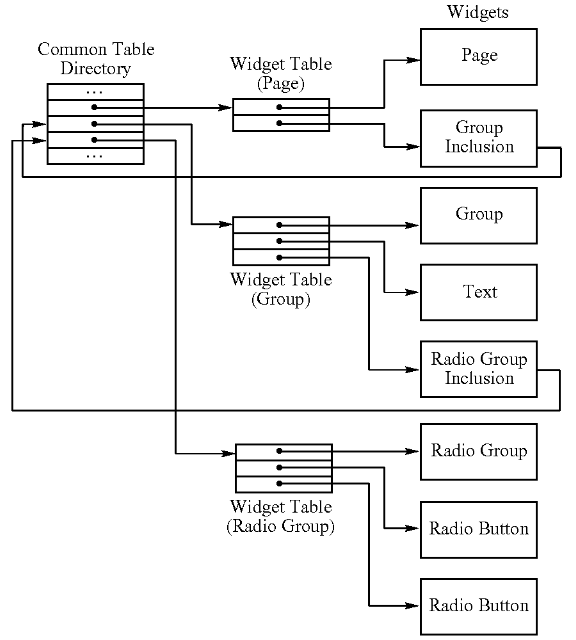

If a widget table serves to define a page, then its first entry SHALL reference a Page Widget. If a widget table defines a group, then its first entry SHALL reference a Group Widget. If a widget table defines a radio group, then its first entry SHALL reference a Radio Group Widget. If a widget table serves to define an included page, then its first entry SHALL reference an IncludedPage Widget.

An EBI resource of resource type application SHALL contain at least one Widget Table that defines a page, and that Widget Table must be the first Widget Table enumerated by the Table Directory in the Common Table Section.

If an EBI resource contains a widget table, then it SHALL follow the schema defined by Table 31 Widget Table Shema.

TABLE 31

Widget Table Schema

| Column | Name | Type | Width | Offset |
|---|---|---|---|---|
| 0 | wtWidget | 5 | 2 | 0 |

wtWidget: An unsigned integer that, when added to the table's offset base, forms an offset from the start of the table directory to a widget specification. Each widget referenced by a widget table row SHALL be some widget defined by Section [00349], Widgets.

Widgets

This section defines the serialized representations of a set of pre-defined, standardized widgets, as enumerated in Table 32 Widget Types. The serialized representation of a widget SHALL be placed in the storage heap of an EBI resource, and may be referenced multiple times in order to instantiate or otherwise make use of the information defined by the widget's static serialized form.

Note: A widget is considered to represent a predefined user interface component which, in general, has a visual representation (but need not in all cases, e.g., as in the inclusion and Timer widgets).

TABLE 32

Widget Types

| Value | Description |
|---|---|
| 0 | Reserved |
| 1 | Page |
| 2 | Timer |
| 3 | Text |
| 4 | Button |
| 5 | Image |
| 6 | Selector |
| 7 | MultilineText |
| 8 | IncludedPage |
| 9 | Group |
| 10 | Rectangle |
| 11 | ScaledVideo |
| 12 | RadioGroup |
| 13 | Radio |
| 14 | Form |
| 15 | TextInput |
| 16 | Reserved |
| 17 | GroupInclusion |
| 18 | PageInclusion |
| 19 | Promotion |
| 20 | reserved |
| 21 | Hotspot |
| 22 | HiddenField |
| 23 | RadioGroupInclusion |
| 24-191 | Reserved |
| 192-255 | private use |

Note: The serialized representation of a widget does not include information about the dynamic user interface state of a widget, e.g., the value of a check box widget or an input Text widget.

In the sections below describing widgets, fields having a format designation consisting of the number data types signed byte, signed short, and signed long are constrained to contain only positive values or zero except where specifically noted.

In the sections below describing widgets, fields holding an HAlign enumeration value indicate the horizontal alignment of a widget or a widget component. The values of this enumeration are defined by Table 33 Horizontal Alignments.

TABLE 33

Horizontal Alignments

| Value | Description |
|---|---|
| 0 | Left |
| 1 | Center |
| 2 | Right |

Similarly, fields holding a VAlign enumeration value indicate the vertical alignment of a widget or a widget component. The values of this enumeration are defined by Table 34 Vertical Alignments.

TABLE 34

Vertical Alignments

| Value | Description |
|---|---|
| 0 | Top |
| 1 | Middle |
| 2 | Bottom |

In the sections below describing widgets, fields holding a Font Index reference value indicate a front face to be used for rendering text. If the value in a Font Index reference is between 0 and 6 then it is considered to be an enumerated value representing the style number for an internal font. Otherwise the value held in a Font Index reference field is an offset to a Font structure associated with an authored font. The values of the font style enumeration are defined by Table 35 Font Styles. The Font structure is described in 0 Fonts.

TABLE 35

Font Styles

| Value | Description |
|---|---|
| 0 | Symbol |
| 1 | Small |
| 2 | Small, dropshadow |
| 3 | Medium |
| 4 | Medium, dropshadow |
| 5 | Large |
| 6 | Large, dropshadow |

Button

A button widget provides a user interface element that implements button interaction semantics. A button widget SHALL adhere to the syntax specified by

TABLE 36

Button Widget

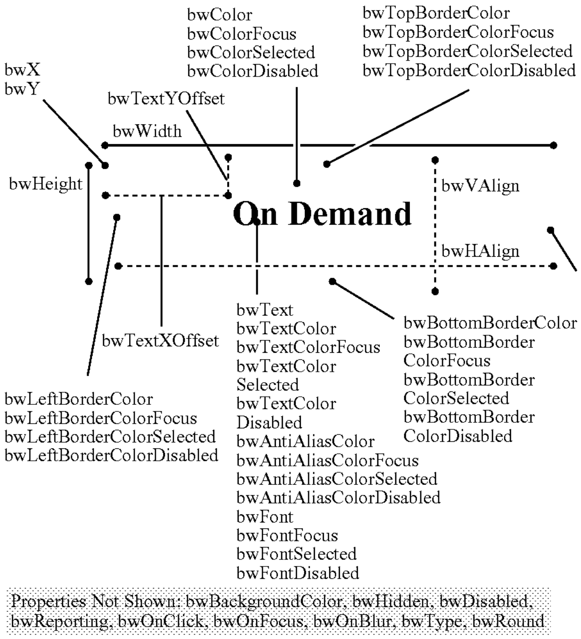

| Syntax | Number of bits | Format |
|---|---|---|
| ebiButtonWidget( ) { | | |
| bwType | 8 | uint8 |
| bwStyle | 16 | uint16 |
| bwX | 16 | int16 |
| bwY | 16 | int16 |
| bwWidth | 16 | int16 |
| bwHeight | 16 | int16 |
| bwText | 16 | int16 |
| bwTextXOffset | 8 | int8 |
| bwTextYOffset | 8 | int8 |
| bwHidden | 8 | boolean |
| bwDisabled | 8 | boolean |
| bwReporting | 8 | int8 |
| bwOnClick | 16 | int16 |
| bwOnFocus | 16 | int16 |
| bwOnBlur | 16 | int16 |
| } | | |

bwType: An unsigned integer indicating that this widget is a Button widget. This field SHALL have the constant value 4.

bwStyle: An unsigned integer that, if non-zero, represents an offset (in octets) from the start of this ebiButtonWidget structure to the start of a Style structure that expresses styles to be applied, or, if zero, denotes that default styles are to be applied.

bwX: A signed integer indicating the number of pixels in the x dimension from the origin of the application's root container to the origin of the button, where negative values indicate that the button's origin is to the left of the root container's origin.

bwY: A signed integer indicating the number of pixels in the y dimension from the origin of the application's root container to the origin of the button, where negative values indicate that the button's origin is above the root container's origin.

bwWidth: An signed integer indicating the number of pixels in the x dimension from the left-most to right-most edge of the button's geometry.

bwHeight: An signed integer indicating the number of pixels in the y dimension from the top-most to bottom-most edge of the button's geometry.

bwText: A signed integer which SHALL have a value between −1 and 32,767. If the value is −1 it is interpreted as indicating that the Button widget has no associated text. Otherwise, it is interpreted as a row index into the Reference Table. The entry in this row of the Reference Table indicates the location of a string which holds the text associated with the Button widget. The text is displayed in the widget as a label when the widget is rendered.

bwTextXOffset: A signed integer indicating the number of pixels in the x dimension from the origin of the button to the origin of the button's text, where negative values indicate that the button's text is to the left of the button's origin.

bwTextYOffset: A signed integer indicating the number of pixels in the y dimension from the origin of the button to the origin of the button's text, where negative values indicate that the button's text is above the button's origin.

bwHidden: An unsigned integer interpreted as the Boolean common data type. The value indicates whether the Button widget is currently visible or hidden. If the value of bwHidden is TRUE, the widget is considered to be hidden and its background color as specified in bwBackgroundColor will be rendered in the area of the widget. If the value of bwHidden is FALSE, the widget is considered to be visible and it will be rendered.

bwDisabled: An unsigned integer interpreted as a Boolean common data type value. The value reflects the current state of the Button widget. If the value of bwDisabled is TRUE, the Button widget is considered to be in the disabled state. If the value of bwDisabled is FALSE, the Button widget is not considered to be in the disabled state. When the button is disabled it cannot be the target of UI navigation.

bwReporting: A signed integer which holds the identifier of a promotion with which this button is associated (prwPromoNumber, see 0 Promotion). If this value is 0, there is no promotion associated with the button.

bwOnClick: A signed integer interpreted as an index into a table of actions. If negative, its absolute value is taken as an index into the Promotion Action Table. If the value is positive, it is taken as an index into the general Action Table. The action table row referenced by this index provides an action or sequence of actions to be performed when the Button widget receives an on Click event.

bwOnFocus: A signed integer interpreted as an index into the Action Table. The Action Table row referenced by this index provides an action or sequence of actions to be performed when the Button widget receives an on Focus event.

bwOnBlur: A signed integer interpreted as an index into the Action Table. The Action Table row referenced by this index provides an action or sequence of actions to be performed when the Button widget receives an on Blur event.

Indirect Properties

In addition to the properties specified by the above fields, a Button widget has a set of indirect properties, which are mapped according to Table 37 Button Widget Indirect Properties, and futher described below.

In the Mapping column of Table 37 Button Widget Indirect Properties, the notation *F denotes the result of dereferencing F, which is a field that references another structure.

TABLE 37

Button Widget Indirect Properties

| Indirect Property | Mapping |
|---|---|
| bwAntiAliasColor | *bwStyle.*ssFG2.csEnabled |
| bwAntiAliasColorFocus | *bwStyle.*ssFG2.csFocused |
| bwAntiAliasColorSelected | *bwStyle.*ssFG2.csSelected |
| bwAntiAliasColorDisabled | *bwStyle.*ssFG2.csDisabled |
| bwBackgroundColor | *bwStyle.*ssBG2.csEnabled |
| bwBottomBorderColor | *bwStyle.*ssBorder.*bsBottom.csEnabled |
| bwBottomBorderColorFocus | *bwStyle.*ssBorder.*bsBottom.csFocused |
| bwBottomBorder-ColorSelected | *bwStyle.*ssBorder.*bsBottom.csSelected |
| bwBottomBorder-ColorDisabled | *bwStyle.*ssBorder.*bsBottom.csDisabled |
| Bicolor | *bwStyle.*ssBG1.csEnabled |
| bwColorFocus | *bwStyle.*ssBG1.csFocused |
| bwColorSelected | *bwStyle.*ssBG1.csSelected |
| bwColorDisabled | *bwStyle.*ssBG1.csDisabled |
| bwFont | *bwStyle.*ssFont.fsEnabled |
| bwFontFocus | *bwStyle.*ssFont.fsFocused |
| bwFontSelected | *bwStyle.*ssFont.fsSelected |
| bwFontDisabled | *bwStyle.*ssFont.fsDisabled |
| bwRound | *bwStyle.*ssBorder.bsJoinStyle |
| bwHAlign | *bwStyle.*ssAlignment.asHAlign |
| bwLeftBorderColor | *bwStyle.*ssBorder.*bsLeft.csEnabled |
| bwLeftBorderColorFocus | *bwStyle.*ssBorder.*bsLeft.csFocused |
| bwLeftBorderColorSelected | *bwStyle.*ssBorder.*bsLeft.csSelected |
| bwLeftBorderColorDisabled | *bwStyle.*ssBorder.*bsLeft.csDisabled |
| bwRightBorderColor | *bwStyle.*ssBorder.*bsRight.csEnabled |
| bwRightBorderColorFocus | *bwStyle.*ssBorder.*bsRight.csFocused |
| bwRightBorderColorSelected | *bwStyle.*ssBorder.*bsRight.csSelected |
| bwRightBorderColorDisabled | *bwStyle.*ssBorder.*bsRight.csDisabled |
| bwTextColor | *bwStyle.*ssFG1.csEnabled |
| bwTextColorFocus | *bwStyle.*ssFG1.csFocused |
| bwTextColorSelected | *bwStyle.*ssFG1.csSelected |
| bwTextColorDisabled | *bwStyle.*ssFG1.csDisabled |
| bwTopBorderColor | *bwStyle.*ssBorder.*bsTop.csEnabled |
| bwTopBorderColorFocus | *bwStyle.*ssBorder.*bsTop.csFocused |
| bwTopBorderColorSelected | *bwStyle.*ssBorder.*bsTop.csSelected |
| bwTopBorderColorDisabled | *bwStyle.*ssBorder.*bsTop.csDisabled |
| bwVAlign | *bwStyle.*ssAlignment.asVAlign |

bwAntiAliasColor: A signed integer that is interpreted as a row index into the color palette represented in the palette table. This palette row specifies the color to be used as a hint to the platform about how to best anti-alias the button's label text when the widget is in the idle state.

bwAntiAliasColorFocus: A signed integer that is interpreted as a row index into the color palette represented in the palette table. This palette row specifies the color to be used as a hint to the platform about how to best anti-alias the button's label text when the widget is in the focused state.

bwAntiAliasColorSelected: A signed integer that is interpreted as a row index into the color palette represented in the palette table. This palette row specifies the color to be used as a hint to the platform about how to best anti-alias the button's label text when the widget is in the selected state.

bwAntiAliasColorDisabled: A signed integer that is interpreted as a row index into the color palette represented in the palette table. This palette row specifies the color to be used as a hint to the platform about how to best anti-alias the button's label text when the widget is in the disabled state.

bwBackgroundColor: A signed integer that is interpreted as a row index into the color palette represented in the palette table. This palette row specifies the color to be used as a background color for the Button widget.

The visibility of the background color is affected by the value of bwHidden. The background color is visible when the value of bwHidden is TRUE.

bwBottomBorderColor: A signed integer that is interpreted as a row index into the color palette represented in the palette table. This palette row specifies the color to be used to render the bottom border of the button when the widget is in the idle state.

bwBottomBorderColorFocus: A signed integer that is interpreted as a row index into the color palette represented in the palette table. This palette row specifies the color to be used to render the bottom border of the button when the widget is in the focused state.

bwBottomBorderColorSelected: A signed integer that is interpreted as a row index into the color palette represented in the palette table. This palette row specifies the color to be used to render the bottom border of the button when the widget is in the selected state.

bwBottomBorderColorDisabled: A signed integer that is interpreted as a row index into the color palette represented in the palette table. This palette row specifies the color to be used to render the bottom border of the button when the widget is in the disabled state.

bwColor: A signed integer that is interpreted as a row index into the color palette represented in the palette table. This palette row specifies the color to be used to render the fill of the button when the widget is in the idle state.

bwColorFocus: A signed integer that is interpreted as a row index into the color palette represented in the palette table. This palette row specifies the color to be used to render the fill of the button when the widget is in the focused state.

bwColorSelected: A signed integer that is interpreted as a row index into the color palette represented in the palette table. This palette row specifies the color to be used to render the fill of the button when the widget is in the selected state.

bwColorDisabled: A signed integer that is interpreted as a row index into the color palette represented in the palette table. This palette row specifies the color to be used to render the fill of the button when the widget is in the disabled state.

bwFont: An unsigned integer interpreted as a Font Index reference type value. The value indicates the font that will be used to render the text in the Button widget when the widget is in the enabled state.

bwFontFocus: An unsigned integer interpreted as a Font Index reference type value. The value indicates the font that will be used to render the text in the Button widget when the widget is in the focused state.

bwFontSelected: An unsigned integer interpreted as a Font Index reference type value. The value indicates the font that will be used to render the text in the Button widget when the widget is in the selected state.

bwFontDisabled: An unsigned integer interpreted as a Font Index reference type value. The value indicates the font that will be used to render the text in the Button widget when the widget is in the disabled state.

bwHAlign: An unsigned integer interpreted as an HAlign enumeration value. The value indicates whether the widget's text is to be horizontally aligned left, center, or right within the rectangular area allocated for the text.

bwLeftBorderColor: A signed integer that is interpreted as a row index into the color palette represented in the palette table. This palette row specifies the color to be used to render the left border of the button when the widget is in the idle state.

bwLeftBorderColorFocus: A signed integer that is interpreted as a row index into the color palette represented in the palette table. This palette row specifies the color to be used to render the left border of the button when the widget is in the focused state.

bwLeftBorderColorSelected: A signed integer that is interpreted as a row index into the color palette represented in the palette table. This palette row specifies the color to be used to render the left border of the button when the widget is in the selected state.

bwLeftBorderColorDisabled: A signed integer that is interpreted as a row index into the color palette represented in the palette table. This palette row specifies the color to be used to render the left border of the button when the widget is in the disabled state.

bwRightBorderColor: A signed integer that is interpreted as a row index into the color palette represented in the palette table. This palette row specifies the color to be used to render the right border of the button when the widget is in the idle state.

bwRightBorderColorFocus: A signed integer that is interpreted as a row index into the color palette represented in the palette table. This palette row specifies the color to be used to render the right border of the button when the widget is in the focused state.

bwRightBorderColorSelected: A signed integer that is interpreted as a row index into the color palette represented in the palette table. This palette row specifies the color to be used to render the right border of the button when the widget is in the selected state.

bwRightBorderColorDisabled: A signed integer that is interpreted as a row index into the color palette represented in the palette table. This palette row specifies the color to be used to render the right border of the button when the widget is in the disabled state.

bwRound: An enumeration value indicating the treatment of the corners of the button graphic associated with this widget, which follow the border join style that applies to the button irrespective of whether borders are visible. The values of this enumeration are defined by Table 78 Border Join Styles.

bwTextColor: A signed integer that is interpreted as a row index into the color palette represented in the palette table. This palette row specifies the color to be used to render the label text of the Button widget when the widget is in the idle state.

bwTextColorFocus: A signed integer that is interpreted as a row index into the color palette represented in the palette table. This palette row specifies the color to be used to render the label text of the Button widget when the widget is in the focused state.

bwTextColorSelected: A signed integer that is interpreted as a row index into the color palette represented in the palette table. This palette row specifies the color to be used to render the label text of the Button widget when the widget is in the selected state.

bwTextColorDisabled: A signed integer that is interpreted as a row index into the color palette represented in the palette table. This palette row specifies the color to be used to render the label text of the Button widget when the widget is in the disabled state.

bwTopBorderColor: A signed integer that is interpreted as a row index into the color palette represented in the palette table. This palette row specifies the color to be used to render the top border of the button when the widget is in the idle state.

bwTopBorderColorFocus: A signed integer that is interpreted as a row index into the color palette represented in the palette table. This palette row specifies the color to be used to render the top border of the button when the widget is in the focused state.

bwTopBorderColorSelected: A signed integer that is interpreted as a row index into the color palette represented in the palette table. This palette row specifies the color to be used to render the top border of the button when the widget is in the selected state.

bwTopBorderColorDisabled: A signed integer that is interpreted as a row index into the color palette represented in the palette table. This palette row specifies the color to be used to render the top border of the button when the widget is in the disabled state.

bwVAlign: An unsigned integer interpreted as a VAlign enumeration value. The value indicates whether the widget's text is to be vertically aligned top, center, or bottom within the rectangular area allocated for the text.

Form

A Form widget provides a logical grouping of information about a collection of widgets that act as form controls. A Form widget SHALL adhere to the syntax specified by Table 38 Form Widget.

TABLE 38

| Form Widget | | |
|---|---|---|
| Syntax | Number of bits | Format |
| ebiFormWidget( ) { | | |
| fwType | 8 | uint8 |
| fwTarget | 16 | int16 |
| fwSecure | 8 | boolean |
| fwResponse | 8 | uint8 |
| fwSession | 8 | uint8 |
| fwReport | 8 | boolean |
| fwSetid | 8 | boolean |
| fwLoadingBar | 8 | boolean |
| fwLoadBalance | 16 | int16 |
| fwItems | 16 | uint16 |
| fwOnSuccess | 16 | int16 |
| fwOnFailure | 16 | int16 |
| } | | |

fwType: An unsigned integer indicating that this widget is a Form widget. This field SHALL have the constant value 14.

fwTarget: A signed integer interpreted as a row index into the Reference Table. The entry in this row of the Reference Table indicates the location of a string which identifies the target of the Form widget. The target string is used as a URI identifying a server which will process the submittal of this form.

fwSecure: An unsigned integer interpreted as a Boolean common data type value. The value determines if the form name-value pairs should be encrypted before being posted to the server. If the value of the fwSecure is TRUE, the form data should be encrypted before being sent. If the value of fwSecure is FALSE, the form data is not to be encrypted before being sent.

fwResponse: An enumeration value which indicates the type of response a server should make to this form when it is submitted. The values of this enumeration are defined by Table 39 Responses.

TABLE 39

| Responses | |
|---|---|
| Value | Description |
| 0 | Standard (no encryption) |
| 1 | Encrypt response |
| 2 | No response |

Note, a standard response does not require the target of the submit to encrypt the response; encrypt requires the target of the submit to encrypt its response; while no response requires the target of the submit to make no response to the submit.

fwSession: An enumeration value which indicates the type of session the application platform should set up with the server when form data from this widget is to be submitted. The values of this enumeration are defined by Table 40 Session. "None" indicates that a non-persistent connection should be established; while "uID" or "MAC" indicates that a persistent connection should be established using a unique ID or a MAC address, respectively.

TABLE 40

| Session | |
|---|---|
| Value | Description |
| 0 | None |
| 1 | uID |
| 2 | MAC |

fwReport: An unsigned integer interpreted as a Boolean common data type value. The value determines if the form indicates that the form posting should be logged for usage reporting purposes. If the value of fwReport is TRUE, the form posting should be logged. If the value of fwReport is FALSE, the form posting should not be logged.

fwSetid: An unsigned integer interpreted as a Boolean common data type value. The value indicates whether during a submit the Form widget is identified to the server via a settop ID. If the value of fwSetid is TRUE, the Form widget is identified to the server by its settop ID. If the value of fwSetid is FALSE, the Form widget is not identified to the server by its settop ID during a form submit.

fwLoadingBar: An unsigned integer interpreted as a Boolean common data type value. The value indicates whether during a submit the Form widget displays a loading bar graphic to the viewer while the UI is locked to input pending server response to the submit. If the value of fwLoadingBar is TRUE, the Form widget displays a loading bar graphic. If the value of fwLoadingBar is FALSE, the Form widget does not display a loading bar graphic.

fwLoadBalance: A signed integer interpreted as a number of minutes. The application platform uses this value as the duration of a window which starts when this form is submitted by the user. The application platform will post the form data to the server at some time within the window. If the value of fwLoadBalance is zero, the form data will be posted by the application platform when the form is submitted by the user.

fwItems: An unsigned integer. This value is interpreted as an offset pointing to a structure heap area which contains the Items structure associated with this Form widget. Note, the widgets referenced by the Items structure are the widgets which comprise the form.

fwOnSuccess: A signed integer interpreted as an index into the Action Table. The Action Table row referenced by this index provides an action or sequence of actions to be performed when the Form widget receives an on Success event.

fwOnFailure: A signed integer interpreted as an index into the Action Table. The Action Table row referenced by this index provides an action or sequence of actions to be performed when the Form widget receives an on Failure event.

Group

A Group widget provides an organizational construct that allows the combination of other widgets into a positionable and logical grouping. A Group widget SHALL adhere to the syntax specified by Table 41 Group Widget.

TABLE 41

| Group Widget | | |
|---|---|---|
| Syntax | Number of bits | Format |
| ebiGroupWidget( ) { | | |
| gwType | 8 | uint8 |
| gwStyle | 16 | uint16 |
| gwX | 16 | int16 |
| gwY | 16 | int16 |
| gwHidden | 8 | boolean |
| gwTableIndex | 16 | int16 |
| } | | |

gwType: An unsigned integer indicating that this widget is a Group widget. This field SHALL have the constant value 9.

gwStyle: An unsigned integer that, if non-zero, represents an offset (in octets) from the start of this ebiGroupWidget structure to the start of a Style structure that expresses styles to be applied, or, if zero, denotes that default styles are to be applied.

gwX: A signed integer indicating the number of pixels in the x dimension from the origin of the application's root container to the origin of the Group widget, where negative values indicate that the widget's origin is to the left of the root container's origin.

gwY: A signed integer indicating the number of pixels in the y dimension from the origin of the application's root container to the origin of the Group widget, where negative values indicate that the widget's origin is above the root container's origin gwHidden: An unsigned integer interpreted as a Boolean common data type value. The value indicates whether the Group widget is hidden or visible. If the value of gwHidden is TRUE, the Group widget is not rendered. If the value of gwHidden is FALSE, the Group widget is rendered.

Note the value of gwHidden supersedes the hidden property of the widgets which are members of the group.

gwTableIndex: A signed integer interpreted as an index into the Common Table Directory. The referenced row of the directory will contain an offset to this Group Widget's widget table.

GroupInclusion

A GroupInclusion widget provides a logical construct which allows a widget table to refer to the collection of widgets that constitute a Group widget. A GroupInclusion widget SHALL adhere to the syntax specified by Table 42 GroupInclusion Widget.

TABLE 42

| GroupInclusion Widget | | |
|---|---|---|
| Syntax | Number of bits | Format |
| ebiGroupInclusionWidget( ) { | | |
| giwType | 8 | uint8 |
| giwGroupIndex | 16 | int16 |
| } | | |

giwType: An unsigned integer indicating that this widget is a GroupInclusion widget. This field SHALL have the constant value 17.

giwGroupIndex: A signed integer interpreted as an index into the Common Table Directory. The referenced row of the directory will contain an offset to the Group widget table of the included group.

HiddenField

A HiddenField widget provides a user interface element that allows a value, which is not exposed to the user, to be submitted as part of the data in a form. A HiddenField widget SHALL adhere to the syntax specified by Table 43 HiddenField Widget.

TABLE 43

| HiddenField Widget | | |
|---|---|---|
| Syntax | Number of bits | Format |
| ebiHiddenFieldWidget( ) { | | |
| hfwType | 8 | uint8 |
| hfwSubmit | 8 | boolean |
| hfwSubmitName | 16 | int16 |
| hfwValue | 16 | int16 |
| } | | |

hfwType: An unsigned integer indicating that this widget is a HiddenField widget. This field SHALL have the constant value 22.

hfwSubmit: An unsigned integer interpreted as the Boolean common data type. The value indicates whether the value of the HiddenField widget is to be included as part of the data sent when a referencing Form widget is submitted. If the value of hfwSubmit is TRUE, the HiddenFieid widget's value data is submitted as part of the form submit. If the value of hfwSubmit is FALSE, the widget's value data is not submitted as part of the form submit.

hfwSubmitName: A signed integer interpreted as a row index into the Reference Table. The entry in this row of the Reference Table indicates the location of a string containing the name to be associated with the value of this widget when the value is sent as part of the data in a form submit.

hfwValue: A signed integer which SHALL have a value between −1 and 32,767. If the value is −1 it is interpreted to indicate that there is no value associated with this HiddenField widget. Otherwise, this signed integer is interpreted as a row index into the Reference Table. The entry in this row of the Reference Table indicates the location of the value associated with this widget.

HotSpot

A HotSpot widget provides a user interface navigation element visible as a rectangular highlight area. A HotSpot widget SHALL adhere to the syntax specified by Table 44 HotSpot Widget.

TABLE 44

HotSpot Widget

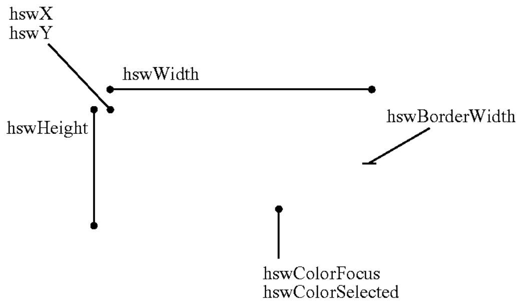

Properties Not Shown: hswBackgroundColor, hswHidden, hswDisabled, hswReporting, hswOnClick, hswOnFocus, hswOnBlur, hswType

| Syntax | Number of bits | Format |
|---|---|---|
| ebiHotSpotWidget( ) { | | |
| hswType | 8 | uint8 |

TABLE 44-continued

| HotSpot Widget | | |
|---|---|---|
| hswStyle | 16 | uint16 |
| hswX | 16 | int16 |
| hswY | 16 | int16 |
| hswWidth | 16 | int16 |
| hswHeight | 16 | int16 |
| hswHidden | 8 | boolean |
| hswDisabled | 8 | boolean |
| hswReporting | 8 | int8 |
| hswOnClick | 16 | int16 |
| hswOnFocus | 16 | int16 |
| hswOnBlur | 16 | int16 |
| } | | |

hswType: An unsigned integer indicating that this widget is a HotSpot widget. This field SHALL have the constant value 21.

hswStyle: An unsigned integer that, if non-zero, represents an offset (in octets) from the start of this ebiHotSpotWidget structure to the start of a Style structure that expresses styles to be applied, or, if zero, denotes that default styles are to be applied.

hswX: A signed integer indicating the number of pixels in the dimension from the origin of the application's root container to the origin of the hotspot, where negative values indicate that the hotspot's origin is to the left of the root container's origin. The origin of a hotspot in the x direction is the left edge of the hotspot.

hswY: A signed integer indicating the number of pixels in the y dimension from the origin of the application's root container to the origin of the hotspot, where negative values indicate that the hotspot's origin is above the root container's origin. The origin of a hotspot in they direction is the top edge of the hotspot.

hswWidth: An unsigned integer indicating the number of pixels in the x dimension from the left-most to right-most edge of the hotspot.

hswHeight: A signed integer indicating the number of pixels in the y dimension from the top-most to bottom-most edge of the hotspot.

hswHidden: An unsigned integer interpreted as a Boolean common data type value. The value indicates whether the hotpot widget is hidden or visible. If the value of hswHidden is TRUE, the hotspot widget is not rendered. If the value of hswHidden is FALSE, the HotSpot widget is rendered depending on its state.

hswDisabled: An unsigned integer interpreted as a Boolean common data type value. The value reflects the current state of the hotspot. If the value of hswDisabled is TRUE, the HotSpot widget is considered to be in the disabled state. If the value of hswDisabled is FALSE, the HotSpot widget is considered to be in the active state.

hswReporting: A signed integer which holds the identifier of a promotion with which this button is associated (prwPromoNumber, see 0 Promotion). If this value is 0, there is no promotion associated with the button.

hswOnClick: A signed integer interpreted as an index into a table of actions. If negative, its absolute value is taken as an index into the Promotion Action Table. If the value is positive, it is taken as an index into the general Action Table. The action table row referenced by this index provides an action or sequence of actions to be performed when the HotSpot widget receives an on Click event.

hswOnFocus: A signed integer interpreted as an index into the Action Table. The Action Table row referenced by this index provides an action or sequence of actions to be performed when the HotSpot widget receives an on Focus event.

hswOnBlur: A signed integer interpreted as an index into the Action Table. The Action Table row referenced by this index provides an action or sequence of actions to be performed when the HotSpot widget receives an on Blur event.

Indirect Properties

In addition to the properties specified by the above fields, a HotSpot widget has a set of indirect properties, which are mapped according to Table 45 HotSpot Widget Indirect Properties, and further described below.

In the Mapping column of Table 45 HotSpot Widget Indirect Properties, the notation *F denotes the result of dereferencing F, which is a field that references another structure.

TABLE 45

HotSpot Widget Indirect Properties

| Indirect Property | Mapping |
|---|---|
| hswBackgroundColor | *hswStyle.*ssBG2.csEnabled |
| hswBorderWidth | *hswStyle.*ssBorder.bsThickness |
| hswColorFocus | *hswStyle.*ssBG1.csFocused |
| hswColorSelected | *hswStyle.*ssBG1.csSelected |

hswBorderWidth: A signed integer indicating the pixel measurement of the width of the hotspot border.

hswBackgroundColor: A signed integer that is interpreted as a row index into the color palette represented in the palette table. This palette row specifies the color to be used to render the background of the HotSpot widget.

hswColorFocus: A signed integer that is interpreted as a row index into the color palette represented in the palette table. This palette row specifies the color to be used to render the border of the HotSpot widget when the area of the hotspot has focus.

hswColorSelected: A signed integer that is interpreted as a row index into the color palette represented in the palette table. This palette row specifies the color to be used to render the border of the HotSpot widget when the area of the hotspot is selected.

Image

An Image widget provides a user interface element that allows image information to be rendered in a rectangular area. An Image widget SHALL adhere to the syntax specified by Table 46 Image Widget.

TABLE 46

Image Widget

| Syntax | Number of bits | Format |
|---|---|---|
| ebiImageWidget( ) { | | |
| iwType | 8 | uint8 |
| iwStyle | 16 | uint16 |
| iwX | 16 | int16 |
| iwY | 16 | int16 |
| iwWidth | 16 | int16 |
| iwHeight | 16 | int16 |
| iwSrc | 16 | int16 |
| iwImgType | 8 | uint8 |
| iwHidden | 8 | boolean |
| iwBackgroundColor | 8 | int8 |
| iwPalReserve | 16 | int8 |
| } | | |

iwType: An unsigned integer indicating that this widget is an Image widget. This field SHALL have the constant value 5.

iwStyle: An unsigned integer that, if non-zero, represents an offset (in octets) from the start of this ebiImageWidget structure to the start of a Style structure that expresses styles to be applied, or, if zero, denotes that default styles are to be applied.

iwX: A signed integer indicating the number of pixels in the dimension from the origin of the application's root container to the origin of the image, where negative values indicate that the image's origin is to the left of the root container's origin. The origin of an image in the x direction is the left edge of the image.

iwY: A signed integer indicating the number of pixels in the y dimension from the origin of the application's root container to the origin of the button, where negative values indicate that the button's origin is above the root container's origin. The origin of an image in the y direction is the top edge of the image.

iwWidth: A signed integer indicating the number of pixels in the x dimension from the left-most to right-most edge of the image.

iwHeight: A signed integer indicating the number of pixels in the y dimension from the top-most to bottom-most edge of the image.

iwSrc: An signed integer interpreted as a row index into the Reference Table. The entry in this row of the Reference Table indicates the location of the image data associated with this widget.

iwImgType: An enumeration value indicating the data type of the image associated with this widget. The values of this enumeration are defined by Table 47 Image Types.

TABLE 47

Image Types

| Value | Description |
| --- | --- |
| 0 | P-frame |
| 1 | Bitmap |
| 2 | OOB bitmap |
| 3 | Jar bitmap |
| 4 | Embedded bitmap |
| 5-191 | Reserved |
| 192-255 | private use |

iwHidden: An unsigned integer interpreted as the Boolean common data type. The value indicates whether the widget is currently visible or hidden. If the value of iwHidden is TRUE, the widget is considered to be hidden and its background color as specified in iwBackgroundColor will be rendered in the area of the Image widget. If the value of iwHidden is FALSE, the widget is considered to be visible and its image data will be rendered.

iwPalReserve: A signed integer that is interpreted as indicating the number of contiguous palette entries (starting at the first entry in the palette) whose values are to be preserved without alteration during the rendering of this image. The remaining palette entries are considered mutable and may be modified during rendering of the image. Note, the modification of palette values may affect any color in the horizontal slice of the screen which contains the rectangular area of the image.

Indirect Properties

In addition to the properties specified by the above fields, an Image widget has a set of indirect properties, which are mapped according to Table 48 Image Widget Indirect Properties, and further described below.

In the Mapping column of Table 48 Inage Widget Indirect Properties, the notation *F denotes the result of dereferencing F, which is a field that references another structure.

TABLE 48

Image Widget Indirect Properties

| Indirect Property | Mapping |
| --- | --- |
| iwBackgroundColor | *iwStyle.*ssBG2.csEnabled |

iwBackgroundColor: A signed integer that is interpreted as a row index into the color palette represented in the palette table. This palette row specifies the color to be used as a background color for the Image widget.

The visibility of the background color is affected by the value of iwHidden. The background color is visible when the value of iwHidden is TRUE.

IncludedPage

An IncludedPage widget provides a logical grouping of information relevant to a page which has been included into a parent page. An IncludedPage widget SHALL adhere to the syntax specified by Table 49 IncludedPage Widget.

TABLE 49

IncludedPage Widget

| Syntax | Number of bits | Format |
| --- | --- | --- |
| ebiIncludedPageWidget( ) { | | |
| ipwType | 8 | uint8 |
| } | | |

ipwType: An unsigned integer indicating that this widget is an IncluldedPage widget. This field SHALL have the constant value 8.

MultilineText

MultilineText widget provides a user interface element which allows the display of multiple lines of dynamic text in a rectangular area. A MultilineText widget SHALL adhere to the syntax specified by Table 50 MultilineText Widget.

TABLE 50

MultilineText Widget

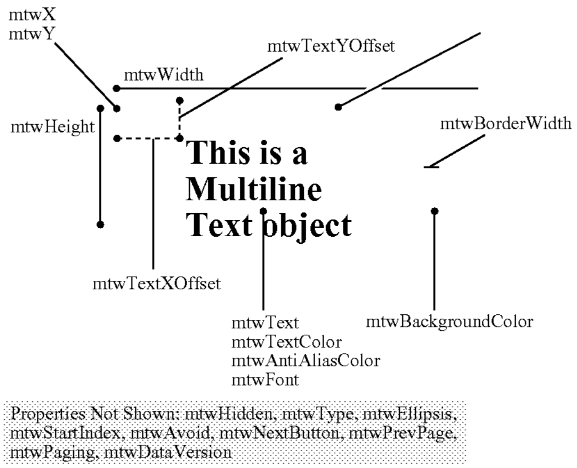

| Syntax | Number of bits | Format |
| --- | --- | --- |
| ebi MultilineTextWidget( ) { | | |
| mtwType | 8 | uint8 |
| mtwStyle | 16 | uint16 |

TABLE 50-continued

| MultilineText Widget | | |
|---|---|---|
| mtwX | 16 | int16 |
| mtwY | 16 | int16 |
| mtwWidth | 16 | int16 |
| mtwHeight | 16 | int16 |
| mtwText | 16 | int16 |
| mtwOffsetX | 8 | int8 |
| mtwOffsetY | 8 | int8 |
| mtwStartIndex | 16 | int16 |
| mtwAvoid | 16 | int16 |
| mtwNextButton | 16 | int16 |
| mtwPrevButton | 16 | int16 |
| mtwPrevPage | 16 | int16 |
| mtwHidden | 8 | boolean |
| mtwPaging | 8 | boolean |
| mtwEllipsis | 8 | boolean |
| mtwDataVersion | 16 | int16 |
| } | | |

mtwType: An unsigned integer indicating that this widget is a MultilineText widget. This field SHALL have the constant value 7.

mtwStyle: An unsigned integer that, if non-zero, represents an offset (in octets) from the start of this ebiMutlilineText-Widget structure to the start of a Style structure that expresses styles to be applied, or, if zero, denotes that default styles are to be applied.

mtwX: A signed integer indicating the number of pixels in the x dimension from the origin of the application's root container to the origin of the MultilineText widget, where negative values indicate that the widget's origin is to the left of the root container's origin.

mtw:Y A signed integer indicating the number of pixels in they dimension from the origin of the application's root container to the origin of the MultilineText widget, where negative values indicate that the widget's origin is above the root container's origin.

mtw:Width A signed integer indicating the number of pixels in the x dimension from the left-most to right-most edge of the widget's geometry.

mtwHeight: A signed integer indicating the number of pixels in they dimension from the top-most to bottom-most edge of the widget's geometry.

mtwText: A signed integer which SHALL have a value between −1 and 32,767. If the value is −1 it is interpreted to indicate that there is no text associated with this MultilineText widget. Otherwise, this value is interpreted as a row index into the Reference Table. The entry in this row of the Reference Table indicates the location of a string which holds the text associated with this MultilineText widget. The text is displayed in the widget when the widget is rendered.

mtwOffsetX: A signed integer indicating the number of pixels in the x dimension from the origin of the widget to the origin of the widget's text area, where negative values indicate that the widget's text is to the left of the widget's origin.

mtwOffsetY: A signed integer indicating the number of pixels in they dimension from the origin of the widget to the origin of the widget's text, where negative values indicate that the widget's text is above the widget's origin.

mtwStartIndex: A signed integer indicating the character number in the MultilineText widget's text with which to begin display on page two of a MultilineText widget. This value is of use to pages 2-n of a multi-page MultilineText widget.

mtwAvoid: A signed integer which SHALL have a value between −1 and 32,767. If the value is −1 it is interpreted to indicate that there is no area-to-avoid associated with this MultilineText widget. Otherwise, this value is interpreted as a row index into the Reference Table. The entry in this row of the Reference Table in an offset to the widget table associated with either a Rectangle widget or a HiddenField widget which the text in the MultilineText widget should avoid. The text will be rendered so as to run around the rectangular area of the referenced widget.

mtwNextButton: A signed integer which SHALL have a value between −1 and 32,767. If the value is −1 it is interpreted to mean that there is no next button associated with this MultilineText widget. Otherwise, this value is interpreted as a row index into the Reference Table. The entry in this row of the Reference Table is an offset to the widget table of the button widget that is responsible for paging forward through multiple pages of text associated with this widget.

mtwPrevButton: A signed integer which SHALL have a value between −1 and 32,767. If the value is −1 it is interpreted to indicate that there is no previous button associated with this MultilineText widget. Otherwise, this value is interpreted as a row index into the Reference Table. The entry in this row of the Reference Table is an offset to the sidget table of the button widget that is responsible for paging backward through multiple pages of text associated with this widget.

mtwPrevPage: A signed integer which SHALL have a value between −1 and 32,767. If the value is −1 it is interpreted to indicate that no previous page is referenced. Otherwise the value is interpreted as a row index into the Common Table Directory. The table directory row referenced will contain an offset to the widget table of a page. The Page widget referenced is the page to be used to display page one of a multi-page text where the second and subsequent pages use a different template than the first page.

mtwHidden: An unsigned integer interpreted as the Boolean common data type. The value indicates whether the MultilineText widget is currently visible or hidden. If the value of mtwHidden is TRUE, the widget is considered to be hidden and its background color as specified in mtwBackground-Color will be rendered in the area of the widget. If the value of mtwHidden is FALSE, the widget is considered to be visible and its text data will be rendered.

mtwPaging: An unsigned integer interpreted as a Boolean common data type value. The value indicates whether the MultilineText widget is a multi-page structure. If the value of mtwPaging is TRUE, the MultilineText widget contains multiple pages of text. If the value of mtwPaging is FALSE, the MultilineText widget does not contain multiple pages of text.

mtwEllipsis: An unsigned integer interpreted as a Boolean common data type value. If the value of mtwEllipsis is TRUE and the widget text overflows the widget's text area, an ellipsis is appended to the last line of text that fits in the widget.

mtwDataVersion: A signed integer that is interpreted as a version identifier for the text data displayed in the Multiline-Text widget. On emission, this field contains the initial value 0. During presentation of the page, this value is incremented by the application platform should the text string be revised.

Indirect Properties

In addition to the properties specified by the above fields, a MultilineText widget has a set of indirect properties, which are mapped according to Table 51 Multiline Text Widget Indirect Properties, and further described below.

In the Mapping column of Table 51 Multiline Text Widget Indirect Properties, the notation *F denotes the result of dereferencing F, which is a field that references another structure.

TABLE 51

| MultilineText Widget Indirect Properties | |
|---|---|
| Indirect Property | Mapping |
| mtwBackgroundColor | *hswStyle.*ssBG2.csEnabled |
| mtwAntiAliasColor | *hswStyle.*ssFG2.csEnabled |
| mtwTextColor | *hswStyle.*ssFG1.csEnabled |
| mtwFont | *hswStyle.*ssFont.fsEnabled |
| mtwBorderWidth | *hswStyle.*ssBorder.bsThickness |
| mtwBorderColor | *hswStyle.*ssBorder.csEnabled |

mtwBackgroundColor: A signed integer that is interpreted as a row index into the color palette represented in the palette table. This palette row specifies the color to be used as a background color for the MultillineText widget.

The visibility of the background color is affected by the value of mtwHidden. The background color is visible when the value of mtwHidden is TRUE.

mtwAntiAliasColor: A signed integer that is interpreted as a row index into the color palette represented in the palette table. This palette row specifies the color to be used as a hint to the platform about how to best anti-alias the widget's text.

mtwTextColor: A signed integer that is interpreted as a row index into the color palette represented in the palette table. This palette row specifies the color to be used to render the text associated with the MultilineText widget.

mtwFont: A signed integer interpreted as a Font Index reference type value. The value indicates the font face that will be used to render the text in the MultilineText widget.

mtwBorderWidth: A signed integer indicating the pixel measurement of the width of the MultilineText widget's border.

mtwBorderColor: A signed integer that is interpreted as a row index into the color palette represented in the palette table. This palette row specifies the color to be used to render the border of the MultilineText widget.

Page

A Page widget provides a logical grouping of information relevant to the display of an individual screen of the application. A Page widget SHALL adhere to the syntax specified by Table 52 Page Widget.

TABLE 52

| Page Widget | | |
|---|---|---|
| Syntax | Number of bits | Format |
| ebiPageWidget( ) { | | |
| pwType | 8 | uint8 |
| pwStyle | 16 | uint16 |
| pwDefaultFocus | 16 | int16 |
| pwBackgroundRef | 16 | int16 |
| pwSelectedButton | 16 | int16 |
| pwBackgroundMode | 8 | uint8 |
| pwUniquePageID | 32 | int32 |
| pwStartNPT | 32 | int32 |
| pwEndNPT | 32 | int32 |
| pwSegmentStartNPT | 32 | int32 |
| pwSegmentEndNPT | 32 | int32 |
| pwTimeout | 32 | int32 |
| pwRequireFreshData | 8 | boolean |
| pwProfile | 8 | uint8 |
| pwOnNewData | 16 | int16 |
| pwOnLoad | 16 | int16 |
| pwPrerender | 16 | int16 |
| pwOnVODEnd | 16 | int16 |
| pwOnVODSegmentEnd | 16 | int16 |
| pwOnTimeout | 16 | int16 |

TABLE 52-continued

| | | |
|---|---|---|
| pwOnChannelChange | 16 | int16 |
| pwEvents | 16 | uint16 |
| pwNavmap | 16 | uint16 |
| pwDataFileSrcName | 16 | uint16 |
| pwTriggerHandler | 16 | uint16 |
| } | | |

pwType: An unsigned integer indicating that this widget is a Page widget. This field SHALL have the constant value 1.

pwStyle: An unsigned integer that represents an offset (in octets) from the start of this ebiPageWidget structure to the start of a Style structure that expresses default styles for the page defined by this Page widget as well as styles that apply specifically to this page.

Note: Unlike the style property of other widgets, the style property of a Page widget must be specified so as to provide a basis for style defaulting in the absence of other style specifications.

pwDefaultFocus: A signed integer which SHALL have a value between −1 and 32,767. If the value is −1 it is interpreted to indicate that there is no widget which is to receive default focus associated with this Page widget. Otherwise, this value is interpreted as a row index into the Reference Table. The entry in this row of the Reference Table is an offset to the widget table of the navigatable widget that will have focus when the page is initially rendered.

pwBackgroundRef: A signed integer which SHALL have a value between −1 and 32,767. If the value is −1 it is interpreted to indicate that there is no background image data associated with this Page widget. Otherwise, this value is interpreted as a row index into the Reference Table. The entry in this row of the Reference Table provides the location of image data associated with the background of this Page widget.

pwSelectedButton: A signed integer which SHALL have a value between −1 and 32,767. If the value is −1 it is interpreted to indicate that there is no widget associated with this page that, upon initial rendering of the page, will appear in a selected state. Otherwise, this value is interpreted as a row index into the Reference Table. The entry in this row of the Reference Table is an offset to the widget table of the navigatable widget that will appear in the selected state when the page is initially rendered.

pwBackgroundMode: An enumeration value indicating the type of background for this Page widget, where the values of this enumeration are defined by Table 53 BackgroundMode Types.

TABLE 53

| BackgroundMode Types | |
|---|---|
| Value | Description |
| 0 | Solid |
| 1 | I-Frame |
| 2 | Broadcast video |
| 3 | VOD |
| 4 | Bitmap |
| 5 | Bitmap-OOB |
| 6 | Bitmap-JAR |
| 7 | Embedded bitmap |
| 8 | Broadcast call letters |
| 7-191 | reserved |
| 192-255 | private use |

pwUniquePageID: A signed integer which represents an identifier for this page which is unique within the application.

pwStartNPT: A signed integer interpreted as a number of milliseconds. The value indicates the starting NPT to apply to a background VOD resource associated with this Page widget. The VOD stream will be started, immediately upon page load, at the specified NPT offset within the stream.

pwEndNPT8: A signed integer interpreted as a number of milliseconds. The value indicates the ending NPT to apply to a background VOD resource associated with this Page widget. Playback of the VOD stream will be terminated at the specified NPT offset within the stream. When the pwEndNPT is reached an on VODEnd event will be fired.

pwSegmentStartNPT: A signed integer interpreted as a number of milliseconds. The value indicates the starting NPT to apply to the current segment of a background VOD resource associated with this Page widget. The VOD stream segment will be started, immediately upon page load, at the specified NPT offset within the stream.

pwSegmentEndNPT: A signed integer interpreted as a number of milliseconds. The value indicates the ending NPT to apply to the current segment of a background VOD resource associated with this Page widget. Playback of the VOD stream segment will be terminated at the specified NPT offset within the stream. When the pwSegmentEndNPT is reached an on VODSegmentEnd event will be fired.

pwTimeout: A signed integer interpreted as a number of milliseconds. The value indicates the length of time that the user may be idle on this page before the on Timeout event is fired.

pwRequireFreshData: An unsigned integer interpreted as a Boolean common data type value. The value indicates whether the Page widget should check the data carousel for an update to its data content before drawing itself. If the value of pwRequireFreshData is TRUE, the Page widget shall check for a data update. If the value of pwRequireFreshData is FALSE, the Page widget shall not check for a data update.

pwProfile: An enumeration value indicating what kind of profile is required to be consulted before rendering this page, where the values of this enumeration are defined by Table 53 BackgroundMode Types

TABLE 54

| Profile Types | |
|---|---|
| Value | Description |
| 0 | No |
| 1 | User |
| 2 | Fresh |
| 3 | Latest |
| 4-191 | reserved |
| 192-255 | private use |

No indicates that a user profile should not be consulted (consulting the default profile is sufficient). User means that a user profile should be consulted. Fresh indicates that if the current user profile is stale, that a fresh profile will be secured before page rendering. Latest indicates that a fresh profile will always be secured before page rendering.

pwOnNewData: A signed integer interpreted as an index into the Action Table. The Action Table row referenced by this index provides an action or sequence of actions to be performed when the Page widget receives an on NewData event.

pwOnLoad: A signed integer interpreted as an index into the Action Table. The Action Table row referenced by this index provides an action or sequence of actions to be performed when the Page widget receives an onLoad event.

pwPrerender: A signed integer interpreted as an index into the Action Table. The Action Table row referenced by this index provides an action or sequence of actions to be performed before the Page widget is rendered.

pwOnVODEnd: A signed integer interpreted as an index into the Action Table. The Action Table row referenced by this index provides an action or sequence of actions to be performed when the Page widget receives an on VODEnd event.

pwOnVODSegmentEnd: A signed integer interpreted as an index into the Action Table. The Action Table row referenced by this index provides an action or sequence of actions to be performed when the Page widget receives an on VODSegmentEnd event.

pwOnTimeout: A signed integer interpreted as an index into the Action Table. The Action Table row referenced by this index provides an action or sequence of actions to be performed when the Page widget receives an on Timeout event.

pwOnChannelChange: A signed integer interpreted as an index into the Action Table. The Action Table row referenced by this index provides an action or sequence of actions to be performed when the Page widget receives an on ChannelChange event.

pwEvents: A signed integer which SHALL have a value between −1 and 32,767. If the value is −1 it is interpreted to indicate that there is no Events structure associated with this Page widget. Otherwise, this value is interpreted as an offset pointing to an Events structure associated with this Page widget.

pwNavmap: A signed integer which SHALL have a value between −1 and 32,767. If the value is −1 it is interpreted to indicate that there is no NavMap structure associated with this Page widget. Otherwise, this value is interpreted as an offset pointing to the NavMap structure associated with this Page widget.

pwDataFileSrcName: A signed integer which SHALL have a value between −1 and 32,767. If the value is −1 it is interpreted to indicate that there is no data file associated with this Page widget. Otherwise the value is interpreted as an offset pointing to a structure of the string data type which contains the name of the data file associated with this Page widget.

pwTriggerList: A signed integer which SHALL have a value between −1 and 32,767. If the value is −1 it is interpreted to indicate that there is no Trigger List structure associated with this Page widget. Otherwise, this value is interpreted as an offset pointing to the Trigger List structure associated with this Page widget.

PageInclusion

A PageInclusion widget provides a logical construct which allows a widget table to refer to another Page widget and it's collection of objects. A PageInclusion widget SHALL adhere to the syntax specified by Table 55 PageInclusion Widget.

TABLE 55

| PageInclusion Widget | | |
|---|---|---|
| Syntax | Number of bits | Format |
| ebiPageInclusionWidget( ) { | | |
| piwType | 8 | uimsbf |
| piwIncludedPageIndex | 16 | uimsbf |
| } | | |

piwType: An unsigned integer indicating that this widget is a PageInclusion widget. This field SHALL have the constant value 18.

piwIncludedPageIndex: A signed integer interpreted as an index into the Common Table Directory. The referenced row of the directory will contain an offset to the Page Widget table of the included page. The first row of the indicated Page Widget table will refer to the IncludedPage widget associated with the included page. The subsequent rows of the indicated Page Widget table will refer to the widgets which constitute the included page.

Promotion

A Promotion widget provides a link between one or more other widgets and a resource. This link allows properties of the associated widgets to be populated at run time by programmed content. A Promotion widget SHALL adhere to the syntax specified by Table 56 Promotion Widget.

TABLE 56

Promotion Widget

| Syntax | Number of bits | Format |
|---|---|---|
| ebiPromotionWidget( ) { | | |
| prwType | 8 | uint8 |
| prwResource | 16 | int16 |
| prwPromos | 16 | uint16 |
| prwDataVersion | 16 | int16 |
| prwPromoNumber | 8 | int8 |
| } | | |

prwType: An unsigned integer indicating that this widget is a Promotion widget. This field SHALL have the constant value 19.

prwResource: A signed integer interpreted as an identifier.

prwPromos: A signed integer which SHALL have a value between −1 and 32,767. If the value is −1 it is interpreted to indicate that there is no Items structure associated with this Promotion widget. Otherwise, this value is interpreted as an offset pointing to the Items structure associated with this Promotion widget.

prwDataVersion: A signed integer that is interpreted as a version identifier for the Promotion widget. On emission, this field contains the initial value 0. During presentation of the page, this value is incremented by the application platform should the Promotion be revised.

prwPromoNumber: A signed integer which uniquely identifies this promotion within the application.

Radio

A Radio widget provides a user interface input element that takes the visual form of a radio button or checkbox. A radio button is distinguished from a checkbox in that a Radio widget has a parent RadioGroup widget to which it conceptually belongs. A checkbox does not have an associated RadioGroup widget. A Radio widget SHALL adhere to the syntax specified by Table 57 Radio Widget.

TABLE 57

Radio Widget

Radio Widget: checkbox

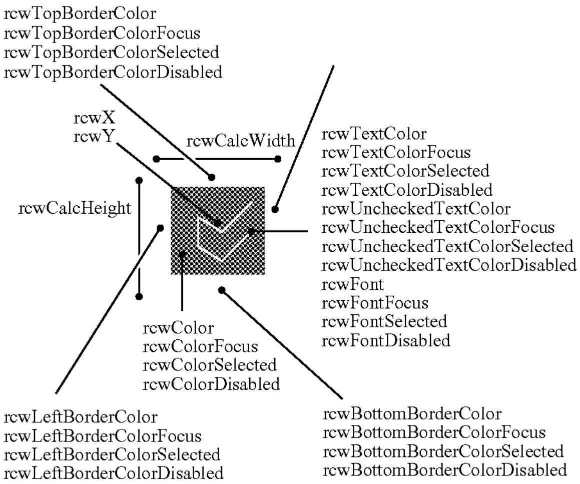

Properties Not Shown: rcwBackgroundColor, rcwHidden, rcwDisabled, rcwReporting, rcwOnClick, rcwOnFocus, rcwOnBlur, rcwType, rcwSubmit, rcwSubmitName, rcwChecked Radio Widget: radio button

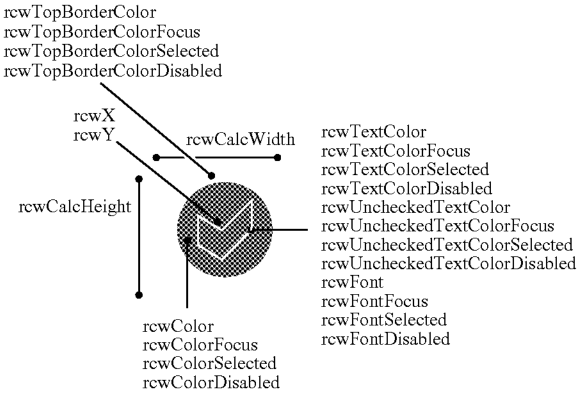

Properties Not Shown: rcwBackgroundColor, rcwHidden, rcwDisabled, rcwReporting, rcwOnClick, rcwOnFocus, rcwOnBlur, rcwType, rcwSubmit, rcwSubmitName, rcwChecked, rcwParent, rcwSelf
Properties for <radiogroup> inclusion: rgwHidden, rgwSubmit, rgwTableIndex, rgwSelected, rgwSubmitName

| Syntax | Number of bits | Format |
|---|---|---|
| ebiRadioWidget( ) { | | |
| rcwType | 8 | uint8 |
| rcwStyle | 16 | uint16 |
| rcwX | 16 | int16 |
| rcwY | 16 | int16 |
| rcwCalcWidth | 16 | int16 |
| rcwCalcHeight | 16 | int16 |
| rcwHidden | 8 | boolean |
| rcwChecked | 8 | boolean |
| rcwSubmit | 8 | boolean |
| rcwDisabled | 8 | boolean |
| rcwParent | 16 | int16 |
| rcwSelf | 16 | int16 |
| rcwSubmitname | 16 | int16 |

TABLE 57-continued

| Radio Widget | | |
|---|---|---|
| rcwOnClick | 16 | int16 |
| rcwOnFocus | 16 | int16 |
| rcwOnBlur | 16 | int16 |
| } | | |

rcwType: An unsigned integer indicating that this widget is a Radio widget. This field SHALL have the constant value 13.

rcwStyle: An unsigned integer that, if non-zero, represents an offset (in octets) from the start of this ebiRadioWidget structure to the start of a Style structure that expresses styles to be applied, or, if zero, denotes that default styles are to be applied.

rcwX: A signed integer indicating the number of pixels in the x dimension from the origin of the application's root container to the origin of the Radio widget, where negative values indicate that the widget's origin is to the left of the root container's origin.

rcwY: A signed integer indicating the number of pixels in they dimension from the origin of the application's root container to the origin of the Radio widget, where negative values indicate that the widget's origin is above the root container's origin.

rcwCalcWidth: A signed integer indicating the number of pixels in the x dimension from the left-most to right-most edge of the Radio widget's geometry.

rcwCalcHeight: A signed integer indicating the number of pixels in they dimension from the top-most to bottom-most edge of the Radio widget's geometry.

rcwHidden: An unsigned integer interpreted as the Boolean common data type. The value indicates whether the Radio widget is currently visible or hidden. If the value of rcwHidden is TRUE, the widget is considered to be hidden and its background color as specified in rcwBackgroundColor will be rendered in the area of the Radio widget. If the value of rcwHidden is FALSE, the widget is considered to be visible and it will be rendered.

rcwChecked: An unsigned integer interpreted as a Boolean common data type value. The value indicates whether the Radio widget is considered to be in the checked or unchecked state. If the value of rcwChecked is TRUE, the Radio widget is considered to be checked. If the value of rcwChecked is FALSE, the Radio widget is considered to be unchecked.

rcwSubmit: An unsigned integer interpreted as the Boolean common data type.

For a Radio widget which behaves as a checkbox, the value indicates whether the Radio widget's value is to be included as part of the data sent during the submittal of a Form widget which references this Radio widget. If the value of rcwSubmit is TRUE, the widget's value data is submitted as part of a form submit. If the value of rcwSubmit is FALSE, the widget's value data is not submitted as part of the form submit.

In the case of a Radio widget which behaves as a radio button the value of this field is ignored. Note, submission of the value of a Radio widget acting as a radio button is controlled by the rgwSubmit field of the RadioGroup widget which references the Radio widget.

rcwDisabled: An unsigned integer interpreted as a Boolean common data type value. The value reflects the current state of the Radio widget. If the value of rcwDisabled is TRUE, the Radio widget is considered to be in the disabled state. If the value of hswDisabled is FALSE, the Radio widget is considered to be in the active state.

rcwParent: A signed integer which SHALL have a value between −1 and 32,767. If the value is −1 it is interpreted to indicate that there is no RadioGroup widget associated with this widget. Otherwise the value is interpreted as a row index into the Reference Table. The entry in this row of the Reference Table is an offset to the widget table of the RadioGroup widget with which this Radio widget is associated. Note, if this Radio widget is not associated with a RadioGroup widget then this Radio widget is of the checkbox type.

rcwSelf: A signed integer interpreted as a row index into the Reference Table. The entry in this row of the Reference Table is the offset to the widget table of this Radio widget.

rcwSubmitName: A signed integer interpreted as a row index into the Reference Table. The entry in this row of the Reference Table indicates the location of a string which contains the name to be associated with the value of this widget when that value is submitted as part of a Form widget submission.

rcwOnClick: A signed integer interpreted as an index into the Action Table. The Action Table row referenced by this index provides an action or sequence of actions to be performed when the Radio widget receives an on Click event.

rcwOnFocus: A signed integer interpreted as an index into the Action Table. The Action Table row referenced by this index provides an action or sequence of actions to be performed when the Radio widget receives an on Focus event rcwOnBlur: A signed integer interpreted as an index into the Action Table. The Action Table row referenced by this index provides an action or sequence of actions to be performed when the Radio widget receives an on Blur event Indirect Properties In addition to the properties specified by the above fields, a Radio widget has a set of indirect properties, which are mapped according to Table 58 Radio Widget Indirect Properties, and further described below.

In the Mapping column of Table 58 Radio Widget Indirect Properties, the notation *F denotes the result of dereferencing F, which is a field that references another structure.

TABLE 58

Radio Widget Indirect Properties

| Indirect Property | Mapping |
|---|---|
| rcwTextColor | *rcwStyle.*ssFG1.csEnabled |
| rcwTextColorFocus | *rcwStyle.*ssFG1.csFocused |
| rcwTextColorSelected | *rcwStyle.*ssFG1.csSelected |
| rcwTextColorDisabled | *rcwStyle.*ssFG1.csDisabled |
| rcwUncheckedTextColor | *rcwStyle.*ssFG2.csEnabled |
| rcwUncheckedTextColorFocus | *rcwStyle.*ssFG2.csFocused |
| rcwUncheckedTextColorSelected | *rcwStyle.*ssFG2.csSelected |
| rcwUncheckedTextColorDisabled | *rcwStyle.*ssFG2.csDisabled |
| rcwTopColor | *rcwStyle.*ssBorder.*bsTop.csEnabled |
| rcwTopColorFocus | *rcwStyle.*ssBorder.*bsTop.csFocused |
| rcwTopColorSelected | *rcwStyle.*ssBorder.*bsTop.csSelected |
| rcwTopColorDisabled | *rcwStyle.*ssBorder.*bsTop.csDisabled |
| rcwBottomColor | *rcwStyle.*ssBorder.*bsBottom.csEnabled |
| rcwBottomColorFocus | *rcwStyle.*ssBorder.*bsBottom.csFocused |
| rcwBottomColorSelected | *rcwStyle.*ssBorder.*bsBottom.csSelected |
| rcwBottomColorDisabled | *rcwStyle.*ssBorder.*bsBottom.csDisabled |
| rcwLeftColor | *rcwStyle.*ssBorder.*bsLeft.csEnabled |

TABLE 58-continued

| Radio Widget Indirect Properties | |
|---|---|
| Indirect Property | Mapping |
| rcwLeftColorFocus | *rcwStyle.*ssBorder.*bsLeft.csFocused |
| rcwLeftColorSelected | *rcwStyle.*ssBorder.*bsLeft.csSelected |
| rcwLeftColorDisabled | *rcwStyle.*ssBorder.*bsLeft.csDisabled |
| rcwRightColor | *rcwStyle.*ssBorder.*bsRight.csEnabled |
| rcwRightColorFocus | *rcwStyle.*ssBorder.*bsRight.csFocused |
| rcwRightColorSelected | *rcwStyle.*ssBorder.*bsRight.csSelected |
| rcwRightColorDisabled | *rcwStyle.*ssBorder.*bsRight.csDisabled |
| rcwColor | *rcwStyle.*ssBG1.csEnabled |
| rcwColorFocus | *rcwStyle.*ssBG1.csFocused |
| rcwColorSelected | *rcwStyle.*ssBG1.csSelected |
| rcwColorDisabled | *rcwStyle.*ssBG1.csDisabled |
| rcwUncheckedColor | *rcwStyle.*ssBG2.csEnabled |
| rcwUncheckedColorFocus | *rcwStyle.*ssBG2.csFocused |
| rcwUncheckedColorSelected | *rcwStyle.*ssBG2.csSelected |
| rcwUncheckedColorDisabled | *rcwStyle.*ssBG2.csDisabled |
| rcwFont | *rcwStyle.*ssFont.fsEnabled |
| rcwFontFocus | *rcwStyle.*ssFont.fsFocused |
| rcwFontSelected | *rcwStyle.*ssFont.fsSelected |
| rcwFontDisabled | *rcwStyle.*ssFont.fsDisabled |

rcwBackgroundColor:: A signed integer that is interpreted as a row index into the color palette represented in the palette table. This palette row specifies the color to be used as a background color for the Radio widget.

The visibility of the background color is affected by the value of rcwHidden. The background color is visible when the value of rcwHidden is TRUE.

rcwTextColor: A signed integer that is interpreted as a row index into the color palette represented in the palette table. This palette row specifies the color to be used to render the label text of the Radio widget when the widget is in the enabled state.

rcwTextColorFocus: A signed integer that is interpreted as a row index into the color palette represented in the palette table. This palette row specifies the color to be used to render the label text of the Radio widget when the widget is in the focused state.

rcwTextColorSelected: A signed integer that is interpreted as a row index into the color palette represented in the palette table. This palette row specifies the color to be used to render the label text of the Radio widget when the widget is in the selected state.

rcwTextColorDisabled: A signed integer that is interpreted as a row index into the color palette represented in the palette table. This palette row specifies the color to be used to render the label text of the Radio widget when the widget is in the disabled state.

rcwUncheckedTextColor: A signed integer that is interpreted as a row index into the color palette represented in the palette table. This palette row specifies the color to be used to render the label text of the Radio widget when the widget is in the unchecked and enabled state.

rcwUncheckedTextColorFocus: A signed integer that is interpreted as a row index into the color palette represented in the palette table. This palette row specifies the color to be used to render the label text of the Radio widget when the widget is in the unchecked and focused state.

rcwUncheckedTextColorSelected: A signed integer that is interpreted as a row index into the color palette represented in the palette table. This palette row specifies the color to be used to render the label text of the Radio widget when the widget is in the unchecked and selected state.

rcwUncheckedTextColorDisabled: A signed integer that is interpreted as a row index into the color palette represented in the palette table. This palette row specifies the color to be used to render the label text of the Radio widget when the widget is in the unchecked and disabled state rcwTopColor: A signed integer that is interpreted as a row index into the color palette represented in the palette table. This palette row specifies the color to be used to render the top border of the Radio widget when the widget is in the enabled state.

rcwTopColorFocus: A signed integer that is interpreted as a row index into the color palette represented in the palette table. This palette row specifies the color to be used to render the top border of the Radio widget when the widget is in the focused state.

rcwTopColorSelected: A signed integer that is interpreted as a row index into the color palette represented in the palette table. This palette row specifies the color to be used to render the top border of the Radio widget when the widget is in the selected state.

rcwTopColorDisabled: A signed integer that is interpreted as a row index into the color palette represented in the palette table. This palette row specifies the color to be used to render the top border of the Radio widget when the widget is in the disabled state.

rcwBottomColor: A signed integer that is interpreted as a row index into the color palette represented in the palette table. This palette row specifies the color to be used to render the bottom border of the Radio widget when the widget is in the enabled state.

rcwBottomColorFocus: A signed integer that is interpreted as a row index into the color palette represented in the palette table. This palette row specifies the color to be used to render the bottom border of the Radio widget when the widget is in the focused state.

rcwBottomColorSelected: A signed integer that is interpreted as a row index into the color palette represented in the palette table. This palette row specifies the color to be used to render the bottom border of the Radio widget when the widget is in the selected state.

rcwBottomColorDisabled: A signed integer that is interpreted as a row index into the color palette represented in the palette table. This palette row specifies the color to be used to render the bottom border of the Radio widget when the widget is in the disabled state.

rcwLeftColor: A signed integer that is interpreted as a row index into the color palette represented in the palette table. This palette row specifies the color to be used to render the left border of the Radio widget when the widget is in the enabled state.

rcwLeftColorFocus: A signed integer that is interpreted as a row index into the color palette represented in the palette table. This palette row specifies the color to be used to render the left border of the Radio widget when the widget is in the focused state.

rcwLeftColorSelected: A signed integer that is interpreted as a row index into the color palette represented in the palette table. This palette row specifies the color to be used to render the left border of the Radio widget when the widget is in the selected state.

rcwLeftColorDisabled: A signed integer that is interpreted as a row index into the color palette represented in the palette table. This palette row specifies the color to be used to render the left border of the Radio widget when the widget is in the disabled state.

rcwRightColor: A signed integer that is interpreted as a row index into the color palette represented in the palette table. This palette row specifies the color to be used to render the right border of the Radio widget when the widget is in the enabled state.

rcwRightColorFocus: A signed integer that is interpreted as a row index into the color palette represented in the palette table. This palette row specifies the color to be used to render the right border of the Radio widget when the widget is in the focused state.

rcwRightColorSelected: A signed integer that is interpreted as a row index into the color palette represented in the palette table. This palette row specifies the color to be used to render the right border of the Radio widget when the widget is in the selected state.

rcwRightColorDisabled: A signed integer that is interpreted as a row index into the color palette represented in the palette table. This palette row specifies the color to be used to render the right border of the Radio widget when the widget is in the disabled state.

rcwColor: A signed integer that is interpreted as a row index into the color palette represented in the palette table. This palette row specifies the color to be used to render the fill of the Radio widget when the widget is in the checked and enabled states.

rcwColorFocus: A signed integer that is interpreted as a row index into the color palette represented in the palette table. This palette row specifies the color to be used to render the fill of the Radio widget when the widget is in the checked and focused states.

rcwColorSelected: A signed integer that is interpreted as a row index into the color palette represented in the palette table. This palette row specifies the color to be used to render the fill of the Radio widget when the widget is in the checked and selected states.

rcwColorDisabled: A signed integer that is interpreted as a row index into the color palette represented in the palette table. This palette row specifies the color to be used to render the fill of the Radio widget when the widget is in the checked and disabled states.

rcwUncheckedColor: A signed integer that is interpreted as a row index into the color palette represented in the palette table. This palette row specifies the color to be used to render the fill of the Radio widget when the widget is in the unchecked and enabled states.

rcwUncheckedColorFocus: A signed integer that is interpreted as a row index into the color palette represented in the palette table. This palette row specifies the color to be used to render the fill of the Radio widget when the widget is in the unchecked and focused states.

rcwUncheckedColorSelected: A signed integer that is interpreted as a row index into the color palette represented in the palette table. This palette row specifies the color to be used to render the fill of the Radio widget when the widget is in the unchecked and selected states.

rcwUncheckedColorDisabled: A signed integer that is interpreted as a row index into the color palette represented in the palette table. This palette row specifies the color to be used to render the fill of the Radio widget when the widget is in the unchecked and disabled states.

rcwFont:: A signed integer interpreted as a Font Index reference type value. The value indicates the font face that will be used to render the text in the Radio widget when the widget is in the enabled state.

rcwFontFocus: A signed integer interpreted as a Font Index reference type value. The value indicates the font face that will be used to render the text in the Radio widget when the widget is in the focused state.

rcwFontSelected: A signed integer interpreted as a Font Index reference type value. The value indicates the font face that will be used to render the text in the Radio widget when the widget is in the selected state.

rcwFontDisabled: A signed integer interpreted as a Font Index reference type value. The value indicates the font face that will be used to render the text in the Radio widget when the widget is in the disabled state.

RadioGroup

A RadioGroup widget is a user interface control element that provides a grouping of Radio widgets. Only one widget in a radio group is allowed to be in the checked state at any particular time. A RadioGroup widget SHALL adhere to the syntax specified by Table 59 RadioGroup Widget.

TABLE 59

RadioGroup Widget

| Syntax | Number of bits | Format |
|---|---|---|
| ebiRadioGroupWidget( ) { | | |
| rgwType | 8 | uint8 |
| rgwHidden | 8 | boolean |
| rgwSubmit | 8 | boolean |
| rgwTableIndex | 16 | int16 |
| rgwSelected | 16 | int16 |
| rgwSubmitName | 16 | int16 |
| } | | |

rgwType: An unsigned integer indicating that this widget is a RadioGroup widget. This field SHALL have the constant value 12.

rgwHidden: An unsigned integer interpreted as a Boolean common data type value. The value indicates whether the Radio widgets that comprise this RadioGroup widget are hidden or visible. If the value of rgwHidden is TRUE, the constituent Radio widgets are not rendered. If the value of rgwHidden is FALSE, the constituent Radio widgets are rendered.

Note the value of rgwHidden on the RadioGroup widget takes precedence over the rgHidden property of the individual members of the radio group.

rgwSubmit: An unsigned integer interpreted as the Boolean common data type. The value indicates whether the value of one of the Radio widgets which constitute this RadioGroup widget is to be submitted as part of the data sent when a Form widget is submitted which references this RadioGroup widget. If the value of rgwSubmit is TRUE, the selected Radio widgets' value data is submitted as part of the form submit. If the value of rgwSubmit is FALSE, the widgets' value data is not submitted as part of the form submit.

Note if the value of rgwSubmit of the RadioGroup widget indicates that the value of the RadioGroup should not be sent, the value of the RadioGroup will not be sent even if the fwSubmit property of the Form widget which references this RadioGroup indicates that form item data should be sent.

rgwTableIndex: A signed integer interpreted as an index into the Common Table Directory. The referenced row of the directory will contain an offset to the RadioGroup widget table of the of the radio group with which this RadioGroup widget is associated. The first row of the indicated widget table will refer to this RadioGroup widget. The subsequent rows of the indicated widget table will refer to the Radio widgets which constitute the radio group.

rgSelected: A signed integer interpreted as a row index into the Reference Table. The entry in this row of the Reference Table is an offset to the widget table of the Radio widget, a member of this radiogroup, which will be in the checked state when this radio group is first rendered.

rgwSubmitName: A signed integer interpreted as a row index into the Reference Table. The entry in this row of the Reference Table indicates the location of a string which contains the name which will be associated with the value of this widget in a form submission.

RadioGroupInclusion

A RadioGroupInclusion widget provides a logical construct which allows a widget table to refer to the collection of Radio widgets that constitute a RadioGroup widget. A RadioGroupInclusion widget SHALL adhere to the syntax specified by Table 60 RadioGroupInclusion Widget.

TABLE 60

RadioGroupInclusion Widget

| Syntax | Number of bits | Format |
|---|---|---|
| ebiRadioGroupInclusionWidget( ) { | | |
| riwType | 8 | uint8 |
| riwRadioGroupIndex | 16 | int16 |
| } | | |

riwType: An unsigned integer indicating that this widget is a RadioGroupInclusion widget. This field SHALL have the constant value 23.

riwRadioGroupIndex: A signed integer interpreted as an index into the Common Table Directory. The referenced row of the table directory will contain an offset to the RadioGroup widget table of the included radio group.

Rectangle

A Rectangle widget provides a user interface element that allows a rectangular area to be rendered. A Rectangle widget SHALL adhere to the syntax specified by Table 61 Rectangle Widget.

TABLE 61

Rectangle Widget

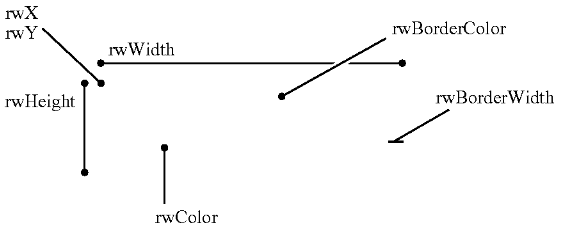

Properties Not Shown: rwType, rwHidden, rwBackgroundColor, rwRound, rwXRadius, rwYRadius

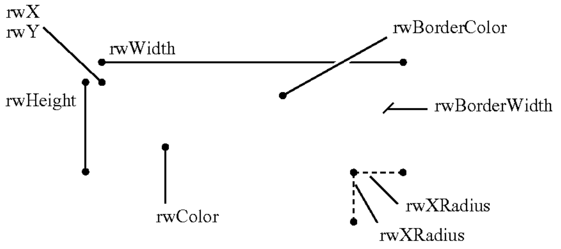

Properties Not Shown: rwType, rwHidden, rwBackgroundColor

| Syntax | Number of bits | Format |
|---|---|---|
| ebiRectangleWidget( ) { | | |
| rwType | 8 | uint8 |
| rwStyle | 16 | uint16 |
| rwX | 16 | int16 |
| rwY | 16 | int16 |
| rwWidth | 16 | int16 |
| rwHeight | 16 | int16 |
| rwHidden | 8 | boolean |
| rwXRadius | 8 | uint8 |
| rwYRadius | 8 | uint8 |
| } | | |

rwType: An unsigned integer indicating that this widget is a Rectangle widget. This field SHALL have the constant value 10.

rwStyle: An unsigned integer that, if non-zero, represents an offset (in octets) from the start of this ebiRectangleWidget structure to the start of a Style structure that expresses styles to be applied, or, if zero, denotes that default styles are to be applied.

rwX: A signed integer indicating the number of pixels in the dimension from the origin of the application's root container to the origin of the Rectangle widget, where negative values indicate that the widget's origin is to the left of the root container's origin. The origin of an Rectangle widget in the x direction is the left edge of the widget.

rwY: A signed integer indicating the number of pixels in they dimension from the origin of the application's root container to the origin of the Rectangle widget, where negative values indicate that the widget's origin is above the root container's origin. The origin of a widget in they direction is the top edge of the widget.

rwWidth: A signed integer indicating the number of pixels in the x dimension from the left-most to right-most edge of the widget.

rwHeight: A signed integer indicating the number of pixels in they dimension from the top-most to bottom-most edge of the widget.

rwHidden: An unsigned integer interpreted as the Boolean common data type. The value indicates whether the Rectangle widget is currently visible or hidden. If the value of rwHidden is TRUE, the widget is considered to be hidden and its background color as specified in rwBackgroundColor will be rendered in the area of the widget. If the value of Hidden is FALSE, the Rectangle widget is considered to be visible and it will be rendered.

rwXRadius: An unsigned integer which indicates the number pixels of offset right from the left edge or left from the right edge of the Rectangle widget to locate a center point from which to draw a curved corner. The value of rwXRadius is ignored if the value of rwRound is FALSE.

rwYRadius: An unsigned integer which indicates the number pixels of offset down from the top edge or up from the bottom edge of the Rectangle widget to locate a center point from; which to draw a curved corner. The value of rwYRadius is ignored if the value of rwRound is FALSE.

Indirect Properties

In addition to the properties specified by the above fields, a Rectangle widget has a set of indirect properties, which are mapped according to Table 62 Rectangle Widget Indirect Properties, and further described below.

In the Mapping column of Table 62 Rectangle Widget Indirect Properties, the notation *F denotes the result of dereferencing F, which is a field that references another structure.

TABLE 62

Rectangle Widget Indirect Properties

| Indirect Property | Mapping |
|---|---|
| rwBorderWidth | *rwStyle.*ssBorder.bsThickness |
| rwBorderColor | *rwStyle.*ssBorder.csEnabled |
| rwColor | *rwStyle.*ssBG1.csEnabled |
| rwBackgroundColor | *rwStyle.*ssBG2.csEnabled |
| rwRound | *rwStyle.*ssBorder.bsJoinStyle |

rwBorderWidth: A signed integer indicating the pixel measurement of the width of the widget's border.

rwBorderColor: A signed integer that is interpreted as a row index into the color palette represented in the palette table. This palette row specifies the color to be used to render the border of the widget.

rwColor: A signed integer that is interpreted as a row index into the color palette represented in the palette table. This palette row specifies the color to be used to fill the area of the widget.

rwBackgroundColor: A signed integer that is interpreted as a row index into the color palette represented in the palette table. This palette row specifies the color to be used as a background color for the Rectangle widget.

The visibility of the background color is affected by the value of rwHidden. The background color is visible when the value of rwHidden is TRUE.

rwRound: An unsigned integer interpreted as a Boolean common data type value. The value indicates whether the Rectangle widget is rendered with rounded or square corners. If the value of rwRound is TRUE, the Rectangle widget is rendered with rounded corners. If the value of rwRound is FALSE, the Rectangle widget is rendered with square corners.

Scaled Video

A ScaledVideo widget is a user interface element that allows the display of video in a window that is less then full screen in size. A ScaledVideo widget SHALL adhere to the syntax specified by Table 63 ScaledVideo Widget.

TABLE 63

ScaledVideo Widget

| Syntax | Number of bits | Format |
|---|---|---|
| ebiScaledVideoWidget( ) { | | |
| svwType | 8 | uint8 |
| svwX | 16 | int16 |
| svwY | 16 | int16 |
| svwWidth | 16 | int16 |
| svwHeight | 16 | int16 |
| svwHidden | 8 | boolean |
| svwMode | 8 | uint8 |
| svwSrc | 16 | int16 |
| } | | |

svwType: An unsigned integer indicating that this widget is a ScaledVideo widget. This field SHALL have the constant value 11.

svwX:: A signed integer indicating the number of pixels in the x dimension from the origin of the application's root container to the origin of the ScaledVideo widget, where negative values indicate that the widget's origin is to the left of the root container's origin.

svwY: A signed integer indicating the number of pixels in they dimension from the origin of the application's root container to the origin of the ScaledVideo widget, where negative values indicate that the widget's origin is above the root container's origin.

svwWidth: A signed integer indicating the number of pixels in the x dimension from the left-most to right-most edge of the widget's geometry.

svwHeight: A signed integer indicating the number of pixels in they dimension from the top-most to bottom-most edge of the widget's geometry.

svwHidden: An unsigned integer interpreted as a Boolean common data type value. The value indicates whether the ScaledVideo widget is hidden or visible. If the value of svwHidden is TRUE, the widget is not rendered. If the value of svwHidden is FALSE, the widget is rendered.

svwMode: An enumeration value indicating the type of service specification carried in the svwSrc field. The values of this enumeration are defined by Table 64 Mode Types.

TABLE 64

Mode Types

| Value | Description |
|---|---|
| 0 | Broadcast |
| 1 | Call letters |
| 2-191 | reserved |
| 192-255 | private use |

svwSrc: A signed integer interpreted as a row index into the Reference Table. The entry in this row of the Reference Table indicates the video source associated with this ScaledVideo widget.

If svwMode is "Call letters" then the reference is to a string which contains the call letters of the video source.

If svwMode is "Broadcast" then the reference is to an integer which is the source ID of the video source.

Selector

A Selector widget provides a user interface element that displays a list of options and allows the user to select and activate one of the options. A Selector widget SHALL adhere to the syntax specified by Table 65 Selector Widget. A Selector widget may have either a horizontal or a vertical orientation.

The data presented in a vertically-oriented Selector widget is contributed by one or more referenced Column structures.

TABLE 65

Selector Widget

Selector Widget: vertical orientation

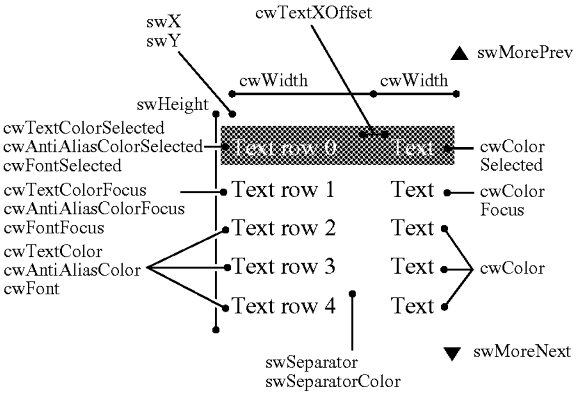

Additional Shown Properties:
swPlane=vertical
swMaxCount=5
swCurrentDisplayIndex=1
swSelectedIndex=0
Column1: cwHAlign=left, cwVAlign=middle, cwTextXOffset=4
Column2: cwHAlign=center, cwVAlign=middle, cwTextXOffset=0
Selector Properties Not Shown: swType, swIndex, swStartIndex, swDisplayIndex, swScroll, swDisabled, swHidden, swLoop, swBackgroundColor, swDataSrc, swOnClick, swOnBlur, swOnFocus, swOnFocusOption, swDataVersion, swPrevDataSrc
Column Properties Not Shown: cwType, cwDataOffset Selector Widget: horizontal orientation

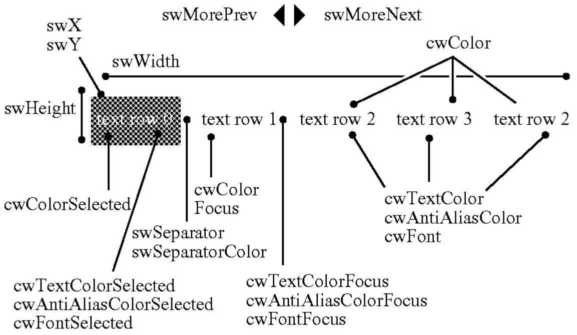

Additional Shown Properties:
swPlane=horizontal
swMaxCount=5
swCurrentDisplayIndex=1
swSelectedIndex=0
cwHalign=center, cwValign=middle
Selector Properties Not Shown: swType, swPlane, swIndex, swStartIndex, swDisplayIndex, swScroll, swDisabled, swHidden, swLoop, swBackgroundColor, swDataSrc, swOnClick, swOnBlur, swOnFocus, swOnFocusOption, swDataVersion, swPrevDataSrc
Column Properties Not Shown: cwType, cwWidth, cwDataOffset, cwTextXOffset TABLE 65-continued

| Syntax | Number of bits | Format |
|---|---|---|
| ebiSelectorWidget( ) { | | |
| swType | 8 | uint8 |
| swStyle | 16 | uint16 |
| swPlane | 8 | uint8 |
| swMaxCount | 8 | int8 |
| swNumColumns | 8 | int8 |
| swColumnDesc | 16 | uint16 |
| swIndex | 16 | int16 |
| swStartIndex | 16 | int16 |
| swSelectedIndex | 16 | int16 |
| swDisplayIndex | 8 | int8 |
| swCurrentDisplayIndex | 8 | int8 |
| swScroll | 8 | uint8 |
| swX | 16 | int16 |
| swY | 16 | int16 |
| swWidth | 16 | int16 |
| swHeight | 16 | int16 |
| swDisabled | 8 | boolean |
| swHidden | 8 | boolean |
| swLoop | 8 | boolean |
| swMoreNext | 16 | int16 |
| swMorePrev | 16 | int16 |
| swDataSrc | 16 | int16 |
| swOnClick | 16 | int16 |
| swOnFocus | 16 | int16 |
| swOnBlur | 16 | int16 |
| swOnFocusOption | 16 | int16 |
| swSeparator | 8 | int8 |
| swDataVersion | 16 | int16 |
| swPrevDataSrc | 16 | int16 |
| } | | |

swType: An unsigned integer indicating that this widget is a Selector widget. This field SHALL have the constant value 6.

swStyle: An unsigned integer that, if non-zero, represents an offset (in octets) from the start of this ebiSelectorWidget structure to the start of a Style structure that expresses styles to be applied, or, if zero, denotes that default styles are to be applied.

swPlane: An enumeration value indicating the orientation of this Selector widget. The values of this enumeration are defined by Table 66 Plane Types.

In a horizontal Selector widget the options are arrayed in the x direction. Each option originates from the same column of data.

In a vertical Selector widget, the options are arrayed in they direction and each option may have several components, each component originating in a separate data column in the same data table. The option components associated with an individual option are arrayed in the x direction.

TABLE 66

Plane Types

| Value | Description |
|---|---|
| 0 | Vertical orientation |
| 1 | Horizontal orientation |

swMaxCount: A signed integer that is interpreted as the number of options to be displayed at one time in a Selector widget.

swNumColumns: A signed integer that is interpreted as the number of columns associated with each option in a vertically-oriented Selector widget. The value SHALL be 1 or greater. In the case of a horizontally-oriented Selector widget this field is ignored.

swColumnDesc: An unsigned integer. In the case of a vertically-oriented Selector widget this is interpreted as an offset into the data resource which references the Columns structure associated with the Selector widget. The Columns structure is described in Section 0, Column. In the case of a horizontally-oriented Selector widget this field is ignored.

swIndex: A signed integer that is interpreted as the index of the option in the data array which currently has focus. This value is updated by the application platform.

swStartIndex: A signed integer that is interpreted as the index of the option in the data array which should be displayed in the first position in the list of options when the widget is first rendered. In a vertically oriented Selector widget the first position is the topmost option. In a horizontally oriented Selector widget the first position is the leftmost option.

swSelectedIndex: A signed integer that is interpreted as the index of the option in the data array which should be displayed as having focus when the widget is first rendered.

swDisplayIndex: A signed integer that is interpreted as the index of the option position in the Selector widget which should have focus when the widget is first rendered.

swCurrentDisplayIndex: A signed integer that is interpreted as the index of the option position in the Selector widget which currently has focus. This value is updated by the application platform.

swScroll: An enumeration value indicating the scrolling behavior appropriate for this Selector widget. The values of this enumeration are defined by Table 67 Scroll Types.

TABLE 67

Scroll Types

| Value | Description |
|---|---|
| 0 | Paging |
| 1 | Single |
| 2 | Fixed |
| 3-191 | reserved |
| 192-255 | private use |

Paging implies that the option data scrolls through the option positions in swMaxCount-1 chunks. Scrolling occurs when the first or last option position currently has focus and user input attempts to move the focus beyond the first or last option position. User input changes the option location that has focus. The option data is not treated as a circular list.

Single implies that the option data scrolls through the option positions one option data item at a time. Scrolling occurs when the first or last option position currently has focus and user input attempts to move the focus beyond the first or last option position. User input changes the option location that has focus. The option data is not treated as a circular list.

Fixed implies that the option data scrolls through the option positions one option data item at a time. Scrolling occurs whenever user input attempts to move the focus. User input does not change the option position that has focus. The option position that has focus is determined by swDisplayIndex. The option data is treated as a circular list.

swX: A signed integer indicating the number of pixels in the x dimension from the origin of the application's root container to the origin of the Selector widget, where negative values indicate that the widget's origin is to the left of the root container's origin.

swY: A signed integer indicating the number of pixels in they dimension from the origin of the application's root container to the origin of the Selector widget, where negative values indicate that the widget's origin is above the root container's origin.

swWidth: A signed integer indicating the number of pixels in the x dimension from the left-most to right-most edge of the Selector widget's geometry.

swHeight: A signed integer indicating the number of pixels in they dimension from the top-most to bottom-most edge of the Selector widget's geometry.

swDisabled: An unsigned integer interpreted as a Boolean common data type value. The value reflects the current state of the Selector widget. If the value of swDisabled is TRUE, the Selector widget is considered to be in the disabled state. If the value of swDisabled is FALSE, the Selector widget is not considered to be in the disabled state. When the Selector widget is disabled its constituent items cannot be the target of UI navigation.

swHidden: An unsigned integer interpreted as the Boolean common data type. The value indicates whether the Selector widget is currently visible or hidden. If the value of swHidden is TRUE, the widget is considered to be hidden and its background color as specified in swBackgroundColor will be rendered in the area of the widget. If the value of swHidden is FALSE, the widget is considered to be visible and it will be rendered.

swLoop: An unsigned integer interpreted as a Boolean common data type value. The value indicates whether the option data items are considered to form a circular list or a list with a beginning and ending item. If the value of swLoop is TRUE, the option data items are considered to form a circular list. If the value of svwLoop is FALSE, the option data items are considered to form a list with a beginning and ending item.

There is a relationship between the properties swScroll and swLoop. When swLoop is takes the value Paging or Single, the value of swLoop SHALL be FALSE. When swLoop takes the value fixed, the value of swLoop SHALL be TRUE.

swMoreNext: A signed integer which SHALL have a value between −1 and 32,767. If the value is −1 it is interpreted to indicate that there is no more button associated with this Selector widget. Otherwise, this value is interpreted as a row index into the Reference Table. The entry in this row of the Reference Table indicates the offset to the widget table of the widget which is to be hidden when the last option data item is currently displayed in the Selector widget. Conversely, the referenced widget will no longer be hidden when the last option data item is not currently displayed in the Selector widget.

swMorePrev: A signed integer which SHALL have a value between −1 and 32,767. If the value is −1 it is interpreted to indicate that there is no previous button associated with this Selector widget. Otherwise, this value is interpreted as a row index into the Reference Table. The entry in this row of the Reference Table is an offset to the widget table of the widget which is to be hidden when the first option data item is currently displayed in the Selector widget. Conversely, the referenced widget will no longer be hidden when the first option data item is not currently displayed in the Selector widget.

swDataSrc: A signed integer interpreted as a row index into the Reference Table. In the case of a horizontally oriented selector the entry in this row of the Reference Table indicates the offset to the data table and column associated with this Selector widget. In the case of a vertically oriented selector, this field is ignored.

swOnClick: A signed integer interpreted as an index into the Action Table. The Action Table row referenced by this index provides an action or sequence of actions to be performed when the Selector widget receives an on Click event.

swOnFocus: A signed integer interpreted as an index into the Action Table. The Action Table row referenced by this index provides an action or sequence of actions to be performed when the Selector widget receives an on Focus event.

swOnBlur: A signed integer interpreted as an index into the Action Table. The Action Table row referenced by this index provides an action or sequence of actions to be performed when the Selector widget receives an on Blur event.

swOnFocusOption: A signed integer interpreted as an index into the Action Table. The Action Table row referenced by this index provides an action or sequence of actions to be performed when the Selector widget receives an on Focus-Action event.

swSeparator: A signed integer interpreted as the pixel width of the horizontal separator drawn between the options of a vertical selector or a vertical separator drawn between the options of a horizontal selector.

swDataVersion: A signed integer that is interpreted as a version identifier for the data displayed in the Selector widget. On emission, this field contains the initial value 0. During presentation of the page, this value is incremented by the application platform should the data referenced by this Selector be updated.

swPrevDataSrc: A signed integer interpreted as a row index into the Reference Table. In the case of a horizontally oriented selector the entry in this row of the Reference Table is an offset to the location of the data table and column previously associated with this Selector widget. In the case of a vertically oriented selector, this field is ignored.

Indirect Properties

In addition to the properties specified by the above fields, a Selector widget has a set of indirect properties, which are mapped according to Table 68 Selector Widget Indirect Properties, and further described below.

In the Mapping column of Table 68 Selector Widget Indirect Properties, the notation *F denotes the result of dereferencing F, which is a field that references another structure.

TABLE 68

Selector Widget Indirect Properties

| Indirect Property | Mapping |
|---|---|
| swBackgroundColor | *swStyle.*ssBG2.csEnabled |
| swSeparatorColor | *swStyle.*ssFG2.csEnabled |

swBackgroundColor: A signed integer that is interpreted as a row index into the color palette represented in the palette table. This palette row specifies the color to be used as a background color for the Selector widget.

The visibility of the background color is affected by the value of swHidden. The background color is visible when the value of swHidden is TRUE.

swSeparatorColor: A signed integer that is interpreted as a row index into the color palette represented in the palette table. This palette row specifies the color to be used to render the separator that is drawn between options in the Selector widget.

Text

A Text widget provides a user interface element that allows the display of text in a rectangular area. A Text widget SHALL adhere to the syntax specified by Table 69 Text Widget.

TABLE 69

Text Widget

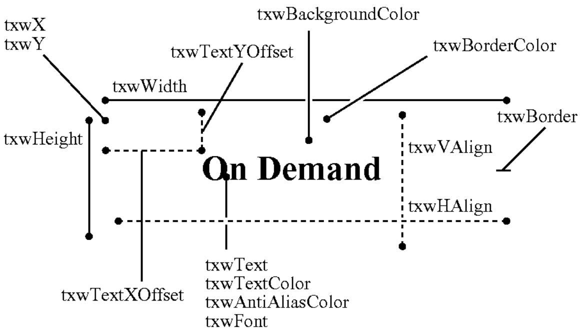

Properties Not Shown: txwHidden, txwType, txwEllipsis

| Syntax | Number of bits | Format |
|---|---|---|
| ebiTextWidget( ) { | | |
| txwType | 8 | uint8 |
| bwStyle | 16 | uint16 |
| txwX | 16 | int16 |
| txwY | 16 | int16 |
| txwWidth | 16 | int16 |
| txwHeight | 16 | int16 |
| txwText | 16 | int16 |
| txwTextXOffset | 8 | int8 |
| txwTextYOffset | 8 | int8 |
| txwHidden | 8 | boolean |
| txwEllipsis | 8 | boolean |
| } | | |

txwType: An unsigned integer indicating that this widget is a Text widget. This field SHALL have the constant value 3.

txwStyle: An unsigned integer that, if non-zero, represents an offset (in octets) from the start of this ebiTextWidget structure to the start of a Style structure that expresses styles to be applied, or, if zero, denotes that default styles are to be applied.

txwX: A signed integer indicating the number of pixels in the x dimension from the origin of the application's root container to the origin of the Text widget, where negative values indicate that the widget's origin is to the left of the root container's origin. The origin of a Text widget in the x direction is the left edge of the widget.

txwY: A signed integer indicating the number of pixels in they dimension from the origin of the application's root container to the origin of the Text widget, where negative values indicate that the widget's origin is above the root container's origin. The origin of a widget in they direction is the top edge of the widget.

txwWidth: A signed integer indicating the number of pixels in the x dimension from the left-most to right-most edge of the widget.

txwHeight: A signed integer indicating the number of pixels in the y dimension from the top-most to the bottom-most edge of the widget.

txwText: A signed integer which SHALL have a value between −1 and 32,767. If the value is −1 it is interpreted to indicate that there is no text associated with this Text widget. Otherwise, this value is interpreted as a row index into the Reference Table. The entry in this row of the Reference Table indicates the location of a string which holds the text associated with the Text widget. The text is displayed in the widget when the widget is rendered.

txwTextXOffset: A signed integer indicating the number of pixels in the x dimension from the origin of the Text widget to the origin of the widget's text, where negative values indicate that the widget's text is to the left of the widget's origin.

txwTextYOffset: A signed integer indicating the number of pixels in they dimension from the origin of the Text widget to the origin of the widget's text, where negative values indicate that the widget's text is above the widget's origin.

txwHidden: An unsigned integer interpreted as the Boolean common data type. The value indicates whether the Text widget is currently visible or hidden. If the value of txwHidden is TRUE, the widget is considered to be hidden and its background color as specified in txwBackgroundColor will be rendered in the area of the widget. If the value of txwHidden is FALSE, the widget is considered to be visible and its text will be rendered.

txwEllipsis: An unsigned integer interpreted as a Boolean common data type value. If the value of txwEllipsis is TRUE and the widget text overflows the widget's text area, an ellipsis is appended to the last line of text that fits in the widget.

Indirect Properties

In addition to the properties specified by the above fields, a Text widget has a set of indirect properties, which are mapped according to Table 70 Text Widget Indirect Properties, and further described below.

In the Mapping column of Table 73 TextInput Widget Indirect Properties, the notation *F denotes the result of dereferencing F, which is a field that references another structure.

TABLE 70

Text Widget Indirect Properties

| Indirect Property | Mapping |
|---|---|
| txwTextColor | *txwStyle.*ssFG1.csEnabled |
| txwFont | *txwStyle.*ssFont.fsEnabled |
| txwBorderWidth | *txwStyle.*ssBorder.bsThickness |
| txwBorderColor | *txwStyle.*ssBorder.csEnabled |
| txwBackgroundColor | *txwStyle.*ssBG2.csEnabled |
| txwAntiAliasColor | *txwStyle.*ssFG2.csEnabled |
| txwHAlign | *txwStyle.*ssAlignment.asHAlign |
| txwVAlign | *txwStyle.*ssAlignment.asVAlign |

txwTextColor: A signed integer that is interpreted as a row index into the color palette represented in the palette table. This palette row specifies the color to be used to render text that appears in the Text widget.

txwFont: A signed integer interpreted as a Font Index reference type value. The value indicates the font face that will be used to render any text which appears in the widget.

txwBorderWidth: A signed integer indicating the pixel measurement of the width of the Text widget's border.

txwBorderColor: A signed integer that is interpreted as a row index into the color palette represented in the palette table. This palette row specifies the color to be used to render the Text widget's border.

txwBackgroundColor: A signed integer that is interpreted as a row index into the color palette represented in the palette table. This palette row specifies the color to be used as a background color for the Text widget.

The visibility of the background color is affected by the value of txwHidden. The background color is visible when the value of txwHidden is TRUE.

txwAntiAliasColor: A signed integer that is interpreted as a row index into the color palette represented in the palette table. This palette row specifies the color to be used as a hint to the platform about how to best anti-alias the widget's text.

txwHAlign: An unsigned integer interpreted as an HAlign enumeration value. The value indicates whether the widget's text is to be horizontally aligned left, center, or right within the rectangular area allocated for the text.

txwVAlign: An unsigned integer interpreted as a VAlign enumeration value. The value indicates whether the widget's text is to be vertically aligned top, center, or bottom within the rectangular area allocated for the text.

TextInput

A TextInput widget provides a user interface element that allows the entry of a single line of alphanumeric text. A TextInput widget SHALL adhere to the syntax specified by Table 71 TextInput Widget.

TABLE 71

TextInput Widget: alpha mode

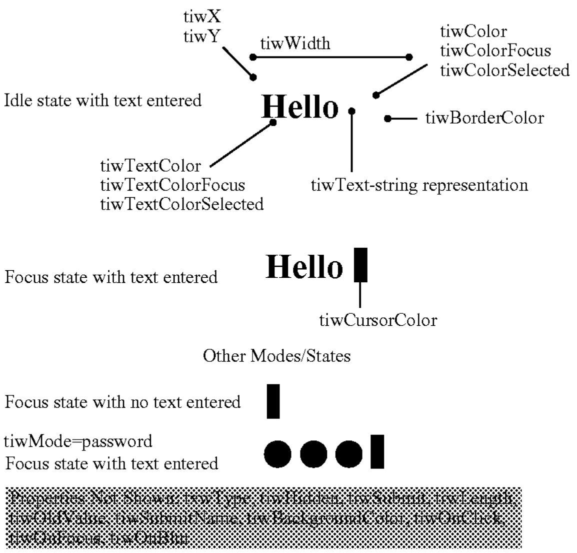

TextInput Widget: numeric mode

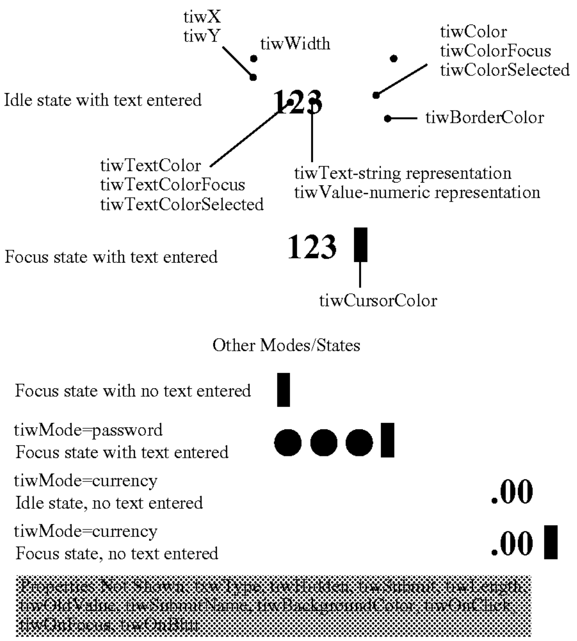

TextInput Widget

| Syntax | Number of bits | Format |
|---|---|---|
| ebiTextInputWidget() { | | |
| tiwType | 8 | uint8 |
| tiwStyle | 16 | uint16 |
| tiwX | 16 | int16 |

TABLE 71-continued

| | | |
|---|---|---|
| tiwY | 16 | int16 |
| tiwWidth | 16 | int16 |
| tiwHidden | 8 | boolean |
| tiwSubmit | 8 | boolean |
| tiwMode | 8 | uint8 |
| tiwLength | 16 | int16 |
| tiwText | 16 | int16 |
| tiwValue | 32 | int32 |
| tiwOldValue | 32 | int32 |
| tiwSubmitName | 16 | int16 |
| tiwOnClick | 16 | int16 |
| tiwOnFocus | 16 | int16 |
| tiwOnBlur | 16 | int16 |
| } | | |

tiwType: An unsigned integer indicating that this widget is a TextInput widget. This field SHALL have the constant value 15.

bwStyle: An unsigned integer that, if non-zero, represents an offset (in octets) from the start of this ebiTextInputWidget structure to the start of a Style structure that expresses styles to be applied, or, if zero, denotes that default styles are to be applied.

tiwX: A signed integer indicating the number of pixels in the dimension from the origin of the application's root container to the origin of the TextInput widget, where negative values indicate that the widget's origin is to the left of the root container's origin. The origin of a TextInput widget in the x direction is the left edge of the widget.

tiwY: A signed integer indicating the number of pixels in they dimension from the origin of the application's root container to the origin of the TextInput widget, where negative values indicate that the widget's origin is above the root container's origin. The origin of a widget in they direction is the top edge of the widget.

tiwWidth: A signed integer indicating the number of pixels in the x dimension from the left-most to right-most edge of the widget.

tiwHidden: A signed integer interpreted as the Boolean common data type. The value indicates whether the TextInput widget is currently visible or hidden. If the value of tiwHidden is TRUE, the widget is considered to be hidden and its background color as specified in tiwBackgroundColor will be rendered in the area of the widget. If the value of tiwHidden is FALSE, the widget is considered to be visible and it will be rendered.

tiwSubmit: An unsigned integer interpreted as a Boolean common data type value. The value of tiwSubmit indicates whether the value of the Textlput widget is to be included as a part of the data sent upon submittal of a Form widget which references this TextInput widget. If the value of tiwSubmit is TRUE, tiwValue is included as part of the data in the form submit. If the value of tiwSubmit is FALSE, the widget's value data is not submitted as part of the form submit.

tiwMode: An enumeration value indicating the mode of representation of the character data entered into the widget and the type of input character data admitted by the widget. The values of this enumeration are defined by Table 72 Mode Values for the TextInput Widget. If tiwMode indicates one of the numeric modes, then only numeric character input will be accepted by the widget. If tiwMode indicates one of the alpha modes, then any input character will be accepted by the widget.

TABLE 72

| Mode Values for the TextInput Widget | |
|---|---|
| Value | Description |
| 0 | Alpha - echo character data as entered |
| 1 | Alpha - represent each character by "*" |
| 2 | Numeric - currency, echo as entered |
| 3 | Numeric - echo as entered |
| 4 | Numeric - represent each character by "*" |
| 5-191 | reserved |
| 192-255 | private use |

tiwText: A signed integer which SHALL have a value between −1 and 32,767. If the value is −1 it is interpreted to indicate that there is no text associated with this Text widget. Otherwise, this value is interpreted as a row index into the Reference Table. The entry in this row of the Reference Table indicates the location of a string which holds the default text associated with the TextInput widget. The default text is displayed in the widget when the widget is first rendered.

tiwValue: A signed integer. If this is an alpha mode TextInput widget then this field is ignored and SHALL be set to all '1' bits.

If this is a numeric mode TextInput widget then this field is interpreted as a positive or negative value to be rendered as the initial numeric string to be displayed in the TextInput widget.

Subsequently, if the viewer enters a valid numeric string into the widget the current value of this field will be transferred to the tiwOldValue field. The value in this field will be replaced by the numeric representation of the viewer entry.

tiwOldValue: A signed integer.

If this is an alpha mode TextInput widget then this field is ignored and SHALL be set to all '1' bits.

If this is a numeric mode TextInput widget then this field is interpreted as a positive or negative value that is the numeric representation of the immediately previous content of the TextInput widget (see tiwValue, above).

tiwSubmitName: A signed integer interpreted as a row index into the Reference Table. The entry in this row of the Reference Table indicates the location of a string which holds the name associated with the TextInput widget's value. The name property is used during form submittal to identify the widget's value string.

tiwOnClick: A signed integer interpreted as an index into the Action Table. The Action Table row referenced by this index provides an action or sequence of actions to be performed when the TextInput widget receives an on Click event.

tiwOnFocus: A signed integer interpreted as an index into the Action Table. The Action Table row referenced by this index provides an action or sequence of actions to be performed when the TextInput widget receives an on Focus event.

tiwOnBlur: A signed integer interpreted as an index into the Action Table. The Action Table row referenced by this index provides an action or sequence of actions to be performed when the TextInput widget receives an on Blur event.

Indirect Properties

In addition to the properties specified by the above fields, a TextInput widget has a set of indirect properties, which are mapped according to Table 73 TextInput Widget Indirect Properties, and further described below.

In the Mapping column of Table 73 TextInput Widget Indirect Properties, the notation *F denotes the result of dereferencing F, which is a field that references another structure.

TABLE 73

| TextInput Widget Indirect Properties | |
|---|---|
| Indirect Property | Mapping |
| TiwFont | *tiwStyle.*ssFont.fsEnabled |
| TiwBackgroundColor | *tiwStyle.*ssBG2.csEnabled |

tiwFont: A signed integer interpreted as a Font Index reference type value. The value indicates the font face that will be used to render any text which appears in the widget.

tiwBackgroundColor: A signed integer that is interpreted as a row index into the color palette represented in the palette table. This palette row specifies the color to be used as a background color for the TextInput widget.

The visibility of the background color is affected by the value of tiwHidden. The background color is visible when the value of tiwHidden is TRUE.

Timer

A Timer widget provides a timer function that can be used by user interface elements. A Timer widget SHALL adhere to the syntax specified by Table 74 Timer Widget.

TABLE 74

| Timer Widget | | |
|---|---|---|
| Syntax | Number of bits | Format |
| ebiTimerWidget( ) { | | |
| twType | 8 | uint8 |
| twPeriod | 32 | int32 |
| twLoop | 16 | int16 |
| twOnTimer | 16 | int16 |
| twRepetitionsRemaining | 16 | int16 |
| twFiretime | 32 | int32 |
| twEnabled | 8 | boolean |
| } | | |

twType: An unsigned integer indicating that this widget is a Timer widget. This field SHALL have the constant value 2.

twPeriod: A signed integer interpreted as the number of milliseconds before the timer expires and the OnTimer event is fired.

twLoop: A signed integer interpreted as the number of times the twPeriod duration should be counted down. Each time the duration expires, the Timer widget fires an on Timer event. If this value is zero then the twPeriod will be counted down repeatedly.

twOnTimer: A signed integer interpreted as an index into the Action Table. The Action Table row referenced by this index provides an action or sequence of actions to be performed when the Timer widget fires an on Timer event.

twRepetitionsRemaining: A signed integer which SHALL have the value 0. This field is a variable used by the application platform to count down from the twLoop value.

twFiretime: An unsigned integer which is used by the Timer widget to hold the time value at which the next on Timer event will be fired.

twEnabled: An unsigned integer interpreted as a Boolean common data type value. The value of tiwEnabled indicates whether or not the Timer widget is currently running. If the value of twEnabled is TRUE, the timer is running and will fire when twFiretime is reached. If the value of twEnabled is FALSE, the timer is stopped.

Note, a Timer widget's twEnabled value is set using the start( ) and stop( ) methods.

Structures

This section defines the serialized representations of structures that are referred to from certain of the widgets. The serialized representation of a structure SHALL be placed in the storage heap of an EBI resource.

The following structures are defined below:

Alignment Style
Border Style
Color Style
Column
Events
Fonts
Font Style
Items
Locator
Navigation Map
Style
Trigger Information
Trigger Alignment Style An Alignment Style structure specifies horizontal and vertical alignment values for a widget or a widget component. An Alignment Style structure SHALL adhere to the syntax specified by Table 75 Alignment Style Structure.

TABLE 75

| Alignment Style Structure | | |
|---|---|---|
| Syntax | Number of bits | Format |
| ebiAlignmentStyle( ) { | | |
| asHAlign | 8 | int8 |
| asVAlign | 8 | int8 |
| } | | |

asHAlign: An enumeration value indicating the horizontal alignment that applies to a widget or a widget component. The values of this enumeration are defined by Table 33 Horizontal Alignments.

asVAlign: An enumeration value indicating the vertical alignment that applies to a widget or a widget component. The values of this enumeration are defined by Table 34 Vertical Alignments.

Border Style

A Border Style structure specifies set of related style properties that define the borders of a widget or a widget component. A Border Style structure SHALL adhere to the syntax specified by table 76 Border Style Structure.

TABLE 76

| Border Style Structure | | |
|---|---|---|
| Syntax | Number of bits | Format |
| ebiBorderStyle( ) { | | |
| bsStyle | 4 | uimsbf |
| bsJoinStyle | 4 | uimsbf |
| bsJoinRadius | 8 | uint8 |
| bsThickness | 8 | uint8 |
| bsLeftColor | 16 | uint16 |
| bsTopColor | 16 | uint16 |
| bsRightColor | 16 | uint16 |
| bsBottomColor | 16 | uint16 |
| } | | |

bsStyle: An enumeration value indicating the overall border style. The values of this enumeration are defined by Table 77 Border Styles.

TABLE 77

| Border Styles | |
|---|---|
| Value | Locator Type |
| 0 | None |
| 1 | Hidden |
| 2 | Single |
| 3-15 | Reserved |

If the border style is none, then no border is drawn and no space is allocated for borders. If the border style is hidden, then no border is drawn; however, space is allocated for borders in accordance with the bsThickness field.

bsJoinStyle: An enumeration value indicating the manner by which adjacent borders are joined. The values of this enumeration are defined by Table 78 Border Join Styles.

TABLE 78

| Border Join Styles | |
|---|---|
| Value | Locator Type |
| 0 | overlap |
| 1 | bevel |
| 2 | round |
| 3 | left round, right bevel |
| 4 | left bevel, right round |
| 5-15 | reserved |

If the border join style is overlap, then borders are drawn in the following order: left, top, right, bottom. In this case, subsequently drawn borders overlap previously drawn borders. If the border join style is bevel, then borders are drawn with a 45, 135, 225, or 315 degree bevel such that no overlap occurs. If the border join style is round, then an arc is used to join borders, with the arc radius being determined by bsJoinRadius, and, if adjacent borders have distinct colors, then the color transition is located at the mid-point of the arc.

Border join styles left round, right bevel and left bevel, right round combine both bevel and round join styles.

A user agent SHALL support the overlap and round border join styles, and MAY support additional join styles. If some join style is not supported, then a user agent SHALL interpret the unsupported style as the overlap style.

bsJoinRadius: An unsigned integer that expresses the arc radius of a round join style, where the arc is considered to be an imaginary curve that bisects the thickness of the border.

bsThickness: An unsigned integer that expresses the thickness of each border.

bsLeftColor: An unsigned integer that represents an offset (in octets) from the start of this ebiBorderStyle structure to the start of a Color Style structure that expresses the left border color. The structure addressed by this offset SHALL adhere to the syntax specified by Table 79 Color Style Structure.

bsTopColor: An unsigned integer that represents an offset (in octets) from the start of this ebiBorderStyle structure to the start of a Color Style structure that expresses the top border color. The structure addressed by this offset SHALL adhere to the syntax specified by Table 79 Color Style Structure.

bsRightColor: An unsigned integer that represents an offset (in octets) from the start of this ebiBorderStyle structure to the start of a Color Style structure that expresses the right border color. The structure addressed by this offset SHALL adhere to the syntax specified by Table 79 Color Style Structure.

bsBottomColor: An unsigned integer that represents an offset (in octets) from the start of this ebiBorderStyle structure to the start of a Color Style structure that expresses the bottom border color. The structure addressed by this offset SHALL adhere to the syntax specified by Table 79 Color Style Structure.

Color Style

A Color Style structure specifies a multi-state color style specification that determines a color value depending upon the state of an affected widget or widget component. A Color Style structure SHALL adhere to the syntax specified by Table 79 Color Style Structure.

TABLE 79

| Color Style Structure | | |
|---|---|---|
| Syntax | Number of bits | Format |
| ebiColorStyle( ) { | | |
| csType | 4 | uimsbf |
| csReserved | 4 | bslbf |
| if (csType == 0) { | | |
| csEnabled | 8 | uint8 |
| csFocused | 8 | uint8 |
| csSelected | 8 | uint8 |
| csDisabled | 8 | uint8 |
| } else if (csType==1) { | | |
| csEnabled | 16 | uint16 |
| csFocused | 16 | uint16 |
| csSelected | 16 | uint16 |
| csDisabled | 16 | uint16 |
| } else if (csType==2) { | | |
| csEnabled | 16 | uint16 |
| csFocused | 16 | uint16 |
| csSelected | 16 | uint16 |
| csDisabled | 16 | uint16 |
| } else if (csType==3) { | | |
| csEnabled | 32 | uint32 |
| csFocused | 32 | uint32 |
| csSelected | 32 | uint32 |
| csDisabled | 32 | uint32 |
| } | | |
| } | | |

csType: An enumeration value indicating the manner by which color values are expressed in subsequent fields. The values of this enumeration are defined by Table 89 Locator Types.

TABLE 80

| Color Style Types | |
|---|---|
| Value | Locator Type |
| 0 | unsigned 8-bit palette index |
| 1 | unsigned 16-bit palette index |
| 2 | ARGB1555 packed color value |
| 3 | ARGB8888 packed color value |
| 4-15 | reserved |

csReserved: This field is reserved for fuiture standardization, and SHALL be set to all '1' bits.

csEnabled: This field, which is interpreted according to the value of the csType field, expresses a color value in case the widget or widget component to which this style color applies does not have focus, is not selected, and is not disabled.

csFocused: This field, which is interpreted according to the value of the csType field, expresses a color value in case the widget or widget component to which this style color applies is not disabled, is not selected, but has focus.

csSelected: This field, which is interpreted according to the value of the csType field, expresses a color value in case the widget or widget component to which this style color applies is not disabled, but is selected.

csDisabled: This field, which is interpreted according to the value of the csType field, expresses a color value in case the widget or widget component to which this style color applies is disabled.

Column

A Column structure provides a user interface element that displays a column of data values. One or more Column structures are used to present the data displayed in a vertically-oriented Selector widget. A Column structure SHALL adhere to the syntax specified by Table 81 Column Structure.

TABLE 81

Column Structure

| Syntax | Number of bits | Format |
|---|---|---|
| ebiColumn( ) { | | |
| csType | 8 | uint8 |
| csHAlign | 8 | uint8 |
| csVAlign | 8 | uint8 |
| csTextXOffset | 8 | int8 |
| csWidth | 16 | int16 |
| csFont | 8 | int8 |
| csFontFocus | 8 | int8 |
| csFontSelected | 8 | int8 |
| csTextColor | 8 | int8 |
| csTextColorFocus | 8 | int8 |
| csTextColorSelected | 8 | int8 |
| csAntiAliasColor | 8 | int8 |
| csAntiAliasColorFocus | 8 | int8 |
| csAntiAliasColorSelected | 8 | int8 |
| csColor | 8 | int8 |
| csColorFocus | 8 | int8 |
| csColorSelected | 8 | int8 |
| csDataColumn | 8 | int8 |
| } | | |

csType: An unsigned integer indicating that this structure is a Column structure. This field SHALL have the constant value 20.

csHAlign: An unsigned integer interpreted as an HAlign enumeration value. The value indicates whether the column's data values are to be horizontally aligned left, center, or right within the rectangular area allocated for the data values.

csVAlign: An unsigned integer interpreted as a VAlign enumeration value. The value indicates whether the column's data values are to be vertically aligned top, center, or bottom within the rectangular area allocated for the data values.

csTextXOffset: A signed integer indicating the number of pixels in the x dimension from the origin of the widget containing the column to the origin of the data text, where negative values indicate that the column's text is to the left of the columns's origin.

csWidth: An unsigned integer indicating the number of pixels in the x dimension from the left-most to right-most edge of the Column widget geometry.

csFont: A signed integer interpreted as a Font Index reference type value. The value indicates the font face that will be used to render the text in the Column widget.

csFontFocus: A signed integer interpreted as a FontIndex common data type. The value indicates the font face that will be used to render the text in a Column widget data item that has focus.

csFontSelected: A signed integer interpreted as a FontIndex common data type. The value indicates the font face that will be used to render the text in a Column widget data item that is selected.

csTextColor: A signed integer that is interpreted as a row index into the color palette represented in the palette table. This palette row specifies the color to be used to render the text in the Column widget.

csTextColorFocus: A signed integer that is interpreted as a row index into the color palette represented in the palette table. This palette row specifies the color to be used to render the text in the Column widget when that text has focus.

csTextColorSelected: A signed integer that is interpreted as a row index into the color palette represented in the palette table. This palette row specifies the color to be used to render the text in the Column widget when that text is selected.

csAntiAliasColor: A signed integer that is interpreted as a row index into the color palette represented in the palette table. This palette row specifies the color to be used as a hint to the platform about how to best anti-alias the Column widget's text.

csAntialiasColorFocus: A signed integer that is interpreted as a row index into the color palette represented in the palette table. This palette row specifies the color to be used as a hint to the platform about how to best anti-alias the Column widget's text when that text has focus.

csAntialiasColorSelected: A signed integer that is interpreted as a row index into the color palette represented in the palette table. This palette row specifies the color to be used as a hint to the platform about how to best anti-alias the Column widget's text when that text is selected.

csColor: A signed integer that is interpreted as a row index into the color palette represented in the palette table. This palette row specifies the color to be used to render the background of the Column widget.

csColorFocus: A signed integer that is interpreted as a row index into the color palette represented in the palette table. This palette row specifies the color to be used to render the background of the Column widget when that column has focus.

csColorSelected: A signed integer that is interpreted as a row index into the color palette represented in the palette table. This palette row specifies the color to be used to render the background of the Column widget when that column is selected.

csDataColumn: A signed integer that is interpreted as a column index in a data table. This index indicates the column in the table that contains the values to be displayed in this Column widget. The field swDataSrc in the vertically-oriented Selector widget which references this Column widget indicates the data table in which the csDataColumn column index is effective.

Events

An Events structure provides a description of the on Key events associated with a page. An Events structure SHALL adhere to the syntax specified by Table 82 Events Structure.

TABLE 82

Events Structure

| Syntax | Number of bits | Format |
|---|---|---|
| ebiEvents( ) { | | |
| esNumEventItems | 8 | uint8 |
| for (i = 0; i < esNumEventItems; i++) { | | |
| esKeyCode | 8 | uint8 |

TABLE 82-continued

Events Structure

| Syntax | Number of bits | Format |
|---|---|---|
| esActionIndex | 8 | uint8 |
| } | | |
| } | | |

esNumEventItems: An unsigned integer indicating the number of EventItems occurring in the Events structure.

esKeyCode: An enumeration value indicating the key code associated with this event. The values of this enumeration are defined by Table 83 KeyCode Values for the Events Structure.

TABLE 83

KeyCode Values for the Events Structure

| Value | Key Code |
|---|---|
| 0 | KEY_0 |
| 1 | KEY_1 |
| 2 | KEY_2 |
| 3 | KEY_3 |
| 4 | KEY_4 |
| 5 | KEY_5 |
| 6 | KEY_6 |
| 7 | KEY_7 |
| 8 | KEY_8 |
| 9 | KEY_9 |
| 10 | KEY_LEFT |
| 11 | KEY_RIGHT |
| 12 | KEY_UP |
| 13 | KEY_DOWN |
| 14 | KEY_PAGEUP |
| 15 | KEY_PAGEDOWN |
| 16 | KEY_A |
| 17 | KEY_B |
| 18 | KEY_C |
| 19 | KEY_INFO |
| 20 | KEY_FAV |
| 21 | KEY_STOP |
| 22 | KEY_REW |
| 23 | KEY_FFWD |
| 24 | KEY_PLAY |
| 25 | KEY_PAUSE |
| 26 | KEY_REC |
| 27 | KEY_MUSIC |
| 28 | KEY_HELP |
| 29 | KEY_LOCK |
| 30 | KEY_LAST |
| 31 | KEY_EXIT |

esActionIndex: An unsigned integer interpreted as an index into the Action Table. The Action Table row referenced by this index provides an action or sequence of actions to be performed when this event is fired.

Fonts A Fonts structure provides descriptions for some number of authored fonts. A Fonts structure SHALL adhere to the syntax specified by Table 84 Fonts Structure.

TABLE 84

Fonts Structure

| Syntax | Number of bits | Format |
|---|---|---|
| ebiFonts( ) { | | |
| fsNumFonts | 8 | uint8 |
| ebiFont( ) { | | |
| for (i = 0; i < fsNumFonts; i++) { | | |
| fsFamily | 24 | uimsbf |

TABLE 84-continued

Fonts Structure

| Syntax | Number of bits | Format |
|---|---|---|
| fsSize | 8 | uint8 |
| fsShadow | 8 | boolean |
| fsBold | 8 | boolean |
| fsItalic | 8 | boolean |
| } | | |
| } | | |
| } | | |

fsNumFonts: An unsigned integer indicating the number of Font sub-structures which occur in this Fonts structure.

fsFamily: An unsigned integer that, if less then 64, denotes a builtin font family as defined by Table 85 Builtin Font Families, or, if greater than or equal to 64, specifies an application unique resource identifier corresponding to some entry of the resource locator table, where the referenced resource contains the font described by this entry of the Fonts structure.

TABLE 85

Builtin Font Families

| Value | Face |
|---|---|
| 0 | Default |
| 1 | Symbol Font |
| 2-63 | reserved for future standardization |

Note: In order to accommodate the interpretation of the fsFamily field described above, an application unique resource identifier used to label a font resource should not use a value of 0 through 63 as the resource identifier; otherwise, the font cannot be referenced by the Fonts structure.

fsSize: An unsigned integer interpreted as the size of this font in pixels.

fsShadow: An unsigned integer interpreted as a Boolean common data type value. The value of fsShadow indicates whether or not this font has a drop shadow. If the value of fsShadow is TRUE, the font has a drop shadow. If the value of fsShadow is FALSE, the font does not have a drop shadow.

fsBold: An unsigned integer interpreted as a Boolean common data type value. The value of fsBold indicates whether or not this font is bold. If the value of fsBold is TRUE, the font is bold. If the value of fsBold is FALSE, the font is not bold.

fsItalic: An unsigned integer interpreted as a Boolean common data type value. The value of fsItalic indicates whether or not this font is italic (or oblique). If the value of fsItalic is TRUE, the font is italic. If the value of fsItalic is FALSE, the font is not italic (or oblique).

Font Style

A Font Style structure specifies a multi-state color style specification that determines a font depending upon the state of an affected widget or widget component. A Font Style structure SHALL adhere to the syntax specified by Table 86 Font Style Structure.

TABLE 86

| Font Style Structure | | |
|---|---|---|
| Syntax | Number of bits | Format |
| ebiFontStyle( ) { | | |
| fsEnabled | 8 | uint8 |
| fsFocused | 8 | uint8 |
| fsSelected | 8 | uint8 |
| fsDisabled | 8 | uint8 |
| } | | |

fsEnabled: This field specifies the font to be used in case the widget or widget component to which this style applies does not have focus, is not selected, and is not disabled. This field is interpreted as a Font Index, which references an entry of a Fonts structure as defined by Table 84 Fonts Structure.

fsFocused: This field specifies the font to be used in case the widget or widget component to which this style applies is not disabled, is not selected, but has focus. This field is interpreted as a Font Index, which references an entry of a Fonts structure as defined by Table 84 Fonts Structure.

fsSelected: This field specifies the font to be used in case the widget or widget component to which this style applies is not disabled, but is selected. This field is interpreted as a Font Index, which references an entry of a Fonts structure as defined by Table 84 Fonts Structure.

fsDisabled: This field specifies the font to be used in case the widget or widget component to which this style applies is disabled. This field is interpreted as a Font Index, which references an entry of a Fonts structure as defined by Table 84 Fonts Structure.

Items

An Items structure provides a listing of the widgets associated with a Form widget or a Promotion widget. An Item structure must adhere to the syntax specified by Table 87 Item Structure.

TABLE 87

| Item Structure | | |
|---|---|---|
| Syntax | Number of bits | Format |
| ebiItem( ) { | | |
| isNumItems | 8 | uint8 |
| for (i = 0; i < isNumItems; i++) { | | |
| isItemIndex | 16 | int16 |
| } | | |
| } | | |

is NumItems: An unsigned integer indicating the number of Item indexes which occur in this Item structure and so likewise the number of widgets which comprise the associated Form widget or Promotion widget.

isItemIndex: A signed integer interpreted as a row index into the Reference Table. The entry in this row of the Reference Table is an offset to a widget table.

In the case of an Items structure referenced by a form, the widget referenced by this offset is one of the widgets which comprise the associated form.

In the case of an Items structure referenced by a Promotion widget, the widget referenced by this offset is one of the widgets which will be populated by content associated with the Promotion widet.

Locator

A Locator structure specifies a typed locator that determines how to locate some resource. A Locator structure SHALL adhere to the syntax specified by Table 88 Locator Structure.

TABLE 88

| Locator Structure | | |
|---|---|---|
| Syntax | Number of bits | Format |
| ebiLocator( ) { | | |
| lsType | 6 | uimsbf |
| lsLength | 10 | uimsbf |
| for (i = 0; i < lsLength; i++) | | |
| lsData[ ] | 8 | uimsbf |
| } | | |

IsType: An enumeration value indicating the locator type. The values of this enumeration are defined by Table 89 Locator Types.

TABLE 89

| Locator Types | |
|---|---|
| Value | Locator Type |
| 0 | EBI Table Locutor |
| 1 | DSM-CC U-N Data Carousel Module Locutor |
| 2 | DSM-CC U-U Object Carousel Object Locutor |
| 3 | URI Locutor |
| 4-31 | Reserved |
| 32-63 | private use |

IsLength: An unsigned integer indicating the number of bytes contained in IsData[ ].

IsData[ ]: An array of bytes that contain the locator data, where the interpretation of this data SHALL adhere to the locator type specified by the IsType field, as described by the following sub-sections.

EBI Table Locator

An EBI Table Locator is used to locate a specific table in an explicit or implied EBI resource. An EBI Table Locator (0) SHALL adhere to the syntax specified by Table 90 EBI Table Locator.

TABLE 90

| EBI Table Locator | | |
|---|---|---|
| Syntax | Number of bits | Format |
| ebiTableLocator ( ) { | | |
| tlResource | 24 | uimsbf |
| tlTable | 16 | int16 |
| } | | |

tlResource: An unsigned integer that, if zero, denotes an implied resource, or if non-zero, specifies a resource identifier, which maps to a resource by means of the augmented resource locator table.

tlTable: A signed integer that, if non-negative, denotes an entry of the augmented table directory of the referenced resource, or, if negative, denotes an entry in the current reference table, in which case such entry SHALL be a reference of type immediate int32 reference (13) that denotes an entry of the augmented table directory of the referenced resource.

DSM-CC Data Carousel Module Locator

A DSM-CC Data Carousel Module Locator is used to locate a resource represented by a specific module in a DSM-CC Data Carousel. A DSM-CC Data Carousel Module Locator (1) SHALL adhere to the syntax specified by Table 91 DSM-CC Data Carousel Module Locator.

TABLE 91

DSM-CC Data Carousel Module Locator

| Syntax | Number of bits | Format |
|---|---|---|
| ebiDCModuleLocator ( ) { | | |
| mlCarousel | 32 | uint32 |
| mlGroup | 16 | uint16 |
| mlModule | 16 | uint16 |
| } | | |

mlCarousel: An unsigned integer that denotes the carousel (scenario) identifier of the DSM-CC Data Carousel instance that contains the resource. If the value of this field is zero (0), then the referenced data carousel is implied as either (1) the data carousel containing the resource that contains the locator, or, if referenced from a resource not contained in a data carousel, then (2) the data carousel that contains the initial application resource.

Note: The carousel identifier is expressed by the downloadId field of the DSM-CC Download Information Indicator (DII) message that describes the module. See ISO/IEC 13818-6, Information technology—Generic coding of moving pictures and associated audio information—Part 6: Extensions for DSM-CC, 1998, ISO., Table 7-6, for further information.

mlGroup: An unsigned integer that denotes the group identifier of the DSM-CC Data Carousel group that contains the resource. If the data carousel employs a single layer control structure, then the group identifier SHALL be zero.

Note: The group identifier is expressed by bits 30-15 of the transactionId field of the dsmccMessageHeader structure of the DSM-CC Download Information Indicator (DII) message that describes the module.

mlModule: An unsigned integer that denotes the module identifier of the DSM-CC Data Carousel module that contains the resource.

Note: The module identifier is expressed by the moduleId field of the DSM-CC Download Information Indicator (DH) message that describes the module. See ISO/IEC 13818-6, Information technology—Generic coding of moving pictures and associated audio information—Part 6: Extensions for DSM-CC, 1998, ISO., Table 7-6, for further information.

DSM-CC Object Carousel Object Locator

A DSM-CC Data Carousel Module Locator is used to locate a resource represented by a specific object in a DSM-CC Object Carousel. A DSM-CC Object Carousel Object Locator (2) SHALL adhere to the syntax specified by Table 92 DSM-CC Object Carousel Object Locator.

TABLE 92

DSM-CC Object Carousel Object Locator

| Syntax | Number of bits | Format |
|---|---|---|
| ebiOCObjectLocator ( ) { | | |
| olCarousel | 32 | uint32 |
| olPath | variable | esString( ) |
| } | | |

olCarousel: An unsigned integer that denotes the carousel (scenario) identifier of the DSM-CC Data Carousel instance that contains the DSM-CC U-U ServiceGateway object.

Note: The carousel identifier is expressed by the downloadId field of the DSM-CC Download Information Indicator (DII) message that describes the module. See ISO/IEC 13818-6, Information technology—Generic coding of moving pictures and associated audio information—Part 6: Extensions for DSM-CC, 1998, ISO., Table 7-6, for further information. See also DSM-CC, §11.3.2, for further information on the U-U ServiceGateway object.

olPath: A non-empty, encoded string that expresses the path from the service gateway to the U-U File object that contains the resource. The first character of the path and each separator between path name components SHALL be the Unicode character U+002F SOLIDUS ('/').

Note: See Table 1 Encoded String for the definition of esString( ).

URI Locator

A URI Locator is used to locate a resource using a generic Uniform Resource Identifier (URI). A URI Locator (3) SHALL adhere to the syntax specified by Table 93 URI Locator.

An implementation of a given platform SHALL support the use of all URI schemes specified by the supported URI schemes parameter of the platform's parameter set as defined by Annex C, Platform Parameter Sets.

TABLE 93

URI Locator

| Syntax | Number of bits | Format |
|---|---|---|
| ebiURILocator ( ) { | | |
| ulURI | variable | esString( ) |
| } | | |

ulURI: A non-empty, encoded string that expresses a Uniform Resource Identifier (URI) that adheres to the syntax defined by RFC2396, Uniform Resource Identifiers (URI): Generic Syntax, IETF, and, when dereferenced, returns the referenced resource.

Note: See Table 1 Encoded String for the definition of esString( ).

Navigation Map

A Navigation Map structure provides a description of the navigable items associated with a page. The navigable items control keyboard or remote navigation among visible user interface elements. A Navigation Map structure SHALL adhere to the syntax specified by Table 94 Navigation Map Structure.

TABLE 94

Navigation Map Structure

| Syntax | Number of bits | Format |
|---|---|---|
| ebiNavigationMap( ) { | | |
| nsNumNavigableWidgets | 8 | uint8 |
| for (i = 0; i < nsNumNavigableWidgets; i++) { | | |
| nsOwningIndex | 16 | uint16 |
| nsRowIndex | 16 | uint16 |
| nsUpTargetIndex | 8 | uint8 |
| nsDownTargetIndex | 8 | uint8 |

TABLE 94-continued

| Navigation Map Structure | | |
|---|---|---|
| Syntax | Number of bits | Format |
| nsLeftTargetIndex | 8 | uint8 |
| nsRightTargetIndex | 8 | uint8 |
| } | | |
| } | | |

nsNumNavigableWidgets: An unsigned integer indicating the number of NavItem structures which occur in this NavMap and so likewise the number of navigable widgets on the page referring to this NavMap.

nsOwningPageIndex: An unsigned integer interpreted as an index into the Common Table Directory. The referenced row of the table directory will contain an offset to a Page widget table. The table at the indicated offset is the effective table for resolving the nsRowIndex reference below. This is the Page widget which contains the widget for which this NavItem was generated.

nsRowIndex: An unsigned integer interpreted as the index of a row within the widget table referenced by nsOwningPageIndex. The widget referenced by this table row is the widget to which this NavItem applies. Taken together, nsOwningPageIndex and nsRowIndex locate the navigatable widget for which this NavItem was generated.

nsUpTargetIndex: An unsigned integer interpreted as an index into this NavMap structure. The NavItem structure referred to by this index is associated with the widget which will be the target of navigation in the up direction.

nsDownTargetIndex: An unsigned integer interpreted as an index into this NavMap structure. The NavItem structure referred to by this index is associated with the widget which will be the target of navigation in the down direction.

nsLeftTargetIndex: An unsigned integer interpreted as an index into this NavMap structure. The NavItem structure referred to by this index is associated with the widget which will be the target of navigation in the left direction.

nsRightTargetIndex: An unsigned integer interpreted as an index into this NavMap structure. The NavItem structure referred to by this index is associated with the widget which will be the target of navigation in the right direction.

Style

A Style structure consists of a list of offsets that specify the location of formatting styles to be applied to a widget. A Style structure SHALL adhere to the syntax specified by Table 95 Style Structure.

TABLE 95

| Style Structure | | |
|---|---|---|
| Syntax | Number of bits | Format |
| ebiStyle( ) { | | |
| ssAlignment | 16 | uint16 |
| ssBG1 | 16 | uint16 |
| ssBG2 | 16 | uint16 |
| ssFG1 | 16 | uint16 |
| ssFG2 | 16 | uint16 |
| ssBorder | 16 | uint16 |
| ssFont | 16 | uint16 |
| } | | |

ssAlignment: An unsigned integer that, if non-zero, represents an offset (in octets) from the start of this ebiStyle structure to the start of an Alignment Style structure that expresses the alignment styles to be applied, or, if zero, denotes that default alignment styles are to be applied. If non-zero, then the structure addressed by the offset SHALL adhere to specified syntax. The semantics of alignment are determined by the type of widget(s) to which this style applies.

ssBG1: An unsigned integer that, if non-zero, represents an offset (in octets) from the start of this ebiStyle structure to the start of a Color Style structure that expresses the primary background color styles to be applied, or, if zero, denotes that default primary background color styles are to be applied. If non-zero, then the structure addressed by the offset SHALL adhere to the specified syntax. The semantics of primary background color are determined by the type of widget(s) to which this style applies.

ssBG2: An unsigned integer that, if non-zero, represents an offset (in octets) from the start of this ebiStyle structure to the start of a Color Style structure that expresses the secondary background color styles to be applied, or, if zero, denotes that default secondary background color styles are to be applied. If non-zero, then the structure addressed by the offset SHALL adhere to the specified syntax. The semantics of secondary background color are determined by the type of widget(s) to which this style applies.

ssFG1: An unsigned integer that, if non-zero, represents an offset (in octets) from the start of this ebiStyle structure to the start of a Color Style structure that expresses the primary foreground color styles to be applied, or, if zero, denotes that default primary foreground color styles are to be applied. If non-zero, then the structure addressed by the offset SHALL adhere to the specified syntax. The semantics of primary foreground color are determined by the type of widget(s) to which this style applies.

ssFG2: An unsigned integer that, if non-zero, represents an offset (in octets) from the start of this ebiStyle structure to the start of a Color Style structure that expresses the secondary foreground color styles to be applied, or, if zero, denotes that default secondary foreground color styles are to be applied. If non-zero, then the structure addressed by the offset SHALL adhere to the specified syntax. The semantics of secondary foreground color are determined by the type of widget(s) to which this style applies.

ssBorder: An unsigned integer that, if non-zero, represents an offset (in octets) from the start of this ebiStyleStructure to the start of a Border Style structure that expresses border styles to be applied, or, if zero, denotes that default border color styles are to be applied. If non-zero, then the structure addressed by the offset SHALL adhere to the specified syntax. The semantics of border styles are determined by the type of widget(s) to which this style applies.

ssFont: An unsigned integer that, if non-zero, represents an offset (in octets) from the start of this ebiStyle structure to the start of a Font Style structure that expresses font styles to be applied, or, if zero, denotes that default border color styles are to be applied. If non-zero, then the structure addressed by the offset SHALL adhere to the specified syntax. The semantics of font styles are determined by the type of widget(s) to which this style applies.

Trigger List

A Trigger List structure provides access to the descriptions of the Triggers that are associated with a page. A Trigger List structure SHALL adhere to the syntax specified by Table 96 Trigger List Structure.

TABLE 96

| Trigger List Structure | | |
|---|---|---|
| Syntax | Number of bits | Format |
| ebiTriggersList( ) { | | |
| tsNumTriggers | 8 | uint8 |
| for (i = 0; i < tsNumTriggers; i++) { | | |
| tsTriggerInfoIndex | 16 | uint16 |
| } | | |
| } | | |

tsNumTriggers: An unsigned integer indicating the number of triggers which occur in this Trigger structure and so also the number of Triggers associated with the page referring to this Trigger structure.

tsTriggerInfoIndex: An unsigned integer interpreted as an offset pointing to the TriggerInfo structure associated with this trigger.

TriggerInfo

A TriggerInfo structure provides a description of an individual trigger associated with a Trigger structure. A TriggerInfo structure SHALL adhere to the syntax specified by Table 97 TriggerInfo Structure

TABLE 97

| TriggerInfo Structure | | |
|---|---|---|
| Syntax | Number of bits | Format |
| ebiTriggerInfo( ) { | | |
| tisTriggerTableIndex | 16 | uint16 |
| tisTriggerActionIndex | 16 | uint16 |
| } | | |

tisTriggerTableIndex: An unsigned integer interpreted as an index into the Trigger Table. The Trigger Table row referenced by this index provides a description of this trigger.

tisTriggerActionIndex: An unsigned integer interpreted as an index into the Action Table. The Action Table row referenced by this index provides an action or sequence of actions to be performed when the described trigger is received.

Annex A Actions

This annex defines the syntax and semantics of each action that may be referenced by an action table or an action.

All numeric values shown in the operation code column of action descriptions found in this annex are to be interpreted as hexidecimal (base 16) numbers.

A.1 Add

Add the values of two variables together, placing resulting sum in temporary variable rv.

Operation

| Operation Code | Operands | Description |
|---|---|---|
| 30 08 | op1 op2 | Add value of the variable referenced by op2 to value of the variable referenced by op1, with resulting sum stored in temporary variable rv. |

The operands of this instruction are defined as follows:

| Operand | Type | Description |
|---|---|---|
| op1 | uint16 | index into variable reference table for 1st operand |
| op2 | uint16 | index into variable reference table for 2nd operand |

A.2 Add Immediate

Add an immediate value to the value of a variable, placing resulting sum in temporary variable rv.

Operation

| Operation Code | Operands | Description |
|---|---|---|
| 1A 08 | op1 op2 | Add immediate value represented by op2 to value of the variable referenced by op1, with resulting sum stored in temporary variable rv. |

The operands of this instruction are defined as follows:

| Operand | Type | Description |
|---|---|---|
| op1 | uint16 | index into variable reference table for 1st operand |
| Op2 | int32 | signed 32-bit integer |

A.3 Bitwise AND

Perform the bit-wise AND (conjunction) operation on the values of two variables, placing resulting value in temporary variable rv.

Operation

| Operation Code | Operands | Description |
|---|---|---|
| 30 06 | op1 op2 | Perform bit-wise AND operation on the values of the variables referenced by op1 and op2, with resulting value stored in termporary variable rv. |

The operands of this instruction are defined as follows:

| Operand | Type | Description |
|---|---|---|
| Op1 | uint16 | index into variable reference table for 1st operand |
| Op2 | uint16 | index into variable reference table for 2nd operand |

A.4 Bitwise AND Immediate

Perform the bit-wise AND (conjunction) operation on the value of a variable and an immediate value, placing resulting sum in temporary variable rv.

Operation

| Operation Code | Operands | Description |
|---|---|---|
| 1A 06 | op1 op2 | Perform bit-wise AND operation on the value of the variable represented by op1 and the immediate value represented by op2, with resulting value stored in termporary variable rv. |

The operands of this instruction are defined as follows:

| Operand | Type | Description |
|---|---|---|
| Op1 | uint16 | index into variable reference table for 1st operand |
| op2 | int32 | signed 32-bit integer |

A.5 Bitwise OR

Perform the bit-wise OR (disjunction) operation on the values of two variables, placing resulting value in temporary variable rv.

Operation

| Operation Code | Operands | Description |
|---|---|---|
| 30 07 | op1 op2 | Perform bit-wise OR operation on the values of the variables referenced by op1 and op2, with resulting value stored in termporary variable rv. |

The operands of this instruction are defined as follows:

| Operand | Type | Description |
|---|---|---|
| op1 | uint16 | index into variable reference table for 1st operand |
| op2 | uint16 | index into variable reference table for 2nd operand |

A.6 Bitwise OR Immediate

Perform the bit-wise OR (disjunction) operation on the value of a variable and an immediate value, placing resulting product in temporary variable rv.

Operation

| Operation Code | Operands | Description |
|---|---|---|
| 1A 07 | op1 op2 | Perform bit-wise OR operation on the value of the variable represented by op1 and the immediate value represented by op2, with resulting value stored in termporary variable rv. |

The operands of this instruction are defined as follows:

| Operand | Type | Description |
|---|---|---|
| op1 | uint16 | index into variable reference table for 1st operand |
| op2 | int32 | signed 32-bit integer |

A.7 Call Action

Perform a sequence of actions, placing the resulting value produced by the last action in the sequence in temporary variable rv.

Operation

| Operation Code | Operands | Description |
|---|---|---|
| 1B | action | Perform sequence of actions defined by action table, beginning with action table index specified by action operand, placing the resulting value of the last action of the sequence in termporary variable rv. |

The operands of this instruction are defined as follows:

| Operand | Type | Description |
|---|---|---|
| Action | uint16 | index into action table designating entry point of action sequence |

A.8 CONJUNCTIVE IF

Evaluates a sequence of expressions then branches to one of two actions depending upon whether all resulting values are true or any resulting values is false after performing any necessary type conversion to the result of each expression. If some expression produces a resulting value that is equal to false after performing type conversion, then no subsequent expression is evaluated. An expression may be any action other than IF, CONJUNCTIVE IF, DISJUNCTIVE IF, or NOOP. This action does not produce a resulting value; however, upon action completion, and immediately prior to branching to the selected action table entry, the temporary variable rv is set to the resulting value produced by the last evaluated expression after boolean conversion has been applied.

Operation

| Operation Code | Oper-ands | Description |
|---|---|---|
| 16 | op1 op2 count expr[ ] | Sequentially perform expression action denoted by expr[i], where i is less than count, convert temporary variable rv to a boolean expression, then branch to action designated by op2 if boolean is false. In case no expression evaluates to false after type conversion of resulting value, then branch to action designated by op1. |

The operands of this instruction are defined as follows:

| Operand | Type | Description |
|---|---|---|
| op1 | uint16 | index to action table entry to take if all expressions evaluate to true |
| op2 | uint16 | index to action table entry to take if any expression evaluates to false |
| Count | uint8 | non-zero count of references to expressions that follow |
| expr[ ] | uint16[ ] | array of indices of action table entries that implement expressions |

A.9 DISJUNCTIVE IF

Evaluates a sequence of expressions then branches to one of two actions depending upon whether a resulting value is true or all resulting values are false after performing any necessary type conversion to the result of each expression. If some expression produces a resulting value that is equal to true after performing type conversion, then no subsequent expression is evaluated. An expression may be any action other than IF, CONJUNCTIVE IF, DISJUNCTIVE IF, or NOOP. This action does not produce a resulting value; however, upon action completion, and immediately prior to branching to the selected action table entry, the temporary variable rv is set to the resulting value produced by the last evaluated expression after boolean conversion has been applied.

Operation

| Operation Code | Operands | Description |
|---|---|---|
| 15 | op1 op2 count expr[ ] | Sequentially perform expression action denoted by expr[i], where i is less than count, convert temporary variable rv to a boolean expression, then branch to action designated by op1 if boolean is true. In case no expression evaluates to true after type conversion of resulting value, then branch to action designated by op2. |

The operands of this instruction are defined as follows:

| Operand | Type | Description |
|---|---|---|
| op1 | uint16 | index to action table entry to take if some expression evaluates to true |
| op2 | uint16 | index to action table entry to take if no expression evaluates to true |
| Count | uint8 | non-zero count of references to expressions that follow |
| expr[ ] | uint16[ ] | array of indices of action table entries that implement expressions |

A.10 Divide

Divide one variable value by another variable value, placing resulting quotient in temporary variable rv.

Operation

| Operation Code | Operands | Description |
|---|---|---|
| 30 0A | op1 op2 | Divide the value of the variable referenced by op1 by the value of the variable referenced by op2, with resulting quotient stored in termporary variable rv. |

The operands of this instruction are defined as follows:

| Operand | Type | Description |
|---|---|---|
| op1 | uint16 | index into variable reference table for 1st operand |
| op2 | uint16 | index into variable reference table for 2nd operand |

A.11 Divide Immediate

Divide the value of a variable by an immediate value, placing resulting quotient in temporary variable rv.

Operation

| Operation Code | Oper-ands | Description |
|---|---|---|
| 1A 0A | op1 op2 | Divide the value of the variable referenced by op1 by the immediate value represented by op2, with resulting quotient stored in termporary variable rv. |

The operands of this instruction are defined as follows:

| Operand | Type | Description |
|---|---|---|
| op1 | uint16 | index into variable reference table for 1st operand |
| op2 | int32 | signed 32-bit integer |

A.12 IF

Evaluates an expression then branches to one of two actions depending upon whether resulting value is true or false after performing any necessary type conversion to result of expression. An expression may be any action other than IF, CONJUNCTIVE IF, DISJUNCTIVE IF, or NOOP. This action does not produce a resulting value; however, upon action completion, and immediately prior to branching to the selected action table entry, the temporary variable rv is set to the resulting value produced by the evaluated expression after boolean conversion has been applied.

Operation

| Operation Code | Oper-ands | Description |
|---|---|---|
| 14 | op1 op2 expr | Perform expression action denoted by expr, convert temporary variable rv to a boolean expression, then branch to action designated by op1 or op2, depending on whether boolean is true or false, respectively. |

The operands of this instruction are defined as follows:

| Operand | Type | Description |
|---|---|---|
| op1 | uint16 | index to action table entry to take if expression evaluates to true |
| op2 | uint16 | index to action table entry to take if expression evaluates to false |
| Expr | uint16 | index of action table entry that implements test expression |

A.13 Logical AND

Perform the logical AND (conjunction) operation on the values of N variables, placing resulting boolean value in temporary variable rv.

Operation

| Operation Code | Oper-ands | Description |
|---|---|---|
| 18 | count op[ ] | Perform logical AND operation on the values of the variables referenced by op[i], with i less than count, with resulting boolean value stored in termporary variable rv. |

The operands of this instruction are defined as follows:

| Operand | Type | Description |
|---|---|---|
| Count | uint8 | count of references to variables that follow |
| op[ ] | uint16[ ] | array of indices of reference table entries that implement variables |

A.14 Logical OR

Perform the logical OR (disjunction) operation on the values of N variables, placing resulting boolean value in temporary variable rv.

Operation

| Operation Code | Operands | Description |
|---|---|---|
| 18 | count op[ ] | Perform logical OR operation on the values of the variables referenced by op[i], with i less than count, with resulting boolean value stored in termporary variable rv. |

The operands of this instruction are defined as follows:

| Operand | Type | Description |
|---|---|---|
| Count | uint8 | count of references to variables that follow |
| op[ ] | uint16[ ] | array of indices of reference table entries that implement variables |

A.15 Modulo

Divide one variable value by another variable value, placing resulting remainder in temporary variable rv.

Operation

| Operation Code | Operands | Description |
|---|---|---|
| 30 0C | op1 op2 | Divide the value of the variable referenced by op1 by the value of the variable referenced by op2, with resulting remainder stored in termporary variable rv. |

The operands of this instruction are defined as follows:

| Operand | Type | Description |
|---|---|---|
| op1 | uint16 | index into variable reference table for 1$^{st}$ operand |
| op2 | uint16 | index into variable reference table for 2$^{nd}$ operand |

A.16 Modulo Immediate

Divide the value of a variable by an immediate value, placing resulting remainder in temporary variable rv.

Operation

| Operation Code | Operands | Description |
|---|---|---|
| 1A 0C | op1 op2 | Divide the value of the variable referenced by op1 by the immediate value represented by op2, with resulting remainder stored in termporary variable rv. |

The operands of this instruction are defined as follows:

| Operand | Type | Description |
|---|---|---|
| op1 | uint16 | index into variable reference table for 1$^{st}$ operand |
| op2 | int32 | signed 32-bit integer |

A.17 Multiply

Multiply the values of two variables together, placing resulting product in temporary variable rv.

Operation

| Operation Code | Operands | Description |
|---|---|---|
| 30 0B | op1 op2 | Multiply the value of the variable referenced by op2 with the value of the variable referenced by op1, with resulting product stored in termporary variable rv. |

The operands of this instruction are defined as follows:

| Operand | Type | Description |
|---|---|---|
| op1 | uint16 | index into variable reference table for 1$^{st}$ operand |
| op2 | uint16 | index into variable reference table for 2$^{nd}$ operand |

A.18 Multiply Immediate

Multiply an immediate value to the value of a variable, placing resulting product in temporary variable rv.

Operation

| Operation Code | Operands | Description |
|---|---|---|
| 1A 0B | op1 op2 | Multiply immediate value represented by op2 with the value of the variable referenced by op1, with resulting product stored in termporary variable rv. |

The operands of this instruction are defined as follows:

| Operand | Type | Description |
|---|---|---|
| op1 | uint16 | index into variable reference table for 1st operand |
| op2 | int32 | signed 32-bit integer |

A.19 NOOP

Do nothing. This action is used to implement unconditional branching (goto) semantics in an action table. This action does not produce a resulting value; however, the temporary variable rv is not modified by performance of this action.

Operation

| Operation Code | Operands | Description |
|---|---|---|
| FF | | Do nothing. |

A.20 Set

Set the value of a variable to the value of another variable, placing a copy of the new value in temporary variable rv.

Operation

| Operation Code | Operands | Description |
|---|---|---|
| 1E | dst src | Set the value of the variable referenced by the dst operand to the value of the variable referenced by the src operand, placing a copy of the new value in termporary variable rv. |

The operands of this instruction are defined as follows:

| Operand | Type | Description |
|---|---|---|
| Dst | uint16 | index into variable reference table for destination |
| Src | uint16 | index into variable reference table for source |

A.21 Set Immediate

Set the value of a variable to an immediate value, placing a copy of the new value in temporary variable rv.

Operation

| Operation Code | Operands | Description |
|---|---|---|
| 1F | dst src | Set the value of the variable referenced by the dst operand to the immediate value represented by the src operand, placing a copy of the new value in termporary variable rv. |

The operands of this instruction are defined as follows:

| Operand | Type | Description |
|---|---|---|
| Dst | uint16 | index into variable reference table for destination |
| Src | int32 | signed 32-bit integer |

A.22 Subtract

Subtract one variable value from another variable value, placing resulting difference in temporary variable rv.

Operation

| Operation Code | Operands | Description |
|---|---|---|
| 30 09 | op1 op2 | Subtract value of the variable referenced by op2 from value of the variable referenced by op1, with resulting difference stored in termporary variable rv. |

The operands of this instruction are defined as follows:

| Operand | Type | Description |
|---|---|---|
| op1 | uint16 | index into variable reference table for 1st operand |
| op2 | uint16 | index into variable reference table for 2nd operand |

A.23 Subtract Immediate

Subtract an immediate value from the value of a variable, placing resulting difference in temporary variable rv.

Operation

| Operation Code | Operands | Description |
|---|---|---|
| 1A 08 | op1 op2 | Subtract immediate value represented by op2 from the value of the variable referenced by op1, with resulting difference stored in termporary variable rv. |

The operands of this instruction are defined as follows:

| Operand | Type | Description |
|---|---|---|
| Op1 | uint16 | index into variable reference table for 1st operand |
| Op2 | int32 | signed 32-bit integer |

A.24 TEST

Evaluate a predicate taking two parameters, each a variable reference, placing resulting boolean value in temporary variable rv.

Operation

| Operation Code | Operands | Description |
|---|---|---|
| 30 | test op1 op2 | Evaluate test predicate taking two parameters, where the 1st parameter is expressed by the variable referenced by op1, and the 2nd parameter is expressed by the variable referenced by op2, with resulting boolean value indicating predicate result stored in termporary variable rv. |

The operands of this instruction are defined as follows:

| Operand | Type | Description |
|---|---|---|
| Test | uint8 | enumeration indicating test predicate to perform |
| op1 | uint16 | index into variable reference table for 1st operand |
| op2 | uint16 | index into variable reference table for 2nd operand |

The set of enumeration values that designate a test predicate is defined by Table 98 Test Predicates.

TABLE 98

Test Predicates

| Value | Predicate |
|---|---|
| 0 | Equals |
| 1 | not equals |
| 2 | Greater than |
| 3 | less than |
| 4 | Greater than or equals |
| 5 | less than or equals |
| 6-12 | used by other actions |
| 13 | contains substring |
| 14 | starts with substring |
| 15-255 | reserved |

Note:
Test predicate values 6 through 12 are used in opcode combinations of other actions that do not pertain to the TEST or TEST IMMEDIATE actions.

A.25 TEST IMMEDIATE

Evaluate taking two parameters: one variable reference and one immediate, integral value, placing resulting boolean value in temporary variable rv.

Operation

| Operation Code | Operands | Description |
|---|---|---|
| 1A | test op1 op2 | Evaluate test predicate taking two parameters, where the 1st parameter is expressed by the variable referenced by op1, and the 2nd parameter is expressed by the immediate value represented by op2, with resulting boolean value indicating predicate result stored in termporary variable rv. |

The operands of this instruction are defined as follows:

| Operand | Type | Description |
|---|---|---|
| Test | uint8 | enumeration indicating test predicate to perform |
| op1 | uint16 | index into variable reference table for 1st operand |
| op2 | int32 | signed 32-bit integer |

The set of enumeration values that designate a test predicate is defined above by Table 98 Test Predicates.

Annex B Events

B.1 OnBlur

An OnBlur event is generated by the following widgets:

Button
HotSpot
Radio
Selector
TextInput

The generation of an OnBlur event is triggered by the completion of transfer of input focus away from a widget, but prior to the generation of a new OnFocus event for the widget receiving focus.

B.2 OnClick

An OnClick event is generated by the following widgets:

Button
HotSpot
Radio
Selector
TextInput

The generation of an OnClick event is triggered by the press and release of an activation button on a viewer input device within the area of a widget.

B.3 OnData

An OnData event is generated by the following widgets:

Page

The generation of an OnData event is triggered by the platform detecting that a new version of the data resource is available.

B.4 OnKey

An OnKey event is generated by the following widgets:

Page

The generation of an OnKey event is triggered by the by the press and release of any button on a viewer input device.

B.5 OnFailure

An OnFailure event is generated by the following widgets:

Form

The generation of an OnFailure event is triggered by the platform receiving an HTTP response header carrying a status code that is neither 200 nor 204 in response to a Form widget data submittal.

B.6 OnFocus

An OnFocus event is generated by the following widgets:

Button
HotSpot
Radio
Selector
TextInput

The generation of an OnFocus event is triggered by the completion of transfer of input focus to a widget.

B.7 OnFocusOption

An OnFocusOption event is generated by the following widgets:

Selector

The generation of an OnFocusOption event is triggered when any option in a Selector widget receives input focus.

B.8 OnLoad

An OnLoad event is generated by the following widgets:

Page

The generation of an OnLoad event is triggered by the completion of decoding a page but occurs before the rendering of the page.

B.9 OnMouse

An OnMouse event is generated by the following widgets:

Button
HotSpot
Radio
Selector
TextInput

The generation of an OnMouse event is triggered by the viewer moving the pointer input device within the area of a widget while that widget has input focus.

B.10 OnNewTrigger

An OnNewTrigger event is generated by the following widgets:

Page

The generation of an OnNewTrigger event is triggered by the platform detecting the arrival of a trigger that has been broadcast to the application.

B.11 OnProgramEventEnd

An OnProgramEventEnd event is generated by the following widgets:

Page

The generation of an OnProgramEventEnd event is triggered when a program event, being shown in the Page widget's background, has reached a specified end point.

B.12 OnProgramEventStart

An OnProgramEventStart event is generated by the following widgets:

Page

The generation of an OnProgramEventStart event is triggered when a program event, shown in the Page widget's background, is about to begin.

B.13 OnServiceSelection

An OnServiceSelection event is generated by the following widgets:

Page

The generation of an OnServiceSelection event is triggered at the start of the process of tuning away from the current service to acquire a new service.

B.14 OnSubmit

An OnSubmit event is generated by the following widgets:

Form

The generation of an OnSubmit event is triggered by the Form widget whenever the data of the form is about to be sent as part of a form submittal.

B.15 OnSuccess

An OnSuccess event is generated by the following widgets:

Form

The generation of an OnSuccess event is triggered by the platform receiving an HTTP response header carrying a status code that is either 200 or 204 in response to a Form widget data submittal.

B.16 OnTimeout

An OnTimeout event is generated by the following widgets:

Page

The generation of an OnTimeout event is triggered when an interval without viewer input is detected that is longer than a specified duration.

B.17 OnTimer

An OnTimer event is generated by the following widgets:

Timer

The generation of an OnTimer event is triggered when a Timer widget's time period has expired.

B.18 OnUnload

An OnUnload event is generated by the following widgets:

Page

The generation of an OnUnload event is triggered by the start of the process that will unload the page from memory.

Annex C Platform Parameter Sets

This annex defines a number of platform parameter sets, each of which charcterizes a platform for use by this specification.

C.1 Generic

The generic platform parameter set is defined as follows

| Parameter | Setting | Notes |
|---|---|---|
| Video scaling | none | |
| graphics resolution | 704 (h) × 480 (v) | |
| safe area | [52, 20]; [652, 460] | |
| pixel aspect ratio | 22:15 | |
| supported color modes | palette | |
| palette entries | 256 | 1 |
| supported image types | ISO/IEC 15948, Information technology Computer graphics and image processing -Portable Network Graphics (PNG): Functional Specification, 2003, ISO | |

Notes

1. Required support for PNG image formats is limited to the following chunks: IDAT, IEND, IHDR, PLTE. Support is required only for images with bit depth 8, color type 3, compression method 0 (deflate), filter method 0 (adaptive), filter type 0 (none), interlace method 0 (progressive).

C.2 Motorola DCT2000

The Motorola DCT2000 platform parameter set is defined as follows

| Parameter | Setting | Notes |
|---|---|---|
| graphics resolution | 704 (h) × 480 (v) | |
| safe area | [52, 20]; [652, 460] | |
| Pixel aspect ratio | 22:15 | |

C.3 Scientific-Atlanta Explorer 2000

The Scientific-Atlanta Explorer 2000 platform parameter set is defined as follows

| Parameter | Setting | Notes |
|---|---|---|
| graphics resolution | 640 (h) × 480 (v) | |
| safe area | [64, 48]; [576, 432] | |
| Pixel aspect ratio | 1:1 | |

Design Problem

For 2.1 and later, different MAC products will receive trigger-like data from one or more of 4 sources: VBI, playlists, inband digital streams, and unicast messages. Because all MAX applications will operate similarly despite the source of such non-DAT trigger-data, factoring redundant functionality into a single set of client-interfaces, to be used with all trigger-sources, will improve client performance, code size, and maintainability.

Design Considerations

1. Extensibility
2. Maintainability
3. Performance
4. Code-size
5. MAC-file size Proposed Solution There will be a new table-type, TriggerTable. A single table of this type, triggerTable will be introduced into the MAC file. Each row of TriggerTable consists information necessary to uniquely route a valid trigger to the appropriate table in the MAC client. Once routed, trigger-data can be accessed by a MAX application via $$table[row].column.

Trigger Table Table Schema

| Column | Name | Type | Width | Offset |
|---|---|---|---|---|
| 0 | triggerLocator | 16-bit offset to structure | 2 | 1 |
| 1 | maxRows | 16-bit unsigned integer | 2 | 3 |
| 2 | headerType | 8-bit unsigned integer | 1 | 5 |
| 3 | wireFormat | 16-bit offset to structure | 2 | 6 |

triggerLocator: An unsigned integer indicating the offset from the start of the layout File to the start of a TriggerLocator table.

maxRows: An unsigned integer indicating the maximum number of triggers that can be kept in the cicular buffer for this trigger-locator.

headerType: TBD.

wireFormat:: An unsigned integer indicating the offset from the start of the layout File to the start of a WireFormat table.

There will be a new structure-type, TriggerLocator, with a single triggerLocator structure for each row in triggerTable. TriggerLocator provides a unique mapping between a trigger in given transport, and table stored in MAC-client memory.

simsbf signed integer most significant bit first uimsbf unsigned integer most significant bit first TriggerLocator Structure (ANALOG-SOURCEID)

| Syntax | Number of bits | Format |
|---|---|---|
| triggerLocatorStructure( ) { | | |
| locatorType | 8 | uimsbf |
| tableId | 16 | uimsbf |
| sourceId | 32 | uimsbf |
| } | | |

locatorType: An enumeration value indicating the type of the strucutre described by this table entry, where the values of this enumeration are defined by ANALOG-SOURCEID, ANALOG-SOURCENAME, DIGITAL-SOURCEID, DIGITAL-SOURCENAME, MESSAGE.

tableId: An unsigned integer indicating the offset from the start of the layout File to the start of a String which encodes the Id of the this locator.

sourceId: An unsigned integer indicating the source-id of the locator.

TriggerLocator Structure (ANALOG-SOURCENAME)

| Syntax | Number of bits | Format |
|---|---|---|
| triggerLocatorStructure ( ) { | | |
| locatorType | 8 | uimsbf |
| tableId | 16 | uimsbf |
| sourceName | 16 | uimsbf |
| } | | |

locatorType: An enumeration value indicating the type of the strucutre described by this table entry, where the values of this enumeration are defined by ANALOG-SOURCEID, ANALOG-SOURCENAME, DIGITAL-SOURCEID, DIGITAL-SOURCENAME, MESSAGE.

tableId: An unsigned integer indicating the offset from the start of the layout File to the start of a String which encodes the Id of the this locator.

sourceName: An unsigned integer indicating the offset from the start of the layout File to the start of a String which encodes the source-name of the locator.

TriggerLocator Structure (DIGITAL-SOURCEID)

| Syntax | Number of bits | Format |
|---|---|---|
| triggerLocatorStructure ( ) { | | |
| locatorType | 8 | uimsbf |
| sourceId | 32 | uimsbf |
| messageType | 32 | uimsbf |
| streamType | 8 | uimsbf |
| } | | |

locatorType: An enumeration value indicating the type of the strucutre described by this table entry, where the values of this enumeration are defined by ANALOG-SOURCEID, ANALOG-SOURCENAME, DIGITAL-SOURCEID, DIGITAL-SOURCENAME, MESSAGE.

sourceId: An unsigned integer indicating the source-id of the locator.

messageType: An unsigned integer indicating the MPEG table-number of the locator.

streamType: An unsigned integer indicating one of [DC2TEXT, DC2SUBTITLE, MPEGPRIVATE, MPEGDSMCC]

TriggerLocator Structure (DIGITAL-SOURCENAME)

| Syntax | Number of bits | Format |
|---|---|---|
| triggerLocatorStructure ( ) { | | |
| locatorType | 8 | uimsbf |
| sourceName | 16 | uimsbf |
| messageType | 32 | uimsbf |
| streamType | 8 | uimsbf |
| } | | |

locatorType: An enumeration value indicating the type of the strucutre described by this table entry, where the values of this enumeration are defined by ANALOG-SOURCEID, ANALOG-SOURCENAME, DIGITAL-SOURCEID, DIGITAL-SOURCENAME, MESSAGE.

sourceName: An unsigned integer indicating the offset from the start of the layout File to the start of a String which encodes the source-name of the locator.

messageType: An unsigned integer indicating the MPEG table-number of the locator.

streamType: An unsigned integer indicating one of [DC2TEXT, DC2SUBTITLE, MPEGPRIVATE, MPEGDSMCC]

| TriggerLocator Structure (MESSAGE) | | |
|---|---|---|
| Syntax | Number of bits | Format |
| triggerLocatorStructure ) { | | |
| locatorType | 8 | uimsbf |
| tableId | 16 | uimsbf |
| } | | |

locatorType: An enumeration value indicating the type of the strucutre described by this table entry, where the values of this enumeration are defined by ANALOG-SOURCEID, ANALOG-SOURCENAME, DIGITAL-SOURCEID, DIGITAL-SOURCENAME, MESSAGE.

tableId: An unsigned integer indicating the offset from the start of the layout File to the start of a String which encodes the Id of the this locator.

There will be a new table-type, WireFormat. For each triggerLocator structure, there will exist an associated wireFormat table. WireFormat describes the wire-format of the data portion of the trigger. This allows the MAC client to map between the raw-data in the trigger and the table-row-column syntax used by MAX apps.

| WireFormat Structure (MACDATAROW) | | |
|---|---|---|
| Syntax | Number of bits | Format |
| wireFormatStructure( ) { | | |
| encodingType | 8 | uimsbf |
| columnCount | 8 | uimsbf |
| rowWidth | 16 | uimsbf |
| for (i = 0; i < columnCount; i++) { | | |
| datatype | 8 | uimsbf |
| width | 8 | uimsbf |
| offset | 16 | uimsbf |
| } | | |
| } | | |

encodingType: An enumeration value indicating the type of the row described by this Structure entry, where the values of this enumeration are defined by MACDATAROW, DELIMITED, BINARYRECORD, SIMPLEXML.

columnCount: An unsigned integer from 0 to 255 indicating the number of columns described by the WireFormat structure.

rowWidth: An unsigned integer from 0 to 65535 indicating the byte-width of a row of columns.

datatype: The datatype of this column.

width: The number of elements of type datatype which make up this column.

offset: An unsigned integer indicating the offset from the start of a row of data to the start of this column.

| WireFormat Structure (DELIMITED) | | |
|---|---|---|
| Syntax | Number of bits | Format |
| wireFormatStructure( ) { | | |
| encodingType | 8 | uimsbf |
| columnCount | 8 | uimsbf |
| delimiter | 8 | uimsbf |
| for (i = 0; i < columnCount; i++) { | | |
| datatype | 8 | uimsbf |
| } | | |
| } | | |

encodingType: An enumeration value indicating the type of the row described by this Structure entry, where the values of this enumeration are defined by MACDATAROW, DELIMITED, BINARYRECORD, SIMPLEXML.

columnCount: An unsigned integer from 0 to 255 indicating the number of columns described by the WireFormat structure.

delimiter: a char encoding the reserved delimiter character for this locator.

datatype: The datatype of this column.

| WireFormat Structure (BINARYRECORD) | | |
|---|---|---|
| Syntax | Number of bits | Format |
| wireFormatStructure( ) { | | |
| encodingType | 8 | uimsbf |
| columnCount | 8 | uimsbf |
| for (i = 0; i < columnCount; i++) { | | |
| datatype | 8 | uimsbf |
| offset | 16 | uimsbf |
| width | 8 | uimsbf |
| } | | |
| } | | |

encodingType: An enumeration value indicating the type of the row described by this Structure entry, where the values of this enumeration are defined by MACDATAROW, DELIMITED, BINARYRECORD, SIMPLEXML.

columnCount: An unsigned integer from 0 to 255 indicating the number of columns described by the WireFormat structure.

datatype: The datatype of this column.

offset: An unsigned integer indicating the offset from the start of a row of data to the start of this column.

width: An unsigned integer from 0 to 65535 indicating the byte-width of a row of columns.

| WireFormat Structure (SIMPLEXML) | | |
|---|---|---|
| Syntax | Number of bits | Format |
| wireFormatStructure( ) { | | |
| encodingType | 8 | uimsbf |
| columnCount | 8 | uimsbf |
| for (i = 0; i < columnCount; i++) { | | |
| xpathOffset | 16 | uimsbf |
| datatype | 8 | uimsbf |
| } | | |
| } | | |

encodingType: An enumeration value indicating the type of the row described by this Structure entry, where the values of this enumeration are defined by MACDATAROW, DELIMITED, BINARYRECORD, SIMPLEXML.

columnCount: An unsigned integer from 0 to 255 indicating the number of columns described by the WireFormat structure.

xpathOffset: Pointer to string containing xpath to data for this column (i.e. <docElem/subElem[1]/@attr>)

datatype: The datatype of this column

There will be a new structure, TriggerAction. A single structure of this type, triggerAction will exist in each page of a MAX-app; the offset to the triggerAction structure will be encoded as a page property. For every <onnewtrigger> defined in a MAX page, there will be an entry in triggerAction. Every entry in a TriggerAction consists of a pair of triggerTable-index, and action-Table-index, which maps the action-chain to execute (if any), when a trigger matching the locator of that triggerTable-index, is received.

TriggerAction Structure

| Syntax | Number of bits | Format |
|---|---|---|
| triggerActionStructure( ) { | | |
| rowCount | 16 | uimsbf |
| for (i = 0; i < rowCount; i++) { | | |
| actionTableIndex | 16 | uimsbf |
| triggerTableIndex | 16 | uimsbf |
| } | | |
| } | | |

columnCount: An unsigned integer indicating the number of rows described by the TriggerAction structure.

triggerTableIndex: index into triggerTable actionTableIndex: index into actionTable MAC-client structures Two new arrays will be introduced: triggerPayloads and triggerHeaders. Both of these array are 3D arrays: pointers to pointers to byte-arrays (i.e. the byte[ ][ ][ ] triggerPayloads, in Java). Both triggerPayloads and triggerHeaders take their outer-dimension from triggerTable (i.e. the length of triggerPayloads/triggerHeaders is the same that of triggerTable). Thus, every entry in triggerTable has a corresponding entry in triggerPayloads/triggerHeaders.

The 2D array-of-bytearrays, known as the circularPayloadBuffer, pointed to by each entry of triggerPayloads takes its outer-dimension from the value of maxRows, in the corresponding triggerTable entry. Each entry of a circularPayloadBuffer points to the payloadData of a trigger The 2D array-of-bytearrays, known as the circularHeaderBuffer, pointed to by each entry of triggerHeaders takes its outer-dimension from the value of maxRows, in the corresponding triggerTable entry. Each entry of a circularPayloadBuffer points to the headerData of a trigger A new structure-type will be introduced, TriggerData. For each row in triggerTable there will be a unique triggerData structure. The number of entries in triggerData will match the maxRows column of the triggerTable-row. An entry of TriggerData consists of two pointers: to trigger header-data and to trigger payload-data.

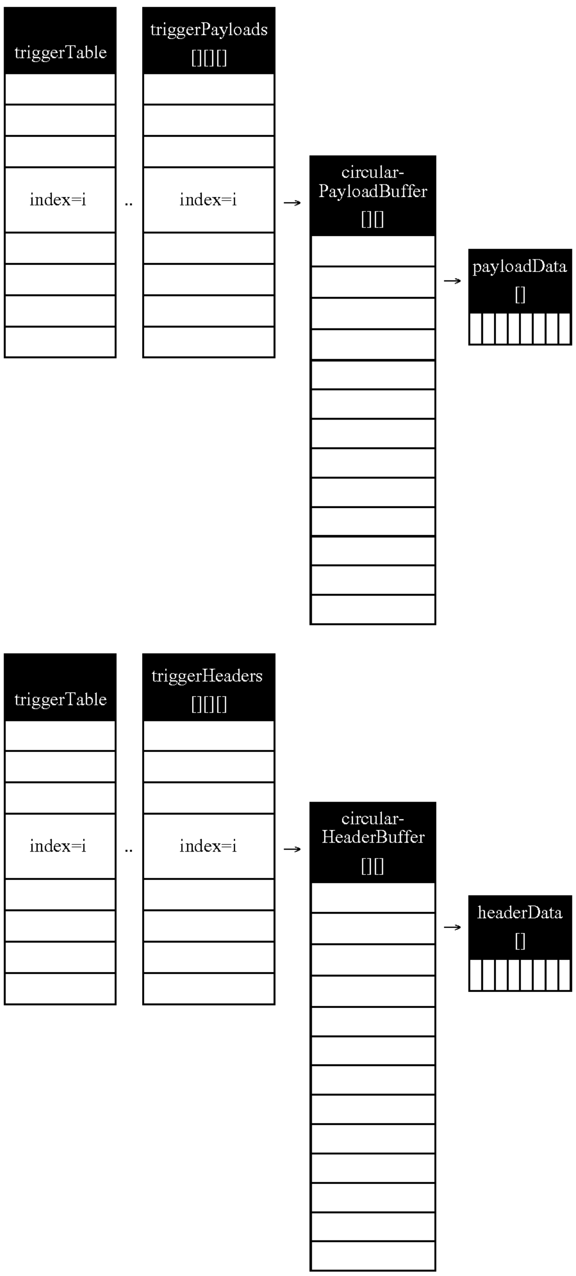

MAC-Client Operations

This section addresses additions and modification to MAC-client behavior, with respect to unified trigger-handling, at various points in the MAC lifecycle.

MAC Load

In addition to setting-up VBI filters, the MAC client will now start a UDP-listener.

Foreground/Partition-Load

MAC client will scan triggerTable. If there are no ANALOG triggersLocators, client will turn off vbi-listener. Client will create/start an MPEG filter, for each DIGITAL triggerLocator whose sourceid/sourcename matches the current source-name.

Page Load

Client should not need to take special action, on page-load.

Channel Channel

MAC client will scan triggerTable. For each DIGITAL triggerLocator whose sourceid/sourcename does not match the new source-name/source-id, client will destroy/stop the MPEG filter. Client will create/start an MPEG filter, for each DIGITAL triggerLocator whose sourceid/sourcename matches the new source-name.

Page Exit

Client should not need to take special action, on page-exit.

MAC Exit

Client re-starts vbi-listener, if stopped. UDP-listener remains active.

Unsolicited Trigger Arrival

MAC client scans triggerTable, looking for entry whose triggerLocator matches the transport-type, source-name/id (if source type is ANALOG) and Id of this trigger. Trigger payload/header are added to the appropriate circularPayloadBuffer/circularHeaderBuffer. Client scans triggerAction structure of current-page, executes action-chain for this trigger, if any.

Solicited Trigger Arrival

Client may not have to scan triggerTable, since there should be a unique MPEG filter object for every DIGITAL localor[???TBD ???] Client scans triggerAction structure of current-page, executes action-chain for this trigger, if any.

Server Initiated Messaging System Design

Design Problem

Messaging should be a generic system that supports any number of partitions in a method similar to ETV.

Design Considerations

Extendability

Network usage

Authoring ease

Similarity to ETV Triggers

Time to market

Proposed Solution

Each message will have a header that contains information about which message partition (on the STB) the message gets routed to, and a body which contains a data file. This design is meant to be very similar to the ETV design.

```
  <appDesc platform="MACJ__SA" name="callerIDdemo" . . . >
<partition name="callerIDdemo" palette=" . . . " location="oob">
  <messageData schema="callerIDdemo/data/message.xsd" ??? />
  <template dst="index.xml" category="callerIDdemo" . . . />
</partition>
```

-continued

```
</appDesc>
<mac>
  <messagetable name="messageTableName"
format="messageSchemaName"
newMessageAction="accumulate" accumulationBufferSize="10"/>
  <event trigger="$$messageTableName" onnewmessage=" . . . "/>
  <page . . . >
    . . .
  </page>
</mac>
```

Message Format

| Data Type | Label | Description |
|---|---|---|
| Byte | message type | Allows messages of various internal data formats to be sent using the same transport method. (See Message Type Table) |
| byte[] | Data | The actual message |

Message Types

| Message Type | Mnemonies | Description |
|---|---|---|
| 0x00 | MESSAGE__TYPE__ILLEGAL | Disallowed |
| 0x01 | MESSAGE__TYPE__ROW__WITH__ ROUTING | A new data format where only a row of a datatable is encoded, as well as any 'heavy' data being put in a blob afterwards. |
| 0x02 - 0xff | | Reserved for future expansion |

MESSAGE_TYPE_ROW_WITH_ROUTING

| Data Type | Label | Description |
|---|---|---|
| Byte | routing info length | The length of the routing information string |
| String | routing information | The routing information |
| Byte | partition name length | The length of the name of the partition |
| String | Partition name | The name of the partition to pass this message to |
| Byte | messageTable name length | The length of the message table name |
| String | messageTable name | Used to determine which table in the partition this message should be a part of |
| byte[] | row data | The optimized (with no headers) row data |

Note: optimized message types may be used.

Handling Message Routing

The message relay will add the routing information to the message it sends to the client. The client then (during form submission) automatically (based on the responseTo and the message type) adds the correct routing information to the outgoing request message.

MAC Common Client Impact

All code changes will take place in the common layer except for the actual messaging portion (which will be minimized.)

MAC Integration Layer Impact

ETV, Playlists, VBI & Server Messaging may be abstracted out into a common code base—Input Events (or something like it) since they are all so similar.

MAX Authoring Impact

Add 'message' version of most ETV tags.

<messagetable> (New tag)

attribute: src (same usage as 'src' property of <etvtable>)

attribute: type—the type of message expected (see Message Type Table)

attribute: name (same usage as 'name' property of <etvtable>)

attribute: format (same usage as 'format' property of <etvtable>)

attribute: mode (prefer to call this mode, not newMessageAction)="accumulate/replace" states if the new message is accumulated or if it replaces the previous message. This will allow client side missed call log creation.

attribute: buffer (prefer to call this 'buffer', not 'accumulationBufferSize')="int" the maximum number of rows to accumulate <event> tag attribute additions:

attribute: message (synonomous with 'trigger' attribute)

attribute: onnewmessage (synonomous with 'onnewtrigger' attribute)

In the same way that special data files for eTV, whose document root elements is <etv> and not <data>, exist, one may also use a document root element of <message> for special 'message' type data files.

Add a new RefType for the MessageTable reference

When using the accumulated row should access it using $$table[row].column—where the $0^{th}$ row is the least recently received message.

A method, deleterow( ) (possibly with one argument—the row), will need to be added to allow the author to remove the oldest row in the event that the application wishes to maintain the data in the table.

When this table is asked how many rows it has, it returns the number of messages it has received and is currently allowing the user to access.

If more messages are received than will fit in the allocated buffer, the new message will overwrite the oldest message (this is a circular buffer).

Rows are only added to the 'bottom' of the table, and removed from the 'top' of the table.

<form> tag gets one new attribute:

attribute: responseTo="$$table[$rowvar]" the reference to the message to respond with regard to.

Optimizer Impact

Add APIs to allow the server piece to have access to the messageTable name information.Add support for the 'message' versions of ETV tags from MAX Authoring as defined above. Add attributes to the form tag.

Add support for the new refTable type

Add support for the "short" string type—[byte|string] as well as [short|string]

Add 'message' version of most ETV tags.

Add support for a new messageTable table in the common vals table in the MAC file.

Packager Impact

There will likely be some application Descriptor impacts including:

child element to the <partition> tag of <messageData>, similar in function to the existing <etvData> tag Parsing of new data document root element <message> and typemap creation, similar to <etvData>

Message Server

Message server will need to either run optimizer to create it's messages (at least the datatable part) or come up with an alternate solution. If it is the case that the runtime messages need to be run through Optimizer, there would need to be a new way to run Packager to trigger a "message only" type of build, similar to data. Or, more likely, there needs to be functionality similar to two-way—especially if we wish this to be used for IM type applications.

Liberate APIs Required (Client)

com/liberate/io/AsyncDatagramConnection.setListener( )

com/liberate/io/AsyncDatagramConnection.newDatagram( )

com/liberate/io/AsyncDatagramConnection.receive( )

com/liberate/io/AsyncDatagramConnection.getMaximumLengthO javax.microedition.io.Connector.open( )

javax.microedition.io.Datagram (class)

javax.microedition.io.DatagramConnection (class)

One or more messages at a time may be supported

Data file creation via concatenation may be allowed (e.g., for IM types of applications).

Caller ID response messages should go back to the same server that initiated the communication. The MAC may support arbitrary cookies for 2-way messages. The server load-balancer needs a sticky cookie of the form xnnnn where x is a server id used by the load balancer, and nnnn is a unique number (probably more than 4 digits) that identifies the message.

The 'sourceid' and 'sourcename' attributes of the <messagetable> tag may be supported in a fashion similar to <etvtable>?

Data file headers may be moved out of the dat file & into the layout file.

Accumulation is supported to give flexibility to support missed call log generation on the client side, as well as an IM style of application.

Testing

This section describes how the Messaging system may be tested. MAC Messaging is very time dependant—so one will need to test the ability of the client to receive a message in a acceptable time period from the time the server side servlet sends a message.

To test performance capabilities one would sync up the time on the UDP server and the client STB. Then send messages from the UDP server which contain time stamps on the server. The client's eventhandler will then capture the STB's system time of when the message was received using #client.time. One can then compare the UDP sent time vs. the client's received time and determine the approximate time it takes for a message to be received by the client.

```
<page>
<event table="messageTable"
onnewmessage="set(@messageReceived.text,
#client.date.unix);set(@messageSent.text,
```

-continued

```
$$messageTable[0].timeMessageSent);redraw(@textGroup)"/>
<group name="textGroup">
  <text name="messageReceived"/>
  <text name="messageSend"/>
</group>
</page>
```

2 messages in a row to the client 10 messages in a row to the client—one right after another Validate onnewmessage( ) event trigger—

Verify it is fired for every message that is received by client—regardless of how many messages are sent and how fast they come.

Validation test for this would be: onnewmessage("add ($counterVar, 1); redraw(@textWhichReferencesCounterVar)"). Send 100 message to client very quickly and then verify "100" is displayed by text object on the screen.

Validate onnewmessage( ) event trigger can execute any MAC method. Onnewmessage( )→load( ), loadapp( ), loadjar( ), sub( ), add( ), call( ), set( ), reset( )

Message accumulates as rows in new datatable type. Accumulation buffer size says what message we need to respond to next. Always looping—never exceeds a set number of max messages in the buffer.

End to end testing will involve using a UDP message generator on the server side. 2way map which receives client response. May need to use Ethereal for debugging purposes. QA tester will need to familiarize oneself with this tool.

messagetable> tag testing. Validate optimizer respects XSD definition for <messagetable>.

verify type of message—currently only 1 message type is allowed.

verify name verify format verify mode—accumulate/replace. Only need to test accumulate in this release.

buffer—verify max rows to accumulate

<event> tag—message, onnewmessage handler—verify multiple <event> tags can be used to handle messages for multiple message tables.

Validate that multiple event handlers can all fire correctly even if high volume of events come from server. The way we would validate this is again having the following page:

```
<page>
<event trigger="$$messgeTable1"
onnewmessage="add($counter1,1);redraw(@text1)"/>
<event trigger="$$messgeTable2"
onnewmessage="add($counter2,1) ;redraw(@text2)"/>
<event trigger="$$messgeTable3"
onnewmessage="add($counter3,1) ;redraw(@text3)"/>
<event trigger="$$messgeTable4"
onnewmessage="add($counter4,1) ;redraw(@text4)"/>
<text name="text1">$counter1</text>
<text name="text2">$counter2</text>
<text name="text3">$counter3</text>
<text name="text4">$counter4</text>
</page>
```

Using this test page send a large volume of messages of all types (messgeTable1-4), and at any point in time the text on the screen should match the correct number of messages sent down by the UDP server.

<message> tag for data files containing messages verify ability to access message in table using $$messagetable[row].column Set(@text.text, $$messagetable[row].column)

Set($stringVar, $$messagetable[row].column)

Set($stringBufferVar, $$messagetable[row].column)

Set(#client.nvram.message, $$messagetable[row].column)

Set(@selectList.datatable, $$messagetable)

verify order of messages in table match order in which they were received verify ability to deleterow(rowNumber) from cache of message received verify correct action occurs when deleterow(rowNumber) called where rowNumber equals:

a row number which contains a message a row number does not contain a message a row number that does not exist (−1, 1+MAX row)

a non-integer verify if buffer is full—oldest message is overwritten with new message verify new rows are added to bottom of the table, and removed from the top of the table verify form can be correctly use to respond to message receipt verify message type of 0x00 is ignored by client—message should NOT be added to message buffer verify message type of 0x02-0xff is ignored by client—message should NOT be added to message buffer verify message type of 0x01 is accepted by client and byte[ ] field is accepted as message and added into message buffer verify routing header is correctly read out and used in 2way response verify body of MESSAGE_TYPE_ROW_WITH_ROUTING is constructed correctly.

Verify it is read out correctly by client.

verify routing information length and routing information is read correctly from MESSAGE_TYPE_ROW_WITH_ROUTING by client verify partition length and name is read correctly from MESSAGE_TYPE_ROW_WITH_ROUTING verify message table name length and name is read correctly from MESSAGE_TYPE_ROW_WITH_ROUTING verify optimizer generates correct header based on routing information, partition name, and message table name for MESSAGE_TYPE_ROW_WITH_ROUTING is there a MAX length for each of these field? If so we need to verify optimizer throws exception when any header exceeds it's MAX.

verify optimizer generates exception if routing info, partition, or message table is not specified (length=0)

verify optimizer generates exception if routing info, partition, or message table is not in correct format verify optimizer generates exception if specified partition does not exist

What is claimed is:

1. A method, comprising executing computer-readable instructions formatted in a binary interchange format (BIF) of an enhanced television BIF (EBIF) application via user agent by interpreting the computer-readable instructions directly and without additional compilation.

2. The method of claim 1, wherein the user agent has a configuration based on a set-top box platform.

3. The method of claim 2, wherein the interpreting comprises processing the EBIF application directly in the set-top box memory by the user agent.

4. The method of claim 3, wherein processing the EBIF application further comprises processing a common binary portion of the EBIF application that is executable independent of the set-top box platform and corresponding user agent.

5. The method of claim 3, wherein processing the EBIF application further comprises the user agent identifying the set-top box platform and processing a corresponding platform specific portion of the EBIF application.

6. The method of claim 3, wherein processing the EBIF application further comprises: identifying a content programming engine based on a key identifier of a content reference portion of the EBIF application, wherein the content programming engine is associated with programmable content comprised of EBIF data located at a content publisher; and receiving the programmable content in an EBIF data stream from the content publisher.

7. The method of claim 6, wherein the key identifier includes at least one of an organizationally unique identifier, a category identifier, or a resource identifier.

8. The method of claim 7, wherein the organizationally unique identifier identifies the content programming engine.

9. The method of claim 6, wherein the EBIF application includes container widgets configured to accept one of a plurality of widget types from the EBIF data stream.

10. The method of claim 1, further comprising, prior to rendering the EBIF application, receiving a unified trigger event to signal execution of the EBIF application, wherein the format of the unified trigger event is independent of whether a corresponding trigger source is external or internal to the EBIF application.

11. The method of claim 1, further comprising, prior to executing the EBIF application: automatically validating the EBIF application against one or more application profiles according to validation rules; and if the EBIF application is validated, distributing the EBIF application to the user agent via an EBIF application deployment system, otherwise rejecting the EBIF application.

12. The method of claim 11, wherein the automatically validating comprises parsing only those portions of the EBIF application that include one or more private use extensions to determine if the EBIF application complies with the validation rules.

13. A method, comprising receiving, at a user agent of a client device, an enhanced television binary interchange format (EBIF) application encoded in a binary interchange format (BIF), wherein the EBIF application includes a content reference comprised of a key identifier, and executing the EBIF application to identify a content programming engine for resolving programmable content based on the key identifier.

14. The method of claim 13, wherein the programmable content comprised of EBIF data is located at a content publisher associated with the content programming engine.

15. The method of claim 14, comprising receiving the programmable content at the client device in an EBIF data stream from the content publisher.

16. The method of claim 15, further comprising prior to receiving the programmable content, receiving a unified trigger event to signal execution of the EBIF application, wherein the format of the unified trigger event is independent of whether its corresponding trigger source is external or internal to the EBIF application.

17. The method of claim 13 further comprising, receiving EBIF application data corresponding to elements which are executable within the EBIF application from an EBIF application distribution system.

18. The method of claim 13, wherein the EBIF application comprises a common portion executable independent of the client device platform.

19. The method of claim 13, wherein the EBIF application comprises a platform specific portion executable on a corresponding client device platform.

20. An enhanced television (ETV) system, comprising: a user agent resident in a client device and configured to receive an enhanced television binary interchange format (EBIF) application encoded in a binary interchange format (BIF) and to interpret the EBIF application directly and without additional compilation.

21. The system of claim 20, wherein to interpret the EBIF application directly, the application client is configured to process the EBIF application directly in the client device's memory.

22. The system of claim 20, further comprising a content programming engine identified by the EBIF application to resolve programmable content based on a key identifier associated with the EBIF application.

23. The system of claim 22, wherein the user agent is further configured to receive EBIF application data corresponding to elements executable within the EBIF application from an EBIF application distribution system.

24. The system of claim 22, further comprising, prior to receiving the resolved programmable content, receiving a unified trigger event to signal execution of the EBIF application, wherein the format of the unified trigger event is independent of whether its corresponding trigger source is external or internal to at least one of the EBIF application or the client device.

25. The system of claim 20, wherein the BIF code comprises a common binary portion executable independent of a client device platform.

26. The system of claim 20, wherein the BIF code comprises a platform specific portion executable on a client device platform identified in the platform specific portion.

27. The system of claim 20, further comprising a validation module configured to automatically validate the EBIF application against one or more application profiles according to validation rules prior to the user agent interpreting the EBIF application; and if the EBIF application is validated, the validation module is configured to permit distribution of the EBIF application to the user agent via an EBIF application deployment system, otherwise rejecting the EBIF application.

28. The system of claim 27, wherein to automatically validate, the validation module is configured to parse only those portions of the EBIF application that comprise one or more private use extensions to determine if the EBIF application complies with the validation rules.

29. The system of claim 20, wherein the client device is a set-top box.

* * * * *

UNITED STATES PATENT AND TRADEMARK OFFICE

CERTIFICATE OF CORRECTION

PATENT NO. : 7,805,746 B2

APPLICATION NO. : 11/253892

DATED : September 28, 2010

INVENTOR(S) : David Brandyberry et al.

It is certified that error appears in the above-identified patent and that said Letters Patent is hereby corrected as shown below:

Column 2, Line 34:
Delete “differeing” and insert --differing--

Column 3, Line 58:
Delete “includes” and insert --include--

Column 4, Line 22:
Delete “according one” and insert --according to one--

Column 10, Line 22:
Delete “according one” and insert --according to one--

Column 12, Line 29:
Delete “identifier: an key” and insert --identifier: a key--

Column 12, Line 38:
Delete grarphics” and insert --graphics--

Column 13, Line 15:
Delete “manfestation” and insert --manifestation--

Column 15, Line 5:
Delete “labelled” and insert --labeled--

Column 15, Line 22:
Delete “labelled” and insert --labeled--

Column 18, Line 5:
Delete “platorm” and insert --platform--

Column 18, Line 41:
Delete “pl.atform” and insert --platform--

Column 19, Line 47:
Delete “varioius” and insert --various--

Column 22, Line 66:
Delete “specifric” and insert --specific--

Column 25, Line 14:
Delete “Table 4 Directory” and insert --Table 4 “Table Directory”--

Signed and Sealed this
Thirty-first Day of January, 2012

David J. Kappos
*Director of the United States Patent and Trademark Office*

Column 27, Line 21:
Delete “string r” and insert --string or--
Column 28, Line 22:
Delete “referencees” and insert --references--
Column 28, Line 60:
Delete “roperty “ and insert --Property--
Column 28, Line 50:
Delete “ype” and insert --Type--
Column 29, Line 35:
Delete “denoted” and insert --denotes--
Column 29, Line 67:
Delete “Shema” and insert --Schema--
Column 31, Line 14:
Delete “is a a” and insert --is a--
Column 31, Line 16:
Delete “contains the the platform” and insert --contains the platform--
Column 32, Line 24:
Delete “referente” and insert --reference--
Column 32, Line 25:
Delete “referente” and insert --reference-
Column 33, Line 34:
Delete “use used” and insert --is used--
Column 35, Line 67:
Delete “referenced, widget” and insert --referenced widget--
Column 36, Line 43:
Delete “of a the” and insert --of the--
Column 36, Line 54:
Delete “then then that” and insert --then that--
Column 42, Resource Locator Table Example, first far right box, row 3:
Delete “resouce” and insert --resource--
Column 44, Line 11:
Delete “Shema” and insert --Schema--
Column 45, Line 41:
Delete “front” and insert --font--
Column 46, Line 65:
Delete “an” and insert --a--
Column 47, Line 1:
Delete “an” and insert --a--
Column 52, Line 57:
Delete “an on Success” and insert --a Success--
Column 52, Line 61 :
Delete “an on Failure” and insert --a Failure--
Column 53, Line 31:
Insert --.-- after origin Column 55, Line 35:
Delete “they” and insert --the y--
Column 55, Line 44:
Delete “hotpot” and insert --hotspot--
Column 56, Line 2:
Delete “an on Focus” and insert --a Focus--
Column 56, Line 6:
Delete “an on Blur” and insert --a Blur--
Column 57, Line 23:
Delete “An” and insert --a--
Column 58, Line 32:
Delete “IncluldedPage” and insert --IncludedPage--
Column 59, Line 24:
Delete “ebiMutliline” and insert --ebiMultiline--
Column 59, Line 34:
Delete “they” and insert --the y--
Column 59, Line 42:
Delete “they” and insert --the y--
Column 59, Line 57:
Delete “they” and insert --the y--
Column 60, Line 22:
Delete “sidget” and insert --widget--
Column 61, Line 16:
Delete “Multilline” and insert --Multiline--
Column 63, Line 8:
Delete “pwEndNPT8” and insert --pwEndNPT--
Column 63, Line 13:
Delete “an on VODEnd” and insert --a VODEnd--
Column 63, Line 26:
Delete “an on VODSegmentEnd” and insert --a VODSegmentEnd--
Column 64, Line 10:
Delete “an on VODEnd” and insert --a VODEnd--
Column 64, Line 14:
Delete “an on VODSegmentEnd” and insert --a VODSegmentEnd--
Column 64, Line 19:
Delete “an on Timeout” and insert --a Timeout--
Column 64, Line 23:
Delete “an on Channel-” and insert --a Channel--
Column 64, Line 54:
Delete “it’s” and insert --its--
Column 67, Line 23:
Delete “they” and insert --the y--
Column 67, Line 31:
Delete “they” and insert --the y--

Column 68, Line 22:
Delete "an on Click" and insert --a Click--
Column 68, Line 26:
Delete "an on Focus" and insert --a Focus--
Column 68, Line 30:
Delete "an on Blur" and insert --a Blur--
Column 70, Line 13:
Insert --.-- after the word state
Column 73, Line 16:
Delete "table of the of" and insert --table of--
Column 74, Line 53:
Delete "an" and insert --a--
Column 74, Line 56:
Delete "they" and insert --the y--
Column 74, Line 59:
Delete "they" and insert --the y--
Column 74, Line 65:
Delete "they" and insert --the y--
Column 75, Line 17:
Delete "from; which" and insert --from which--
Column 76, Line 27:
Delete "they" and insert --the y--
Column 76, Line 35:
Delete "they" and insert --the y--
Column 78, Line 44:
Delete "they" and insert --the y--
Column 79, Line 67:
Delete "they" and insert --the y--
Column 80, Line 8:
Delete "they" and insert --the y--
Column 80, Line 34:
Delete "is"
Column 81, Line 2:
Delete "an on Click" and insert --a Click--
Column 81, Line 6:
Delete "an on Focus " and insert --a Focus--
Column 81, Line 10:
Delete "an on Blurr" and insert --a Blur--
Column 81, Line 14:
Delete "an on Focus" and insert --a Focus--
Column 82, Line 47:
Delete "they" and insert --the y--
Column 82, Line 49:
Delete "they" and insert --the y--

Column 85, Line 32:
Delete “they” and insert --the y--
Column 85, Line 35:
Delete “they” and insert --the y--
Column 86, Line 53:
Delete “an on Focus” and insert --a Focus--
Column 86, Line 58:
Delete “an on Blur” and insert --a Blur--
Column 87, Line 46:
Delete “an on Timer” and insert --a Timer--
Column 87, Line 52:
Delete “an on Timer” and insert --a Timer--
Column 87, Line 57:
Delete “an on Timer” and insert --a Timer--
Column 90, Line 58:
Delete “fuiture” and insert --future--
Column 91, Line 56:
Delete “columns’s” and insert --column’s--
Column 92, Line 55:
Delete “on”
Column 93, Line 54:
Move the first word “Fonts” to the line above line 54.
Column 97, Line 45:
Delete “(DH)” and insert --(DII)--
Column 101, Line 26:
insert --.-- after the word Structure
Column 105, Line 56:
Delete “termporary” and insert --temporary--
Column 107, Line 34:
Delete “termporary” and insert --temporary--
Column 108, Line 41:
Delete “termporary” and insert --temporary--
Column 108, Line 66:
Delete “termporary” and insert --temporary--
Column 109, Line 35:
Delete “termporary” and insert --temporary--
Column 110, Line 13:
Delete “termporary” and insert --temporary--
Column 110, Line 37:
Delete “termporary” and insert --temporary--
Column 110, Line 65:
Delete “termporary” and insert --temporary--
Column 111, Line 31:
Delete “Evaluate taking and” insert --Evaluate a predicate taking--

Column 111, Line 45:
Delete "termporary" and insert --temporary--
Column 112, Line 25:
Delete "by the" after the word triggered
Column 113, Line 66:
Delete "charcterizes" and insert --characterizes--
Column 114, Line 47:
Insert --Unified Signaling for Application Triggers: Design Notes-- on the line above the words Design Problem
Column 115, Line 47:
Delete "strucutre" and insert --structure--
Column 115, Line 53:
Delete "this"
Column 116, Line 2:
Delete "strucutre" and insert --structure--
Column 116, Line 9:
Delete "this"
Column 116, Line 28:
Delete "strucutre" and insert --structure--
Column 116, Line 54:
Delete "strucutre" and insert --structure--
Column 117, Line 12:
Delete "strucutre" and insert --structure--
Column 117, Line 18:
Delete "this"
Column 119, Line 3:
Insert --.-- after the word column
Column 119, Line 36:
Insert --.-- after the word triggerTable
Column 119, Line 37:
Insert --.-- after the word actionTable
Column 119, Line 54:
Insert --.-- after the word trigger
Column 119, Line 60:
Insert --.-- after the word trigger
Column 121, Line 41:
Delete "localor[???TBD???]" with --locator--.
Column 121, Line 44:
Insert --Messaging Design Notes-- on the line above the title Design Problem
Column 122, Third Table, First Line:
Delete "Mnemonics" and insert --Mnemonics--
Column 123, Line 25:
Insert --.-- after the word accumulate
Column 123, Line 61:
Insert --.-- after the word type Column 123, Line 63:
Insert --.-- after the word [shortlstring]
Column 124, Line 10:
Delete “it’s” and insert --its--